(12) United States Patent
Birnbaum et al.

(10) Patent No.: US 9,720,899 B1
(45) Date of Patent: *Aug. 1, 2017

(54) AUTOMATIC GENERATION OF NARRATIVES FROM DATA USING COMMUNICATION GOALS AND NARRATIVE ANALYTICS

(71) Applicant: Narrative Science Inc., Chicago, IL (US)

(72) Inventors: Lawrence Birnbaum, Evanston, IL (US); Kristian J. Hammond, Chicago, IL (US); Nathan Drew Nichols, Chicago, IL (US); Andrew R. Paley, Chicago, IL (US); Shingo Murata, Chicago, IL (US); Pia Opulencia, Chicago, IL (US)

(73) Assignee: NARRATIVE SCIENCE, INC., Chicago, IL (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/521,264

(22) Filed: Oct. 22, 2014

(51) Int. Cl.
G06F 17/00 (2006.01)
G06F 17/27 (2006.01)
G06F 17/30 (2006.01)
G06N 99/00 (2010.01)

(52) U.S. Cl.
CPC ........ *G06F 17/27* (2013.01); *G06F 17/30861* (2013.01); *G06F 17/274* (2013.01); *G06F 17/30286* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 4,992,939 A | 2/1991 | Tyler | |
| 5,734,916 A | 3/1998 | Greenfield et al. | |
| 5,802,495 A | 9/1998 | Goltra | |
| 6,289,363 B1 | 9/2001 | Consolatti et al. | |
| 6,968,316 B1* | 11/2005 | Hamilton | G06Q 40/02 705/36 R |
| 6,976,031 B1 | 12/2005 | Toupal et al. | |
| 7,246,315 B1 | 7/2007 | Andrieu et al. | |
| 7,333,967 B1 | 2/2008 | Bringsjord et al. | |

(Continued)

FOREIGN PATENT DOCUMENTS

| | | |
|---|---|---|
| WO | 2006122329 A2 | 11/2006 |
| WO | 2014035400 A1 | 3/2014 |

(Continued)

OTHER PUBLICATIONS

Character Writer Version 3.1, Typing Chimp Software LLC, 2012, screenshots from working program, pp. 1-19.

(Continued)

*Primary Examiner* — Hung Le
(74) *Attorney, Agent, or Firm* — Thompson Coburn LLP; Benjamin Volk

(57) ABSTRACT

The exemplary embodiments described herein are related to techniques for automatically generating narratives about data based on communication goal data structures that are associated with configurable content blocks. The use of such communication goal data structures facilitates modes of operation whereby narratives can be generated in real-time and/or interactive manners.

32 Claims, 39 Drawing Sheets

(56) References Cited

U.S. PATENT DOCUMENTS

| | | |
|---|---|---|
| 7,577,634 B2 | 8/2009 | Ryan et al. |
| 7,610,279 B2 | 10/2009 | Budzik et al. |
| 7,617,199 B2 | 11/2009 | Budzik et al. |
| 7,617,200 B2 | 11/2009 | Budzik et al. |
| 7,627,565 B2 | 12/2009 | Budzik et al. |
| 7,644,072 B2 | 1/2010 | Budzik et al. |
| 7,657,518 B2 | 2/2010 | Budzik et al. |
| 7,716,116 B2 | 5/2010 | Schiller |
| 7,778,895 B1 | 8/2010 | Baxter et al. |
| 7,836,010 B2 | 11/2010 | Hammond et al. |
| 7,856,390 B2* | 12/2010 | Schiller ............ G06Q 40/06 705/36 R |
| 7,865,496 B1 | 1/2011 | Schiller |
| 8,046,226 B2 | 10/2011 | Soble et al. |
| 8,355,903 B1* | 1/2013 | Birnbaum ............ G06F 17/24 704/1 |
| 8,374,848 B1 | 2/2013 | Birnbaum et al. |
| 8,447,604 B1 | 5/2013 | Chang |
| 8,463,695 B2 | 6/2013 | Schiller |
| 8,494,944 B2 | 7/2013 | Schiller |
| 8,515,737 B2 | 8/2013 | Allen |
| 8,630,844 B1 | 1/2014 | Nichols et al. |
| 8,630,912 B2 | 1/2014 | Seki et al. |
| 8,630,919 B2* | 1/2014 | Baran ............ G06Q 10/10 705/26.64 |
| 8,676,691 B2 | 3/2014 | Schiller |
| 8,688,434 B1 | 4/2014 | Birnbaum et al. |
| 8,762,133 B2 | 6/2014 | Reiter |
| 8,762,134 B2 | 6/2014 | Reiter |
| 8,775,161 B1 | 7/2014 | Nichols et al. |
| 8,812,311 B2 | 8/2014 | Weber |
| 8,843,363 B2 | 9/2014 | Birnbaum et al. |
| 8,886,520 B1 | 11/2014 | Nichols et al. |
| 8,892,417 B1 | 11/2014 | Nichols et al. |
| 9,135,244 B2 | 9/2015 | Reiter |
| 9,208,147 B1* | 12/2015 | Nichols ............ G06F 17/28 |
| 9,244,894 B1 | 1/2016 | Dale et al. |
| 9,251,134 B2 | 2/2016 | Birnbaum et al. |
| 9,323,743 B2 | 4/2016 | Reiter |
| 9,336,193 B2 | 5/2016 | Logan et al. |
| 9,355,093 B2 | 5/2016 | Reiter |
| 9,396,168 B2 | 7/2016 | Birnbaum et al. |
| 9,396,181 B1 | 7/2016 | Sripada et al. |
| 9,405,448 B2 | 8/2016 | Reiter |
| 9,576,009 B1 | 2/2017 | Hammond et al. |
| 2002/0083025 A1 | 6/2002 | Robarts et al. |
| 2004/0138899 A1 | 7/2004 | Birnbaum et al. |
| 2004/0225651 A1* | 11/2004 | Musgrove ......... G06Q 30/0253 |
| 2004/0255232 A1 | 12/2004 | Hammond et al. |
| 2005/0027704 A1 | 2/2005 | Hammond et al. |
| 2005/0028156 A1 | 2/2005 | Hammond et al. |
| 2005/0125213 A1 | 6/2005 | Chen et al. |
| 2005/0273362 A1* | 12/2005 | Harris ............ G06F 19/3487 705/2 |
| 2006/0031182 A1 | 2/2006 | Ryan et al. |
| 2006/0101335 A1 | 5/2006 | Pisciottano |
| 2006/0212446 A1 | 9/2006 | Hammond et al. |
| 2006/0271535 A1 | 11/2006 | Hammond et al. |
| 2006/0277168 A1 | 12/2006 | Hammond et al. |
| 2007/0132767 A1 | 6/2007 | Wright et al. |
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2008/0250070 A1 | 10/2008 | Abdulla et al. |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0144608 A1 | 6/2009 | Oisel et al. |
| 2010/0161541 A1 | 6/2010 | Covannon et al. |
| 2011/0087486 A1* | 4/2011 | Schiller ............ G06Q 40/06 704/9 |
| 2011/0113315 A1 | 5/2011 | Datha et al. |
| 2011/0246182 A1* | 10/2011 | Allen ............ G06F 17/248 704/9 |
| 2011/0249953 A1* | 10/2011 | Suri ............ G11B 27/034 386/239 |
| 2011/0295903 A1* | 12/2011 | Chen ............ G06F 17/30598 707/794 |
| 2013/0041677 A1* | 2/2013 | Nusimow ............ G06Q 50/22 705/2 |
| 2013/0091031 A1* | 4/2013 | Baran ............ G06Q 10/10 705/26.1 |
| 2013/0145242 A1 | 6/2013 | Birnbaum et al. |
| 2013/0174026 A1 | 7/2013 | Locke |
| 2013/0211855 A1* | 8/2013 | Eberle ............ A61N 1/37282 705/3 |
| 2013/0262092 A1* | 10/2013 | Wasick ............ G06F 17/28 704/9 |
| 2014/0356833 A1* | 12/2014 | Sabczynski ......... G06F 19/3437 434/262 |
| 2014/0375466 A1 | 12/2014 | Reiter |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0347400 A1 | 12/2015 | Sripada |
| 2015/0363364 A1 | 12/2015 | Sripada |
| 2016/0132489 A1 | 5/2016 | Reiter |
| 2016/0140090 A1 | 5/2016 | Dale et al. |
| 2016/0217133 A1 | 7/2016 | Reiter et al. |
| 2016/0232152 A1 | 8/2016 | Mahamood |

FOREIGN PATENT DOCUMENTS

| | | |
|---|---|---|
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Dramatica Pro version 4, Write Brothers, 1993-2006, user manual.
Movie Magic Screenwriter, Writer Brothers, 2009, user manual.
Storyview, Screenplay Systems, 2000, user manual.
Prosecution History for U.S. Appl. No. 12/779,683, filed May 13, 2010.
Prosecution History for U.S. Appl. No. 13/464,716, filed May 4, 2012.
Allen et al., "StatsMonkey: A Data-Driven Sports Narrative Writer", Computational Models of Narrative: Papers from the AAAI Fall Symposium, Nov. 2010, 2 pages.
Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.
Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.
Asset Economics, Inc. (Feb. 11, 2011).
Bailey, P. (1999). Searching for Storiness: Story-Generation from a Reader's Perspective. AAAI Technical Report FS-99-01.
Bethem, T., Burton, J., Caldwell, T., Evans, M., Kittredge, R., Lavoie, B., and Werner, J. (2005). Generation of Real-time Narra-

(56) References Cited

OTHER PUBLICATIONS tive Summaries for Real-time Water Levels and Meteorological Observations in PORTS®. In Proceedings of the Fourth Conference on Artificial Intelligence Applications to Environmental Sciences (AMS-2005), San Diego, California.
Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.
Boyd, S. (1998). TREND: A system for generating intelligent descriptions of time series data. Paper presented at Proceedings of the IEEE international conference on intelligent processing systems (ICIPS-1998).
Dehn, N. (1981). Story generation after TALE-SPIN. In Proceedings of the Seventh International Joint Conference on Artificial Intelligence. (Vancouver, Canada).
Gatt, A., and Portet, F. (2009). Text content and task performance in the evaluation of a Natural Language Generation System. Proceedings of the Conference on Recent Advances in Natural Language Processing (RANLP-09).
Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.
Glahn, H. (1970). Computer-produced worded forecasts. Bulletin of the American Meteorological Society, 51(12), 1126-1131.
Goldberg, E., Driedger, N., & Kittredge, R. (1994). Using Natural-Language Processing to Produce Weather Forecasts. IEEE Expert, 9 (2), 45.
Hargood, C., Millard, D. and Weal, M. (2009) Exploring the Importance of Themes in Narrative Systems.
Hargood, C., Millard, D. and Weal, M. (2009). Investigating a Thematic Approach to Narrative Generation, 2009.
Hunter, J., Freer, Y., Gail, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.
Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.
Kittredge, R., and Lavoie, B. (1998). MeteoCogent: A Knowledge-Based Tool for Generating Weather Forecast Texts. In Proceedings of the American Meteorological Society AI Conference (AMS-98), Phoenix, Arizona.
Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
McKeown, K., Kukich, K, & Shaw, J. (1994). Practical issues in automatic documentation generation. 4th Conference on Applied Natural Language Processing, Stuttgart, Germany, pp. 7-14.
Meehan, James R., TALE-SPIN. (1977). An Interactive Program that Writes Stories. In Proceedings of the Fifth International Joint Conference on Artificial Intelligence.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.

Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Prosecution History for U.S. Appl. No. 13/186,308, now U.S. Pat. No. 8,775,161, filed Jul. 19, 2011.
Prosecution History for U.S. Appl. No. 13/186,329, now U.S. Pat. No. 8,892,417, filed Jul. 19, 2011.
Prosecution History for U.S. Appl. No. 13/186,337, now U.S. Pat. No. 8,886,520, filed Jul. 19, 2011.
Prosecution History for U.S. Appl. No. 13/186,346, filed Jul. 19, 2011.
Prosecution History for U.S. Appl. No. 13/464,635, filed May 4, 2012.
Prosecution History for U.S. Appl. No. 13/464,675, filed May 4, 2012.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Geo-referenced Data to Text for NLG. Paper presented at Proceedings of the 2007 European Natural Language Generation Workshop (ENLGO7).
Thomas, K., and Sripada, S. (2008). What's in a message? Interpreting Geo-referenced Data for the Visually-impaired. Proceedings of the Int. conference on NLG.
Thomas, K., Sumegi, L., Ferres, L., and Sripada, S. (2008). Enabling Access to Geo-referenced Information: Atlas.txt. Proceedings of the Cross-disciplinary Conference on Web Accessibility.
Van der Meulen, M., Logie, R., Freer, Y., Sykes, C., McIntosh, N., and Hunter, J. 2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

(56) References Cited

OTHER PUBLICATIONS

Prosecution History for U.S. Appl. No. 12/779,636, filed May 13, 2010.
Prosecution History for U.S. Appl. No. 12/779,668, filed May 13, 2010.
Memorandum Opinion and Order for *O2 Media, LLC* v. *Narrative Science Inc.*, Case 1:15-cv-05129 (N. D. IL), Feb. 25, 2016, 25 pages (invalidating claims of U.S. Pat. Nos. 7,856,390, 8,494,944, and 8,676,691 owned by O2 Media, LLC.
Prosecution History for U.S. Appl. No. 14/626,966, filed Feb. 20, 2015.
Office Action for U.S. Appl. No. 13/464,635 dated Feb. 22, 2016.
Office Action for U.S. Appl. No. 14/570,834 dated Aug. 23, 2016.
Office Action for U.S. Appl. No. 14/626,966 dated Jan. 25, 2016.
Office Action for U.S. Appl. No. 14/626,966 dated Jul. 15, 2016.
Prosecution History for U.S. Appl. No. 13/738,560, now U.S. Pat. No. 8,843,363 filed Jan. 10, 2013.
Prosecution History for U.S. Appl. No. 13/738,609, now U.S. Pat. No. 9,251,134 filed Jan. 10, 2013.
Prosecution History for U.S. Appl. No. 14/090,021, now U.S. Pat. No. 9,208,147, filed Nov. 26, 2013.
Prosecution History for U.S. Appl. No. 15/011,743, now U.S. Pat. No. 9,396,168, filed Feb. 1, 2016.
Response to Office Action for U.S. Appl. No. 13/464,635 dated Jun. 4, 2015.

\* cited by examiner

Instantiated Content Block (512) for Describe Status/Feature Over Time

*Entity Parameter:* Ford Motor Company
*Entity Parameter Text Name:* Ford Motor Company
*Top Line Metric Parameter:* Ford's Total Unit Sales
*Top Line Metric Parameter Text Name:* Total Unit Sales
*Top Line Metric Data Model:* List of Values with Dates
*Time Period Parameter:* 90 Days
*Time Period Parameter Text Name:* Quarter
*Change Threshold Parameter:* 1%
*Configured Angles:* Angles that reference total unit sales, 90 days and 1% change threshold
*Information Density Parameter:* Intermediate
*Derived Features Data Models:* Compute Percentage Change in Total Unit Sales over 90 Days
*Tone Parameter:* Professional
*Configured Blueprint Sets:* Blueprint Sets defined by parameter text names, Intermediate info density, and Professional tone

Instantiated Content Block (514) for Evaluate Status/Cohort Comparison

*Same Specified Parameters as Content Block 512*
PLUS
*Peer Group Parameter:* All American Automobile Manufacturers
*Configured Angles:* Angles that reference total unit sales, 90 days and 1% change threshold for all American manufacturers
*Derived Features Data Models:* Compute Total Unit Sales for Each American Manufacturer over Last 90 Days

Instantiated Content Block (516) for Explain Status/Metrics and Drivers

*Same Specified Parameters as Content Block 512*
PLUS
*Contributing Driver Parameters:* Ford Mustang Sales, Ford Focus Sales, Ford Taurus Sales
*Inhibiting Driver Parameters:* Recall Announcements
*Configured Angles:* Angles that reference total unit sales, 90 days, 1% change threshold and the specified drivers
*Derived Features Data Models:* Compute Values for Each Driver Over Prior 90 Days

Figure 5D

Please Enter a Question:

How did the store do this week? — 2620

Answer:

Sales were up about 7% to $27,385 for the week — 2610

Figure 26

What Question Would You Like to Ask?

- How many total units were sold by the Ford Motor Company?
- What was the revenue of the Ford Motor Company?
- How many Ford Mustangs did the Ford Motor Company Sell?
- How did ___ do over the time frame ___?

Figure 27

Please Enter a Question: How is the Ford Motor Company doing? — 2820

Answer: In terms of revenue or total units sold? — 2810

AUTOMATIC GENERATION OF NARRATIVES FROM DATA USING COMMUNICATION GOALS AND NARRATIVE ANALYTICS

CROSS-REFERENCE TO RELATED PATENTS AND PATENT APPLICATIONS

This patent application is related to U.S. Pat. Nos. 8,355,903, 8,374,848, 8,630,844, 8,688,434, and 8,775,161, the entire disclosures of each of which are incorporated herein by reference.

This patent application is also related to the following U.S. patent applications: (1) U.S. application Ser. No. 12/986,972, filed Jan. 7, 2011, (2) U.S. application Ser. No. 12/986,981, filed Jan. 7, 2011, (3) U.S. application Ser. No. 12/986,996, filed Jan. 7, 2011, (4) U.S. application Ser. No. 13/186,329, filed Jul. 19, 2011, (5) U.S. application Ser. No. 13/186,337, filed Jul. 19, 2011, (6) U.S. application Ser. No. 13/186,346, filed Jul. 19, 2011, (7) U.S. application Ser. No. 13/464,635, filed May 4, 2012, (8) U.S. application Ser. No. 13/464,675, filed May 4, 2012, (9) U.S. application Ser. No. 13/738,560, filed Jan. 10, 2013, (10) U.S. application Ser. No. 13/738,609, filed Jan. 10, 2013, (11) U.S. App. Ser. No. 61/799,328, filed Mar. 15, 2013, (12) U.S. application Ser. No. 14/090,021, filed Nov. 26, 2013, and (13) U.S. application Ser. No. 14/211,444, filed Mar. 14, 2014, the entire disclosures of each of which are incorporated herein by reference.

INTRODUCTION

The rise of "Big Data" has generated a great deal of excitement in connection with data analytics. Given the massive amount of data present in Big Data systems and applications, there is an expectation that new insights and information will be available to data analysts that were previously unavailable (or impractical). However, in practice, computer scientists have felt some frustration because the enormous investment in Big Data has resulted in relatively few success stories. While the Big Data model has proven very good at amassing data, it is believed that there is a serious shortcoming in the art for technology solutions that facilitate how large amounts of data can be analyzed to produce meaningful information, intelligence, and insights for data consumers. In other words, Big Data methods and analyses have had difficulty finding something interesting and meaningful within the Big Data and communicating such interesting/meaningful information to a user.

For example, finding meaningful insights, trends, or information gathered through Big Data is extremely reliant on a human interpreting the data as the data are displayed. The current Big Data approaches fail to effectively communicate what the computer may have found as a result of complex Big Data analysis. Spreadsheets and graphs are useful representations of data, but only to the people who understand such graphs and spreadsheets. Therefore, despite all the powerful machines that are in use to gather and process Big Data, companies still rely on a person looking at a screen to find the meaningful or most important information gleaned from the Big Data—and that same person then communicates the meaningful or most important information to everyone else. In other words, the responsibility for telling the Big Data's "story" falls upon these so called "data scientists." The inventors believe that there is a significant need for better technology to help people assess the meaningful information that may be present within large sets of data.

It is in view of the above problems that the present invention was developed to help improve how narratives based on data are computer-generated. In example embodiments described herein, communication goals serve as the focus from which narratives are generated. As used herein, the term "communication goal" refers to a communicative purpose for a narrative and/or a meaning or class of meanings that is intended to be conveyed by the narrative to the narrative's reader or consumer. For example, if a person wants to know how a retail store is performing, the system described herein can be configured to automatically generate a narrative that is meant to satisfy the communication goal of providing information that is responsive to the person's desire to gain knowledge about the retail store's performance. With example embodiments, narrative or communication goals are represented explicitly; relationships are established between these structures and content blocks defined to specify how to fulfill the represented communication goals. In example embodiments, relationships can also be established between any or all of these structures and the narrative analytic models that specify the nature of the data and data analyses required to fulfill the represented goals. In additional example embodiments, relationships can also be established among communication goals themselves. The relationships between communication goals, narrative analytic models, and content blocks allow a computer to determine when to use or not use those, or related, content blocks. In other words, the communication goal data structures constrain the content blocks needed to fulfill a narrative goal. Using the communication goal data structures as a guide, a computer may generate meaningful narratives by determining the content blocks and narrative analytics associated with a given communication goal data structure.

By representing communication goals, the communication goal data structures constrain the nature of the data necessary to fulfill the narrative goal and to provide a narrative that answers the questions naturally asked, whether explicitly or simply internally, by a reader. That is, only a subset of available data in a data domain are generally needed to accomplish a desired communication goal, in which case the computer can limit the processing for the automated narrative generation to such a data subset. By specifying a communication goal data structure in advance, the computer can determine the nature and amount of data it needs analyze in order to automatically generate a narrative that satisfies the communication goals. Another benefit of constraining data processing to a data subset determined in part by communication goal data structures is that the reader is not overwhelmed with irrelevant or at least comparatively less important data and analyses of those less important data. The data presented in the narrative are constrained by the communication goals it aims to fulfill, so that they are not buried in the middle of a great deal of other less important information, and hence are more easily understood.

Finally, for example embodiments, because the communication goal data structures, and their relationships to each other, to content blocks, and ultimately to narrative analytic models and relevant data types and data, are specified in advance, and because data can be analyzed after selecting a communication goal data structure, data may even be analyzed in real-time or in an on-demand manner response to an input from a user. Such a system is capable of generating a narrative interactively, rather than all at once. An interactive narrative, which responds to a user's questions or prompts, may more efficiently respond to a user's dynamic and changing needs for information and thus enable the user to focus on what matters to him or her. For example, with an example interactive embodiment, rather than requiring an owner of a retail store to read an entire narrative report summarizing a store's performance in order to find the information he or she currently needs, the narrative can be constructed interactively to address exactly those specific information needs. The computer may respond to inputs from the owner and provide information in natural language and other forms, interactively, that is responsive to the owner's inputs—without generating an entire report narrative.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 5A-5D illustrate exemplary configuration of communication goal data structures for generating an exemplary performance report narrative.

FIGS. 26-28 illustrate an exemplary interactive mode graphical user interface.

DETAILED DESCRIPTION

Figure 1A:
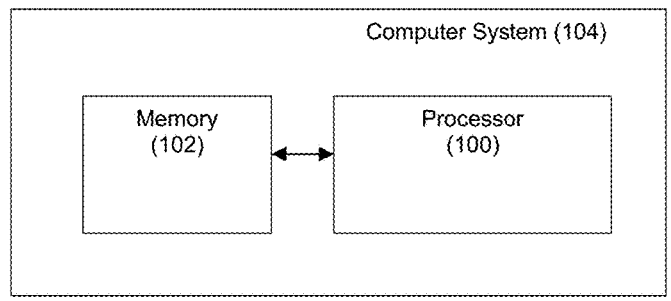
FIG. 1A illustrates a computer system according to an exemplary embodiment.

Referring to the accompanying drawings in which like reference numbers indicate like elements, FIG. 1A illustrates an exemplary processor 100 and associated memory 102 which can be configured to implement the story generation processes described herein in accordance with exemplary embodiments of the invention. The processor 100 and associated memory 102 may be deployed in a computer system 104. Such a computer system 104 can take any of a number of forms, including but not limited to one or more personal computers, servers, laptop/notebook/tablet computers, personal digital assistants (PDAs), or combinations of the same. For example, the computer system 104 can take the form of the processing device disclosed in the cross-referenced patent applications that have been incorporated herein. The processor 100 may comprise a single processor or multiple processors, including multiple processors that are physically remote from each other. Similarly, the memory 102 can take the form of one or more physical memories. Moreover, the memory 102 can be physically remote from processor 100 if desired by a practitioner, such as a remote database accessible to the processor 100 via a network such as the Internet. Examples of suitable memories for use as memory 102 can be RAM memory, ROM memory, hard disk drive memory, etc. The memory 102 may include both primary and secondary memories, but the memory 104 is depicted as one unit for illustration purposes.

The processor 100 can be configured to execute one or more software programs. These software programs can take the form of a plurality of processor-executable instructions that are resident on a non-transitory computer-readable storage medium such as memory 102. For example, the one or more software programs may comprise an artificial intelligence program. The processor 100 may execute software to implement artificial intelligence that generates narrative stories. In an example embodiment, the generation of narratives by processor 100 is based on an explicit computer-readable data representation of a communication goal. Such a computer-readable data representation is referenced herein as a communication goal data structure. Examples of communication goal data structures are described below.

When reading a narrative, a reader expects the narrative to answer certain questions about the data discussed by the narrative. As such, it is strongly desirable to take into consideration the anticipated questions from the reader when driving the generation of the narrative. That is, it is desirable for the narrative generator to anticipate the questions asked by the reader and in turn answer these anticipated questions. Moreover, as the narrative progresses or unfolds, answering one question often naturally raises other questions in the mind of the target reader, in which case it would also be desirable for the narrative to address these other questions as well. In other words, there is a natural relationship between different communication goals for a narrative in that the fulfillment of one communication goal will often give rise to other communication goals, which in turn must be fulfilled by the narrative. For example, if a writer were to draft a performance report about a store, the reader may anticipate questions such as: "what is the status of the store?" "how well is the store performing?" "why is the store performing well or poorly?", etc., and the narrative generator can be designed to provide answers to these questions.

Figure 1B:
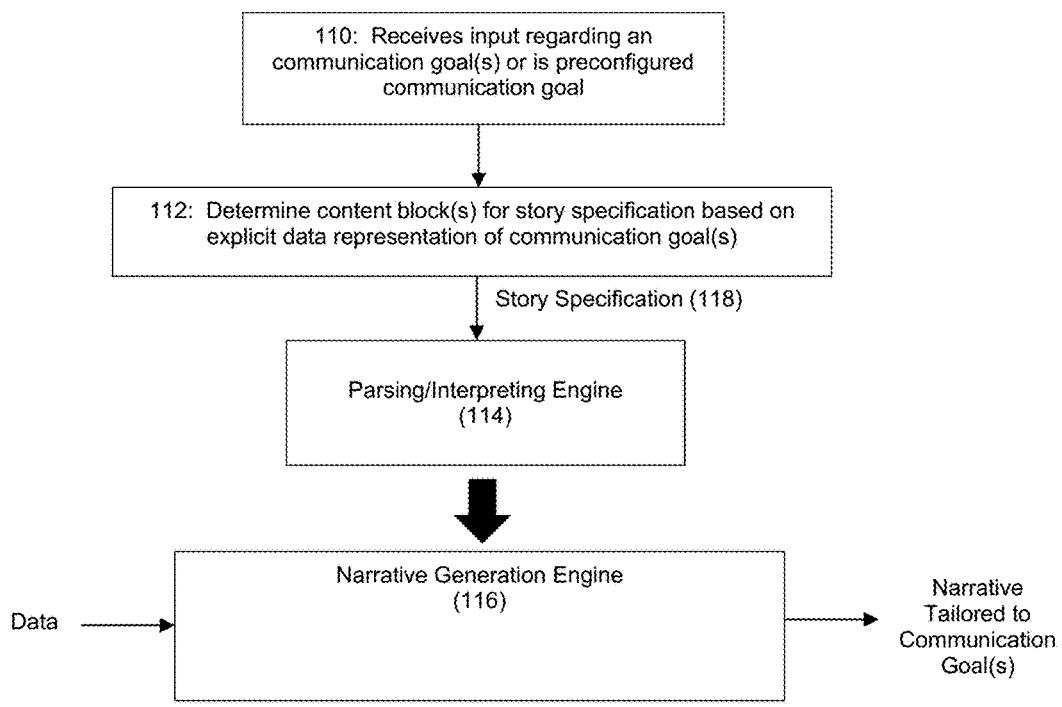
FIG. 1B illustrates an example configuration and process flow for execution by a computer system to automatically generate a narrative according to an exemplary embodiment.

FIG. 1B depicts an example configuration and process flow for execution by computer system 104, whereby the computer system serves as a domain-independent, general purpose narrative generation platform that is driven based on input relating to communication goals. The computational processing platform as shown by FIG. 1B need not itself be modified to be capable of generating narratives in disparate content verticals, story types, or that fulfill disparate communication goals. Instead, a user need only modify the high-level component specifications that serve as inputs to the computational platform in order to adapt the platform to generate narratives for different content verticals, story types, or communication goals, as explained in greater detail below.

At step 110, the processor 100 receives input regarding one or more communication goals or already is configured with one or more such goals. As an example, this specification can be an input from a user that indicates a communication goal (where the user may be an author or consumer of narratives). As another example, the processor may be pre-configured with input for a specific communication goal or set of communication goals. At step 112, the processor determines one or more content blocks for a story specification 118 based on an explicit data representation of the communication goal(s) described by the input at step 110. That is, the processor 100 accesses or creates one or more communication goal data structures in memory 102 based on the user input or processor specification and uses this communication goal data structure to determine one or more content blocks and to drive how a content block is configured for inclusion in a story specification 118. Step 112 may further comprise ordering how the content blocks will be presented to the user.

As explained below, steps 110 and 112 can be performed in either or both of an authoring mode and a user-interactive mode. In an authoring mode, a user provides input to configure a communication goal data structure to author a story specification designed to achieve a particular communication goal. Thus, in the authoring mode, the user is focused on creating and configuring an appropriate instantiation of a story specification 118 to meet a perceived communication goal need or multiple perceived communication goal needs. In a user-interactive mode, a user provides input relating to a desired communication goal for which the user wants a narrative to be generated. In the user-interactive mode, the system 104 may already include a number of communication goal and content block data structures in memory, and the system aims to leverage the communication goal relating to the input at step 110 to drive the selection of and instantiation of an appropriate story specification that is tailored to the communication goal corresponding to the user's input.

Examples of suitable models for content blocks and story specifications are described in the above-referenced and incorporated U.S. Pat. No. 8,630,844. As with the '844 patent, the story specification 118 and the content blocks therein are specified as computer-readable data that is not in a programming language (or in a machine code) that is directly executable by a computer. Instead, the story specification 118 and content blocks therein are models that help define how narratives should be generated from a given data set.

A parsing engine 114 parses and interprets the story specification 118 to generate the actual programmatic data structures that are directly executable by the processor. These programmatic data structures serve as part of a narrative generation engine 116. The narrative generation engine 116 is configured to process input data about which the narrative is to be generated, and, based on this processing, automatically generate a narrative that is tailored to the communication goal(s) determined in step 110. Also the parsing engine 116 may supply parameters to the content block determined in step 112. These parameters may define which parameters will be used to write the story. For example, supplying the parameter to the content block may involve setting the content block to review "total unit sales" for a store. The actual data representing the total units sold are not supplied at this step, but the determination gives a value to the top-line metric parameter, and the narrative generation engine later uses this to process actual data based on this parameter. An example embodiment for the parsing engine 114 and 116 are described in greater detail in the above-referenced and incorporated U.S. Pat. No. 8,640,844.

Figure 1C:
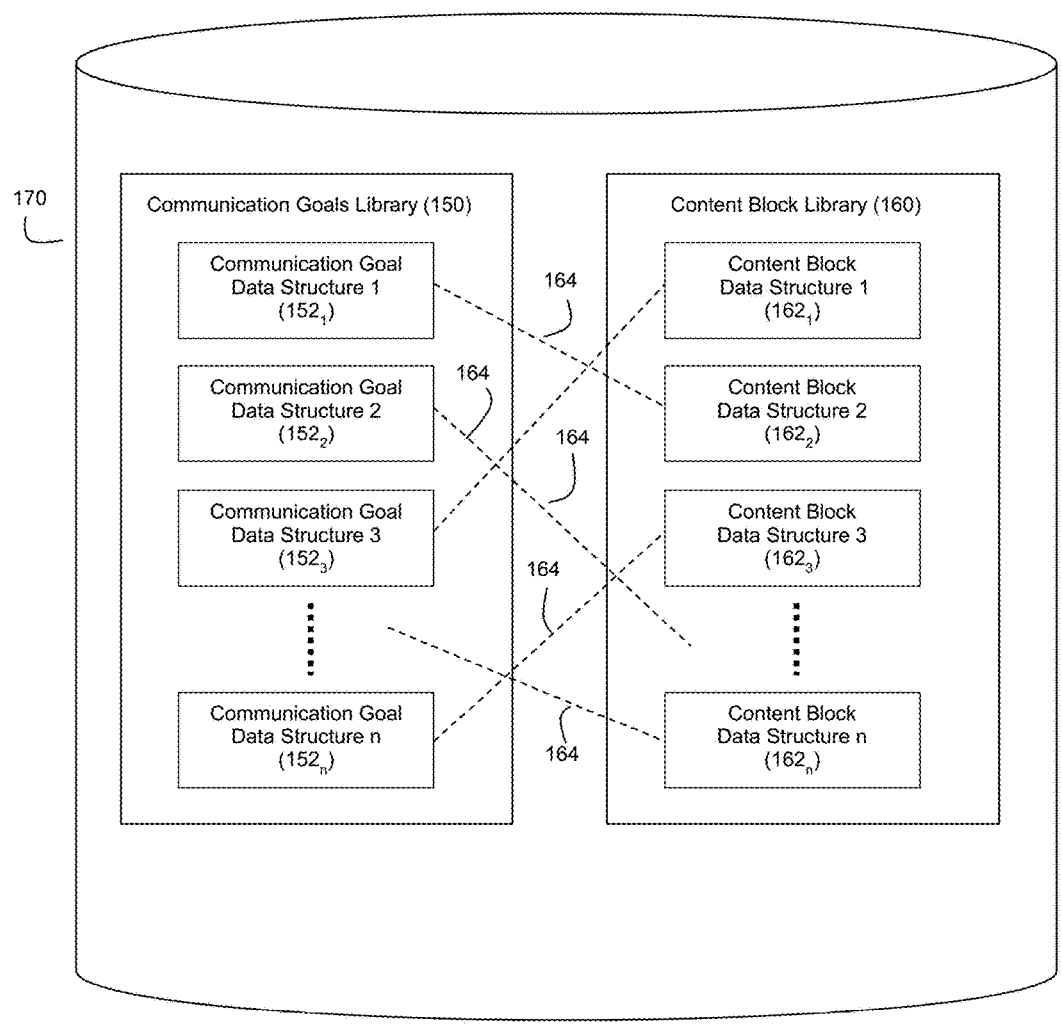
FIG. 1C depicts example data structures within a memory for associating communication goal data structures with content block data structures.

FIG. 1C depicts an example of data structures in a memory 170 that support the performance of step 112 from FIG. 1B. The memory 170 may include a communication goals library 150 comprising one or more communication goal data structures 152i. Each communication goal data structure 152i may represent a given communication goal, and the plurality of communication goal data structures 152i may represent, in the aggregate, a number of different communication goals. Examples of different types of communication goals that could be supported by library 150 include a "describe" communication goal, an "evaluate" communication goal, and an "explain" communication goal. Further still, each of these communication goal types may encompass a number of specific communication goals. For example, the communication goal of "Assess Entity (Feature Over Time)" can be a specific instance of a "Describe" communication goal type. As another example, the communication goal of "Contextualize Assessment (Cohort Comparison)" can be a specific instance of an "Evaluate" communication goal type. As yet another example, the communication goal of "Explain Assessment (Metric and Drivers)" can be a specific instance of an "Explain" communication goal type. As such, it should be understood that the library 150 is capable of supporting a large number of different types of communication goals. Furthermore, given the complexities of story-telling needs in certain environments, it should be understood that some of these communication goals may be at least partially overlapping with other communication goals. Also, while FIG. 1C illustrates a one-to-one correspondence between communication goals 152i and content blocks 162i, communication goals and content blocks may be hierarchical in that a content block may comprise one or more constituent communication goals, which in turn determine constituent content blocks.

The memory 170 may also include a content block library 160 comprising one or more content block data structures 162i. Each content block data structure 162i is a specification of data and computational components that are necessary to generate a section of a narrative. These data and computational components define a narrative analytics model for a narrative section. As explained herein, the content block data structure's specification can be a high-level configurable and parameterized specification. Through configuration of a content block data structure 162*i*, the content block data structure 162*i* can be adapted to model how a wide variety of narratives in various content verticals and domains are to be generated.

The memory 170 maps each communication goal data structure 152*i* to one or more associated content block data structures 162*i* via associations 164. In this fashion, once the system has identified a communication goal that is appropriate for a user, the system can reference one or more content block data structures that are tailored to fulfill that communication goal (and do so transparently to an end user). The associations 164 can be implemented in any of a number of ways, including but not limited to pointers, linked lists, arrays, functions, databases, files structures or any other method for associating data.

Figure 1D:
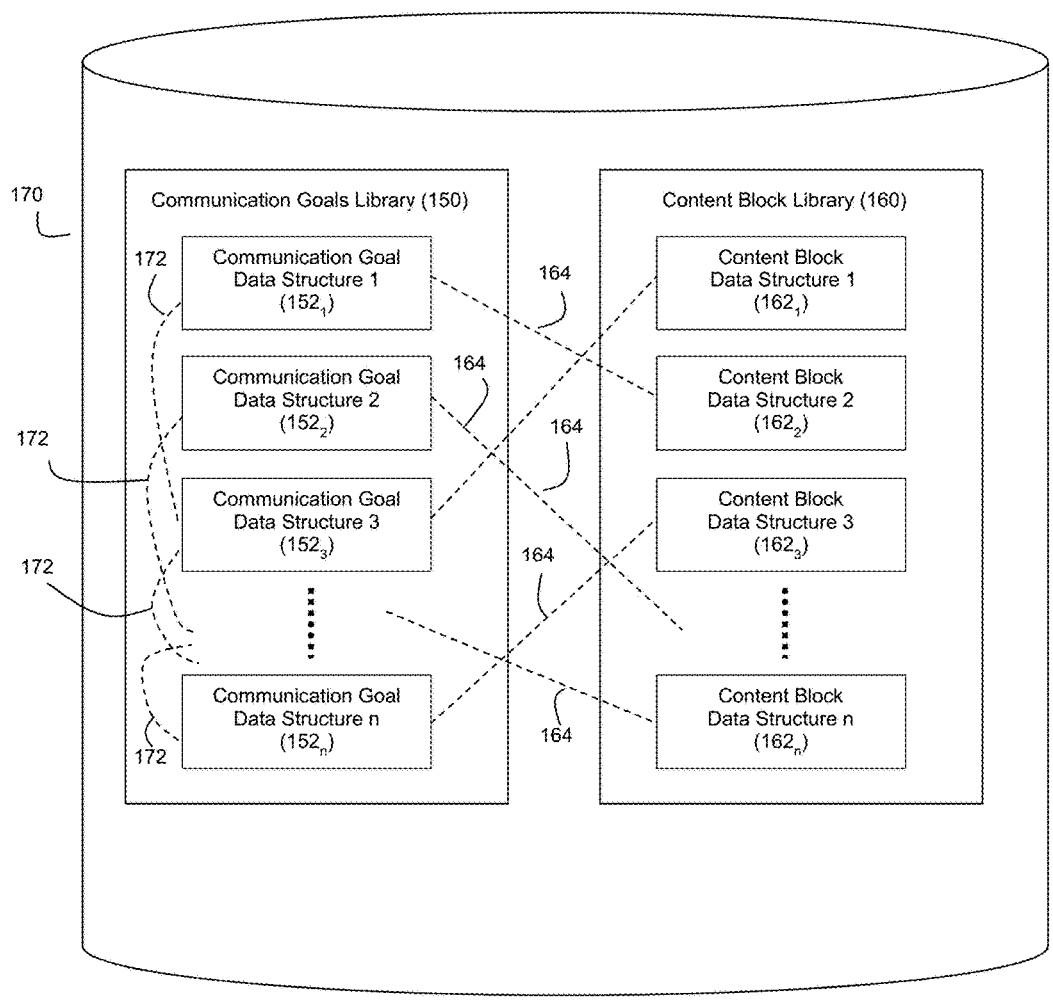
FIG. 1D depicts example data structures within a memory for associating communication goal data structures with content block data structures and other communication goal data structures.

FIG. 1D depicts another example of memory 170 where one or more of communication goal data structures 152*i* are also mapped to related communication goal data structures via associations 172. By associating related communication goal data structures with each other, the system can also support automatic generation of narratives as communication goals evolve. For example, if Communication Goal 2 is a natural follow-up need after Communication Goal 1 has been fulfilled, memory 170 can better support a meaningful automatic generation of narratives by explicitly associating a data structure for Communication Goal 1 with Communication Goal 2. As with associations 164, the associations 172 can be implemented in any of a number of ways, including but not limited to pointers, linked lists, arrays functions, databases, files structures, or any other method of associating data.

Figure 2A:
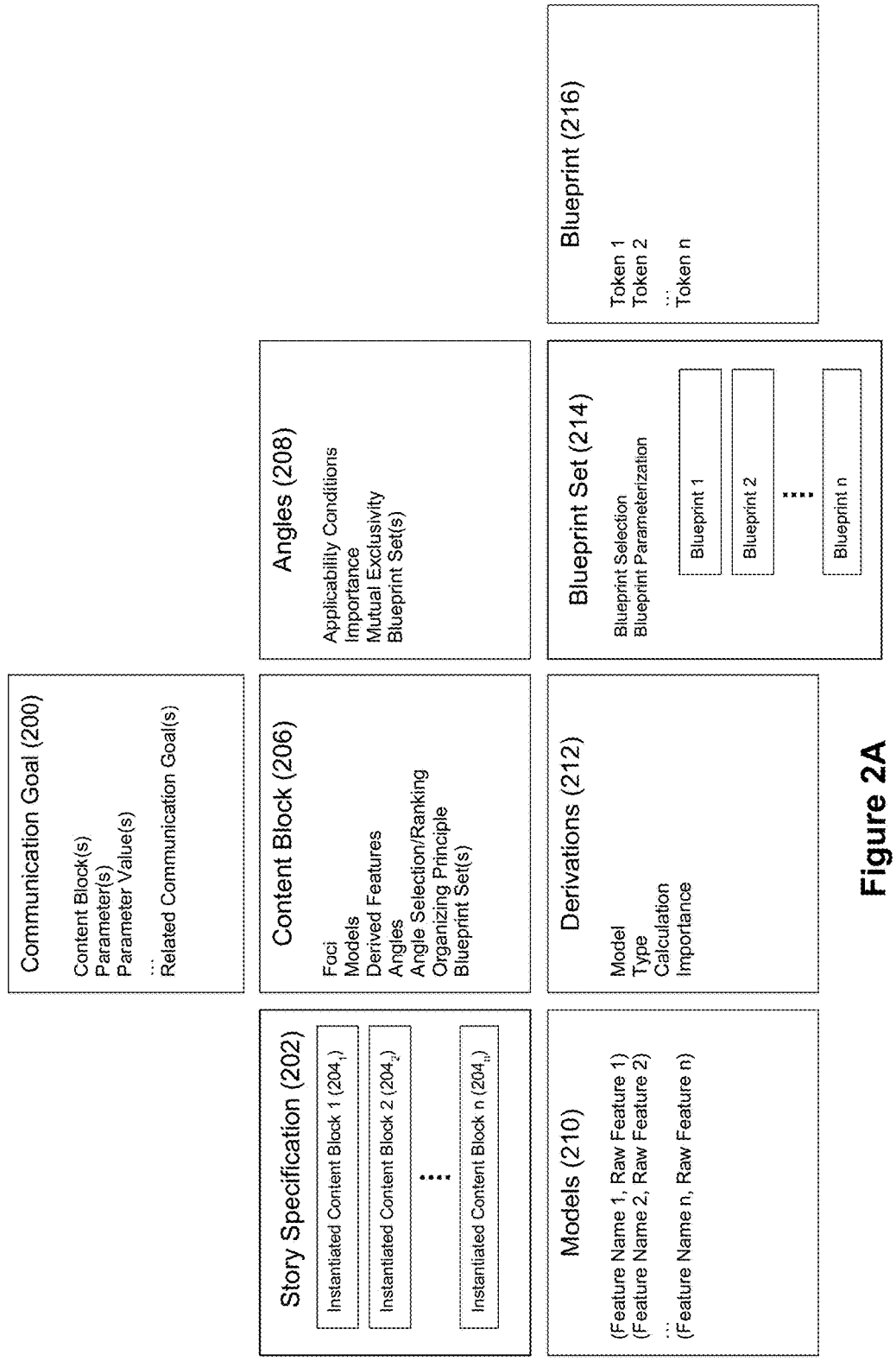
FIG. 2A illustrates an exemplary data model used to automatically generate a narrative story according to an exemplary embodiment.

FIG. 2A shows an example data model for supporting the example embodiment of FIG. 1B. The bottom two rows of FIG. 2A generally correspond to the data model shown by the above-referenced and incorporated U.S. Pat. No. 8,630,844, albeit with the content block data structures 206 becoming more generalized through association with explicit communication goals, parameterization, and with abstract narrative analytic models to render them domain-independent (or at least multi-domain), where interaction with an associated communication goal data structure 200 can be used to create an instantiated content block 204 for inclusion in a story specification 202. With this embodiment, as with the '844 patent, a story specification 202 groups one or more instantiated content blocks 204 and serves as the base model from which a narrative is generated. Such instantiation includes setting parameter values for the content block, such as a parameter determining a subject, entity, top-line metric, or other parameter the content block will use to determine the focus and data with which to generate a narrative section. A content block data structure 206 can include configurable components that specify how it will operate to generate narratives from data. That is, each content block 206 specifies the data and computational components necessary to generate a section of a narrative, including constituent components: models, derived features, angles, angle selection/ranking, organization and blueprint sets, or the constituent component may specify one or more other content blocks. Once these content blocks 206 are instantiated and combined, these sections will constitute the entire narrative being constructed. Each content block 206 can be composed, instantiated and configured by specifying the following elements, among others:

1. Models of the entities (objects, categories, and events) that the narrative generated by the block will describe (e.g., models for the raw data to be analyzed when generating a narrative). These models 210 themselves are structured objects of interest in the content vertical or domain at hand and serve to organize and structure the raw data.

2. The narrative analytic model, which includes, among other things, raw data, derived features, and angles. By combining these constituent components according to a narrative analytic model, the amount and nature of analyzed data, tested angles, and analyzed derived features may be constrained. The relevant kinds of raw data about these entities; these may be directly specified by content blocks as well as indirectly specified through the models, angles, or blueprints included in content blocks. The derived features of interest about these entities, which again may be directly specified by content blocks as well as indirectly specified through models, angles, or blueprints (e.g., via a derivations data structure 212). The angles which interpret the raw and derived data in meaningful ways. Each content block may thus by associated with one or more angles 208 that specify how to assess whether a given angle is an accurate characterization of a data set. The angles 208 in turn specify conditions of applicability expressed in terms of properties of the raw data and derived features, which determine whether the angle is a true or reasonable description or interpretation of the circumstances represented by the data. The angles 208 may also specify importance for the subject angle. Further still, angles 208 may specify a mutual exclusivity attribute that identifies any other angles that are mutually exclusive in relation to the subject angle 208 (e.g., an angle whose applicability conditions cannot be met if the applicability conditions of angle 208 are met). The angles 208 may also specify (jointly with content blocks), through blueprint sets, specific text generation blueprints that will express a data set in specific words or phrases in a manner reflecting the interpretation represented by the angle.

3. The foci of the narrative in the content block, i.e., the specific objects or events that this section of the narrative will primarily be about (e.g., a business, a business location, one or more given teams, games, players, plays, etc.).

4. The angle selection/ranking attributes for the subject content block 206. These attributes can help define which angle or angles will be selected for a content block when multiple angles are deemed to accurately characterize the subject data set.

5. In some cases, the features or specific kinds of attributes of the entities involved which, for a given instance, must be expressed in the story regardless of applicable angle(s) (e.g., for a section of a story about a baseball game which discusses pitching, the required features may be facts such as the number of hits and/or runs allowed). These features could also be associated with blueprint sets that specify how to express these features in the context of the content block.

6. The organizing principle of the text in the content block. For example, are text elements to be ordered chronologically? By "importance"? In a standard, fixed order? Some combination? Etc.

7. The blueprint sets which are indexed by or functions of the angles or features, content blocks, (implicitly) the story type that the story specification is specifying, and the natural language in which the story is to be written (e.g., English, Spanish, etc.). The blueprint sets 214 in turn specify the text generation blueprints 216, which can be parameterizable phrasal patterns that specify the words and phrases to use in describing the angle or feature in the context of the given content block. (The parameterizations of blueprints may include elements to be expressed by other blueprint sets, i.e., phrases are recursively constructed.)

Instantiation may further include executing the resulting story specification formed by the content blocks specified by the communication goal data structures. Executing the resulting story specification results in the production of the actual narrative component specified by the content block.

Once parsed and translated into computer-executable form, the constituent components of a content block 206 delineated above provide the computational and data elements that, when executed, result in the generating of a narrative based on data.

Relative to the '844 patent, with this example embodiment, there exists a new layer for further parameterizing how content blocks can be configured—the communication goal data structure 200. The communication goal data structure 200 of the example embodiment of FIG. 2A serves to connect and provide a mechanism through which content blocks 206 are specified so that the instantiated content blocks 204 are designed to satisfy the communication goal corresponding to the communication goal data structure 200. As illustrated in FIG. 2A, the communication goal data structure 200 may comprise first data that identifies one or more content blocks 206 that are associated with the communication goal data structure 200 (e.g., a content block that defines a model for a narrative that is expected to fulfill the relevant communication goal). This identification can serve as an association 164 as shown by FIGS. 1C and 1D. The communication goal data structure 200 may also comprise second data that identifies a plurality of parameters for the communication goal. These parameters, whose values can be variable, in turn can be used to focus and configure the associated content block(s) 206, as explained below. The communication goal data structure 200 may also comprise third data that identifies one or more parameter values to be used for configuring the associated content block(s) 200. Further still, as discussed in connection with FIG. 1D, the communication goal data structure 200 may comprise fourth data that identifies one or more additional communication goal data structures that are related to the subject communication goal data structure 200.

Because the communication goal data structure 200 of FIG. 2A relates to one or more content blocks and also may relate to other communication goal data structures 295, the communication goal data structure 295 is able to represent why related content should be bundled together. This additional semantic constraint provides guidance in developing these configurations in that it is clear why certain elements are bundled together, which improves the coherence and flexibility of these configurations. In addition, representing communication goals in this way increases the flexibility with which content types generated by the computer system using combinations of such represented communication goal data structures 200.

Figure 2B:
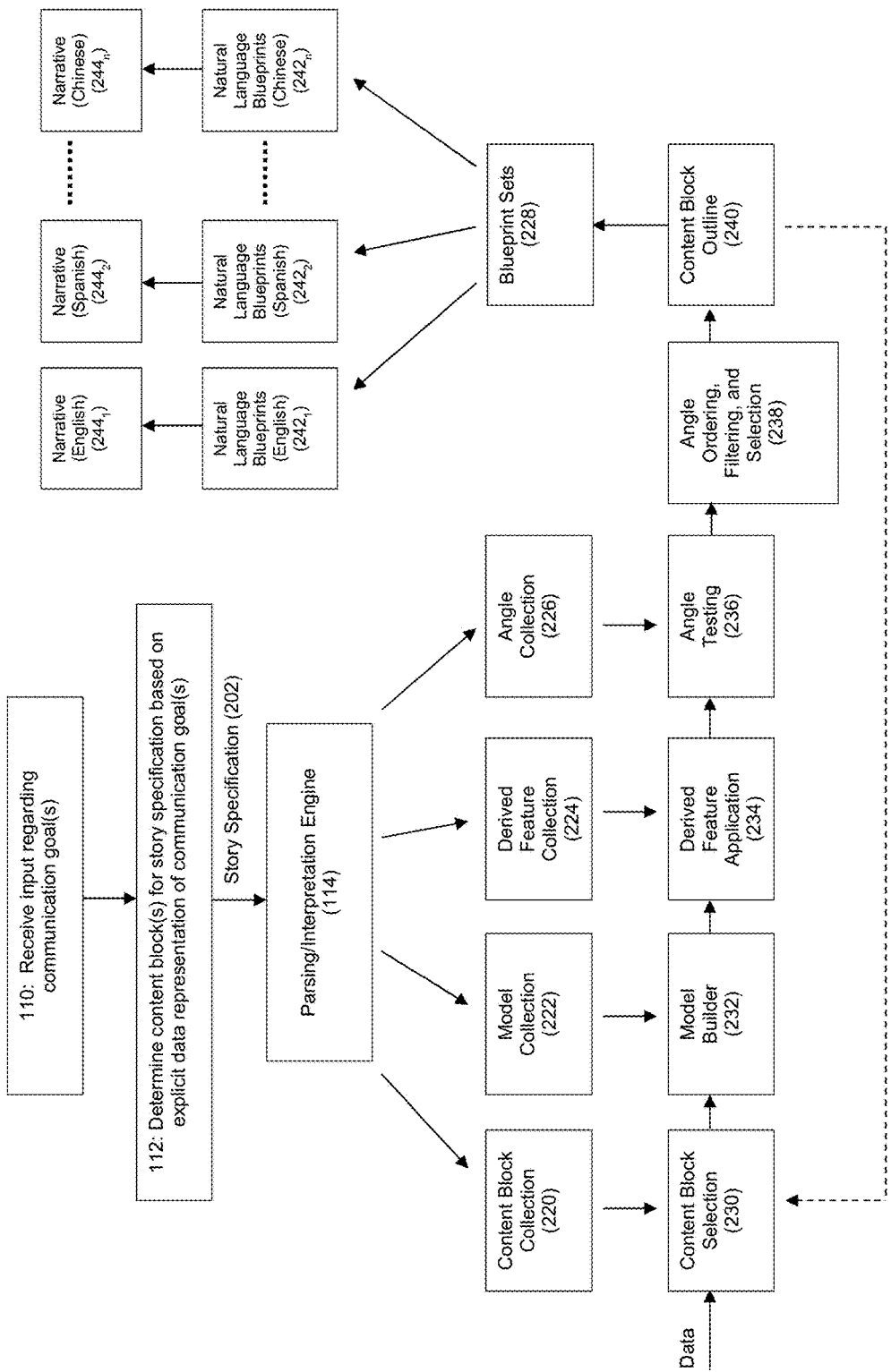
FIG. 2B illustrates another example configuration and process flow for execution by a computer system to automatically generate a narrative according to an exemplary embodiment.

FIG. 2B depicts an example of an expanded view of the system shown by FIG. 1B that accommodates a data model such as that shown by FIG. 2A. As with the FIG. 1B example, the computational processing platform example shown by FIG. 2B serves as a domain-independent, general purpose narrative generation platform.

Steps 110 and 112 operate as described in connection with FIG. 1B to configure a high level story specification (e.g., a story specification 202 as shown by FIG. 2A). The parsing engine 114 parses this story specification 202 into its constituent components and generates executable machine code that serves as part of the narrative generation engine that processes input data to automatically generate narratives tailored to desired communication goal(s).

The parsing engine 114 can build a content block collection 220 from the story specification 202. If the story specification 202 includes only a single content block, the content block collection 220 in turn can comprise a single content block. However, if the story specification 202 comprises multiple content blocks, the content block collection 220 can be an ordered listing of these content blocks.

The parsing engine can also build a model collection 222 based on the story specification 202, where the model collection 222 serves to identify and constrain the data to be processed by the system. Likewise, the parsing engine can build a derived feature collection 224, an angle collection 226, and blueprint sets 228 based on the story specification 226.

Processing logic instantiated as a result of the parsing engine 114 operating on the story specification 202 can then provide for content block selection 230. For example, when first processing data, the processing logic can select the first content block of the story specification in the content block collection 220. The processing logic can further build models for the data and compute any derived features that are necessary in view of the story specification (232 and 234). At 236, the processing logic tests the relevant angles for the subject content block in the angle collection 226. This operation can involve testing the specific data and derived features under consideration against the applicability conditions for the relevant angles. Based on which angle(s) is (are) deemed to accurately characterize the data and derived features, the processing logic can further order, filter, and select (238) one or more angles to be included in the narrative. As explained above and in the above-referenced and incorporated patents and patent applications, attributes of the subject content block and angle data structures can facilitate this decision-making.

Once the data has been modeled, the derived features have been computed, and one or more angles have been selected, the narrative generator instantiates a content block outline 240. The instantiated content block outline 240 can be a language-independent representation of the angles and features to be expressed for the section of the narrative represented by the subject content block, as described in the '844 patent.

If the story specification 202 comprises multiple content blocks, the execution can return to step 230 for the selection of the next content block for the story specification. Otherwise, the content block outline 240 is ready to be converted into human-interpretable form via blueprint sets 228.

Each content block is linked to one or more blueprint sets 228, each containing parameterizable blueprints to express the angles and/or features determined within that content block in natural language, for example English $242_2$, Spanish $242_2$, and any other desired languages such as Chinese $242_n$, etc. When selected and parameterized, these result in generating the actual text of the narrative in the desired language(s) (see $244_1$, $244_2$, ... $244_n$).

Thus, the example embodiment of FIG. 2B processes input relating to communication goals and, transparently to the user, configures the higher-level editorial components expressed in the story specification 202 based on this input, and uses the so-tailored story specification 202 to guide the construction of genuine programmatic data structures, expressed in a lower-level, general-purpose programming language. By permitting the user input to focus on the higher level communication goals to be achieved by a narrative, the example embodiments described herein represent a significant technical improvement over the pioneering work described in the '844 patent.

Figure 2C:
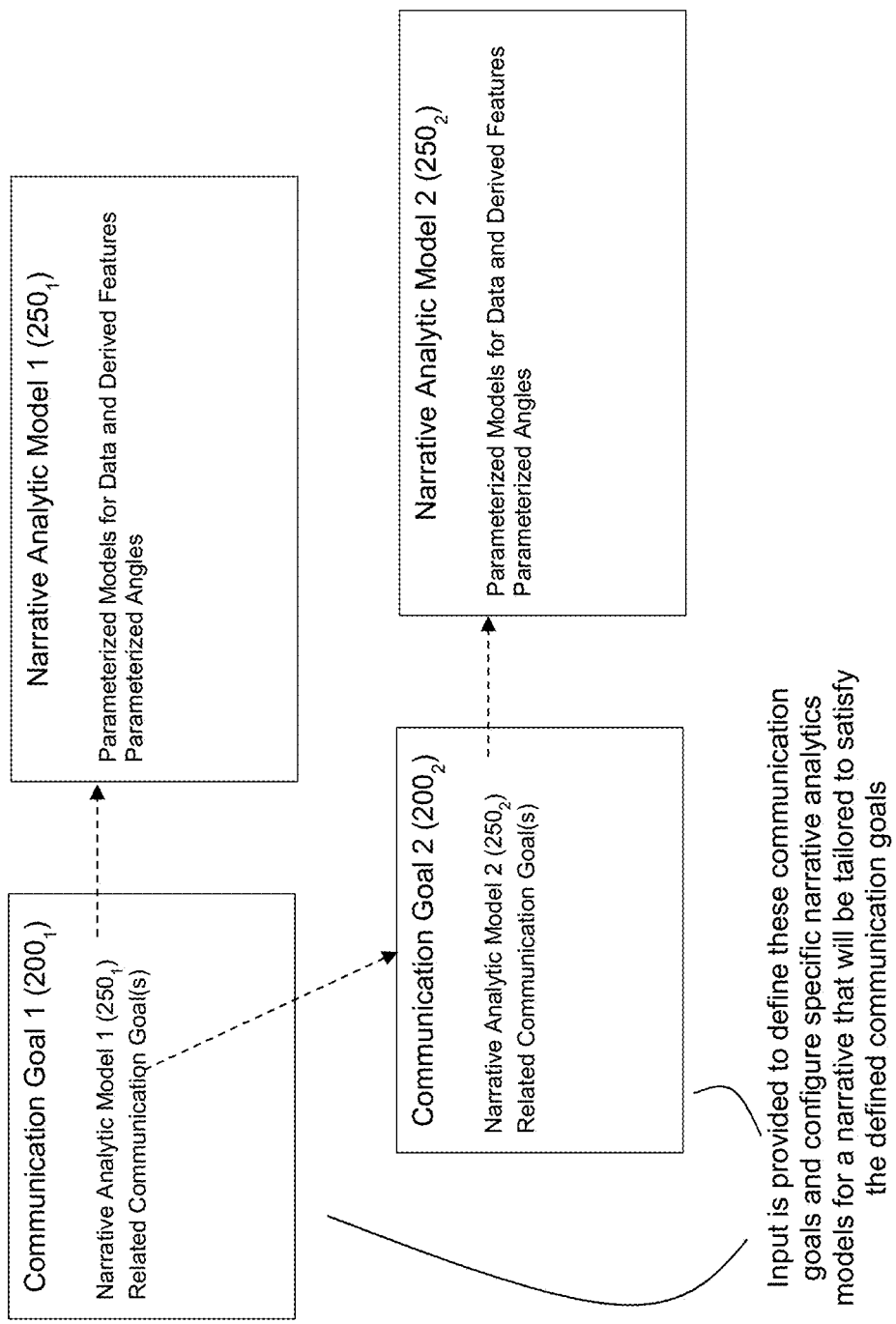
FIG. 2C illustrates an exemplary association between a communication goal data structure and narrative analytic models.

While the example of FIG. 2B depicts how a data model such as that shown by FIG. 2A can be tailored to model narratives based on explicitly represented communication goals, it should be understood that other techniques can be used to generate narratives from explicit representations of communication goals. For example, communication goal data structures can be mapped to narrative analytic models more generally rather than the specific content block arrangements shown by FIGS. 2A and 2B. Thus, as shown by FIG. 2C, communication goal data structures 200*i* are associated with narrative analytic models 250*i*. The narrative analytic models 250*i* are high level domain-independent models that specify how data can be expressed and analyzed in a particular fashion relevant to the construction of a narrative. The narrative analytic models 250*i* may comprise parameterized models for data and derived features and parameterized angles. Through such parameterization, the narrative analytic models 250*i* are not specific to any domain or content vertical. Through linkages with communication goal data structures 200*i*, and through input that defines the communication goals corresponding to these communication goal data structures 200*i*, the narrative analytic models can be further specified and constrained for application to a particular domain in satisfaction of a desired communication goal. Blueprint sets may also be specified by the narrative analytic models, for example by the angles or angle families they include, and the content blocks. In this way, blueprint sets specify language that is needed to convey aspects of the analytic findings. FIG. 2C further illustrates how the relationships between communication goals can be leveraged to indirectly link different narrative analytic models 250*i*.

Figure 2D:
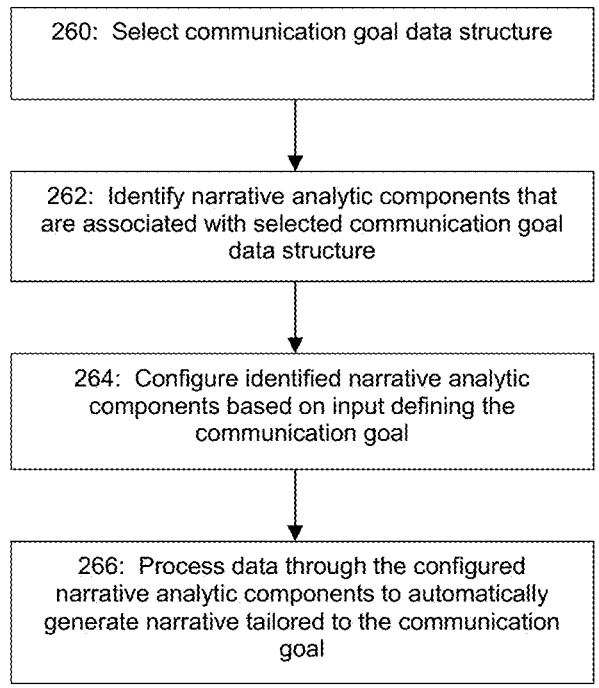
FIG. 2D shows an example process flow for execution by processor where narrative analytic components are configured based on communication goals.

FIG. 2D shows an example process flow for execution by processor 102 where narrative analytic components are configured based on communication goals. At step 260, a communication goal data structure is selected. This communication goal data structure can be associated with one or more narrative analytic components (see, for example, narrative analytic models 250*i* in FIG. 2C). At step 262, the processor identifies the narrative analytic components that are associated with the selected communication goal data structure. At step 264, these narrative analytic components are configured based on input that further defines the communication goal. A narrative can then be automatically generated by the processor processing a data set using the configured narrative analytic components (step 266). In other words, a communication goal data structure may specify at least one content block, and a content block specifies an appropriate narrative analytic model. The steps of this process may be automatic or may occur in reaction to input from a user, for example in the interactive mode.

Figure 3A:
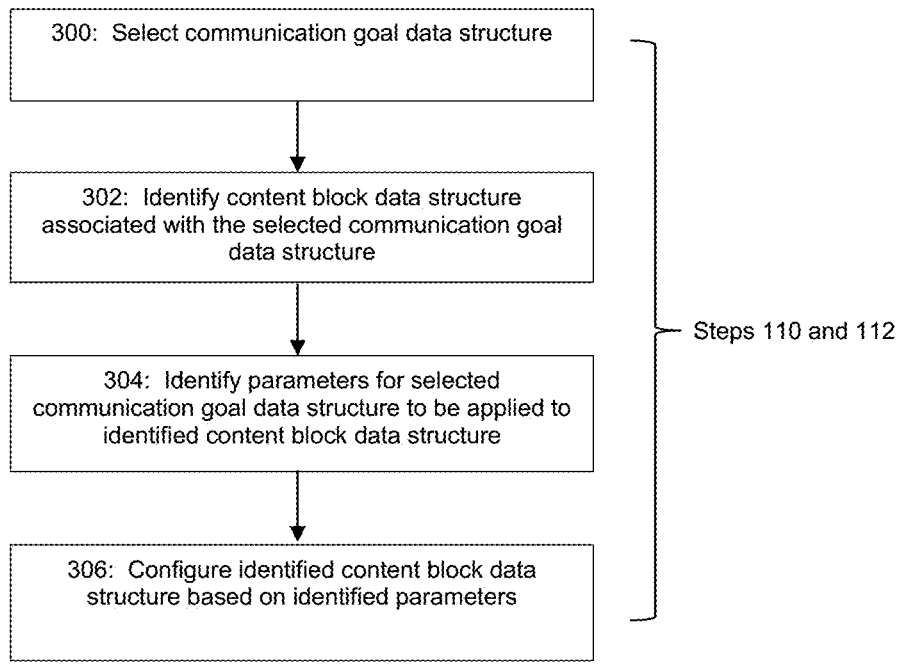
FIGS. 3A-3D illustrate examples of process flows that can be executed by a processor to configure content blocks based on explicit data representations of communication goals.
Figure 3B:
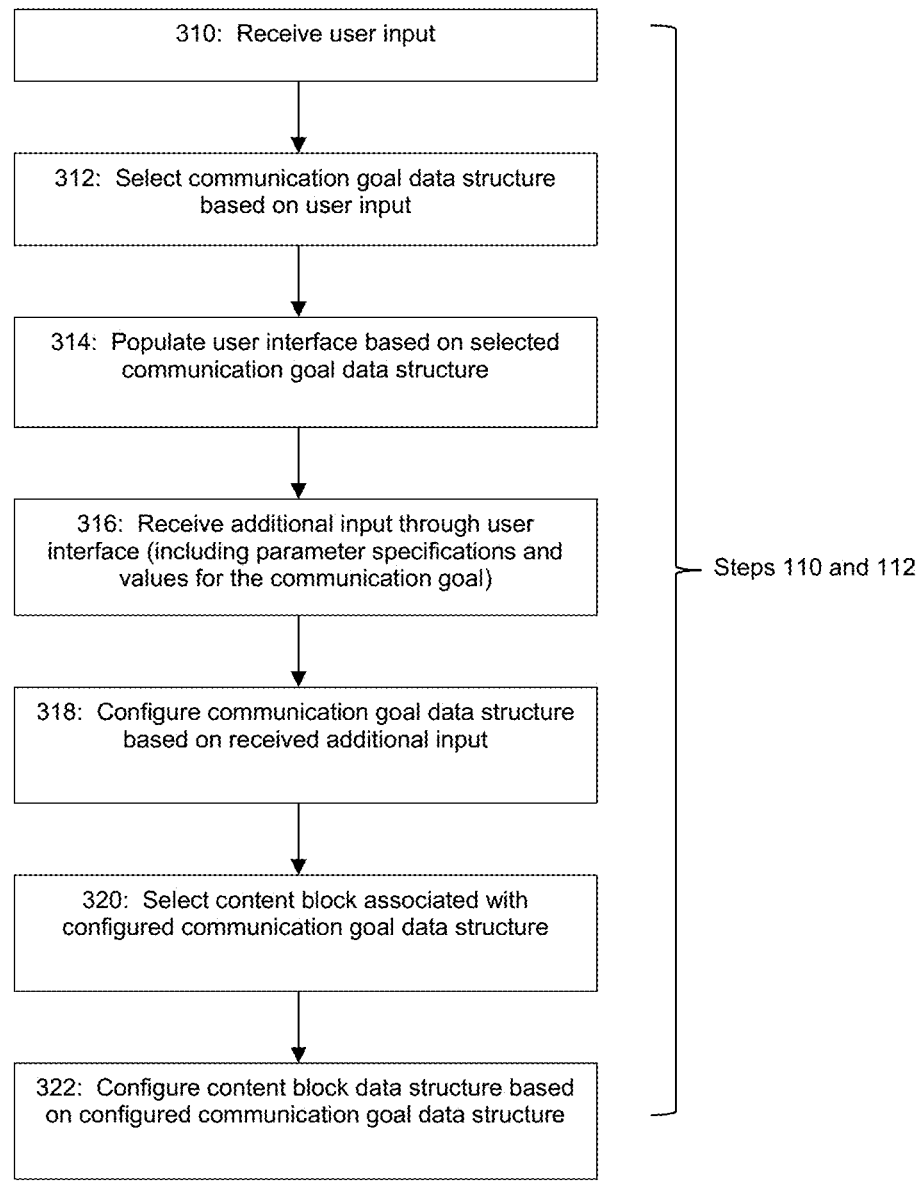
Figure 3C:
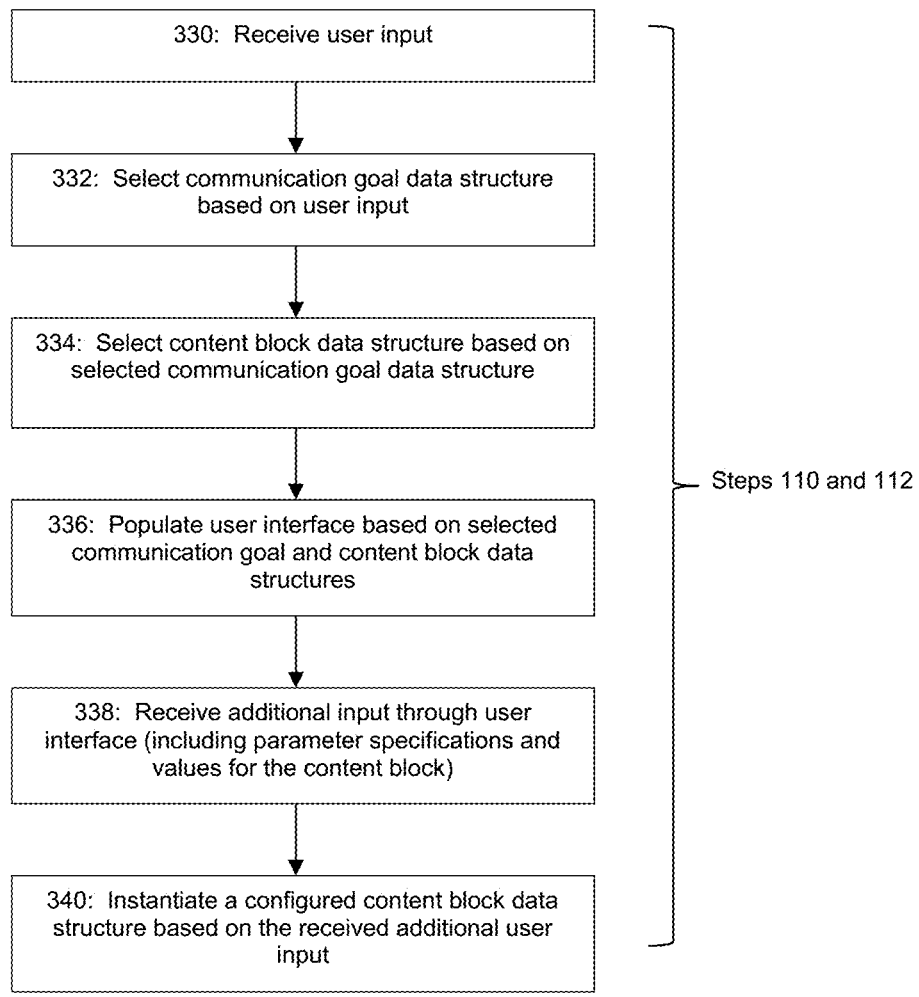

Any of a number of techniques can be used to implement steps 110 and 112 shown by FIGS. 1B and 2B; examples of which are shown by FIGS. 3A-C.

Referring to FIG. 3A, at step 300, a communication goal data structure is selected. Then, at step 302, the processor identifies a content block data structure associated with the selected communication goal data structure (see associations 164 in FIGS. 1C and 1D; see also the communication goal data structure 200 of FIG. 2A). At step 304, the processor identifies parameters for the selected communication goal data structure that are to be applied to the identified content block data structure to tailor the content block data structure in accordance with the desired communication goal. At step 306, the content block data structure is configured based on these identified parameters. If the desired narrative involves only a single content block, then this configured content block produced by step 306 can serve as the story specification. Otherwise, the process flow of FIG. 3A can be repeated for additional communication goals relating to the desired narrative to configure additional content blocks for the story specification.

Figure 7:
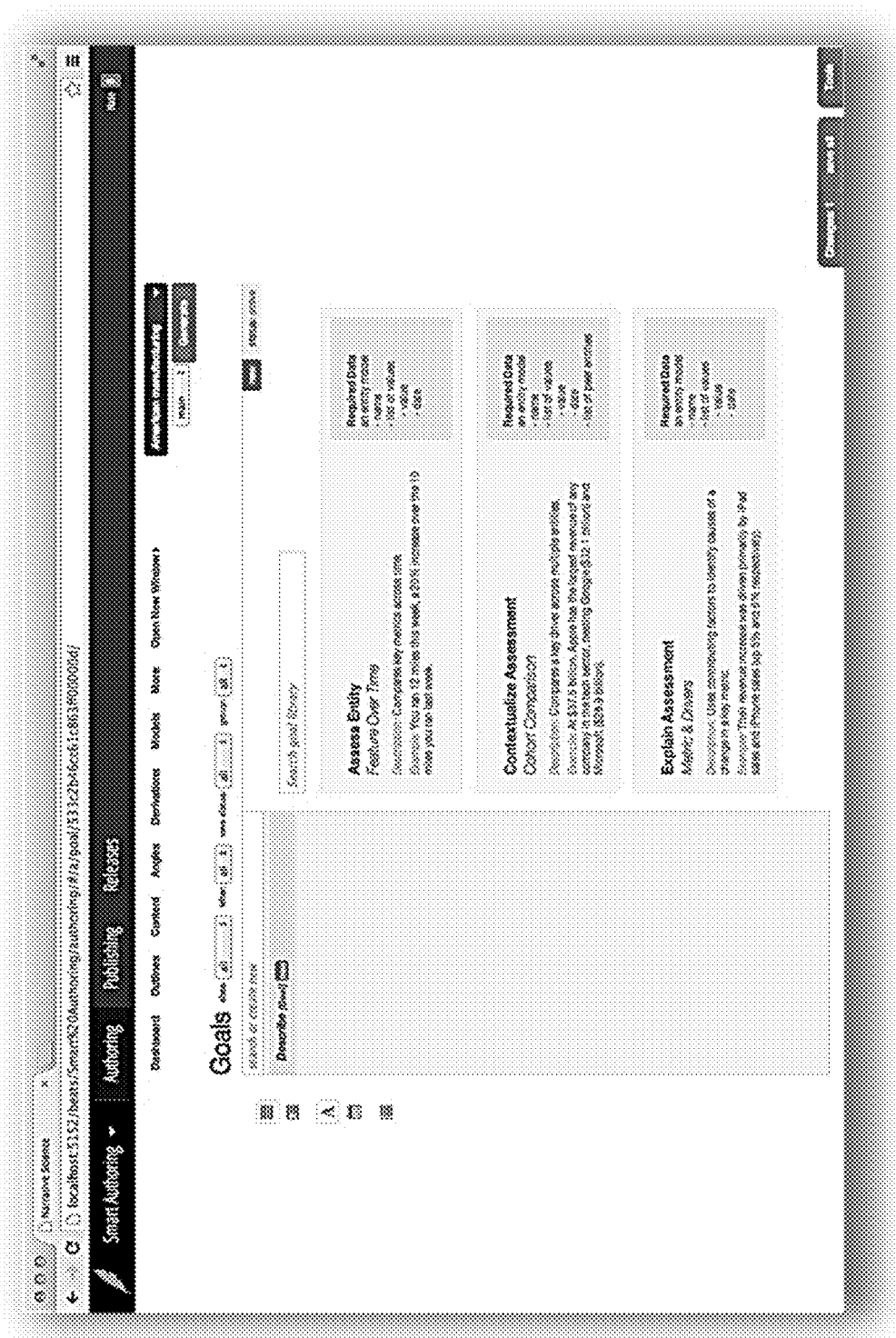
FIGS. 7-21 illustrate screenshots of a configuration tool graphical user interface for configuring the communication goal data structures and associated narrative analytics according to an exemplary embodiment.

FIG. 3B depicts an expanded example of a process flow for steps 110 and 112 for an authoring mode where the user is interacting with a configuration tool GUI. In this example, at step 310, the processor receives user input. Based on this user input, the processor selects a communication goal data structure (step 312). The nature of this user input can vary by use case. For example, in an authoring mode, the user input can be a direct selection of a communication goal data structure from a library of communication goal data structures. Alternatively, the user may define and configure a new communication goal data structures, which will be added to the library of communication goal data structures. An example of a user interface that is configured to receive user input for selecting a communication goal data structure is shown by FIG. 7, discussed below.

At step 314, the processor populates a user interface for presentation to the user, wherein the user interface is populated with data entry fields and information based on the selected communication goal data structure. Examples of such user interfaces are discussed below in connection with FIGS. 8-21.

At step 316, the processor receives additional input through the user interface, where this additional user input further defines the communication goal. For example, the user input can specify the parameters that are to be addressed as part of the communication goal as well as values for these parameters. The example user interfaces of FIGS. 8-21 show various forms this additional user input may take.

At step 318, the processor configured the selected communication goal data structure based on the additional input received at step 318. In turn, the processor selects the content block data structure that is associated with the selected communication goal data structure (step 320), and the processor configured this selected content block data structure based on the configured communication goal data structure from step 318 (step 322). In doing so, the content block data structure becomes tailored to the user's communication goal.

FIG. 3C depicts another example embodiment for implementing steps 110 and 112 again for an authoring mode where the user is interacting with a configuration tool GUI. Steps 330 and 332 proceed similarly to steps 320 and 322 of FIG. 3A. However, steps 334 and 336 operate to tailor the user interface to not only the selected communication goal data structure but also the content block data structure(s) associated with the selected communication goal data structure. Thus, at step 334, the processor selects the content block data structure that is associated with the selected communication goal data structure, and at step 336, the processor populates a user interface based on the selected communication goal and content block data structures. FIGS. 8-21 can also serve as examples of user interfaces that can generated in this regard. Thereafter, at step 338, the processor receives additional input through the user interface (e.g., parameter specifications, etc.) that are used to configure the content block data structure to tailor the content block data structure to the user's communication goal (step 340).

Figure 3D:
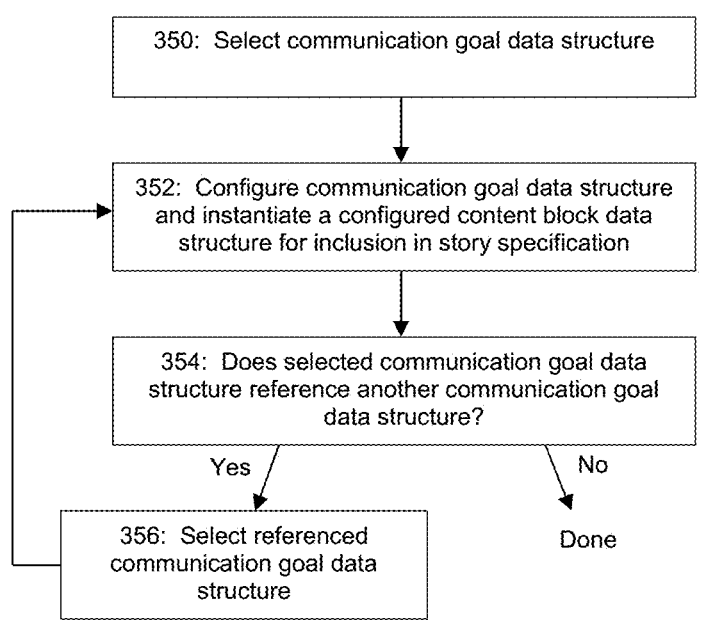

As explained in connection with FIGS. 1D and 2A, communication goal data structures may also reference other related communication goal data structures. This referencing permits a narrative to be generated that accommodates anticipated evolutions of communication goals as information is presented to a user. FIG. 3D shows an example process flow for leveraging these related communication goals. At step 350, a communication goal data structure is selected, and at step 352, the processor configures the communication goal data structure and creates a configured content block data structure for inclusion in a story specification. At step 354, the processor checks whether the selected communication goal data structure references another communication goal data structure. If not, the process flow can terminate. However, if it does, then the processor at step 356 can select the referenced communication goal data structure and return to step 352. In this way, a story specification can be built that accommodates multiple related communication goals.

Using Communication Goals to Focus Narrative Analytics and Constrain the Data Needed to Support Narrative Generation:

With example embodiments, algorithms, analysis, and data do not drive the story, but are invoked and utilized to create the story after the structure of the story has been specified according to the selected communication goals. This technique stands in contrast to others where a story is generated based solely on the data or based on some ad hoc determination. In example embodiments described herein, processing is constrained based on the specified communication goal data structure 200. In other words, the data analyzed, and the manner in which the data are analyzed, are constrained based on the communication goal(s) and the requirements of fulfilling the communication goal.

Figure 4A:
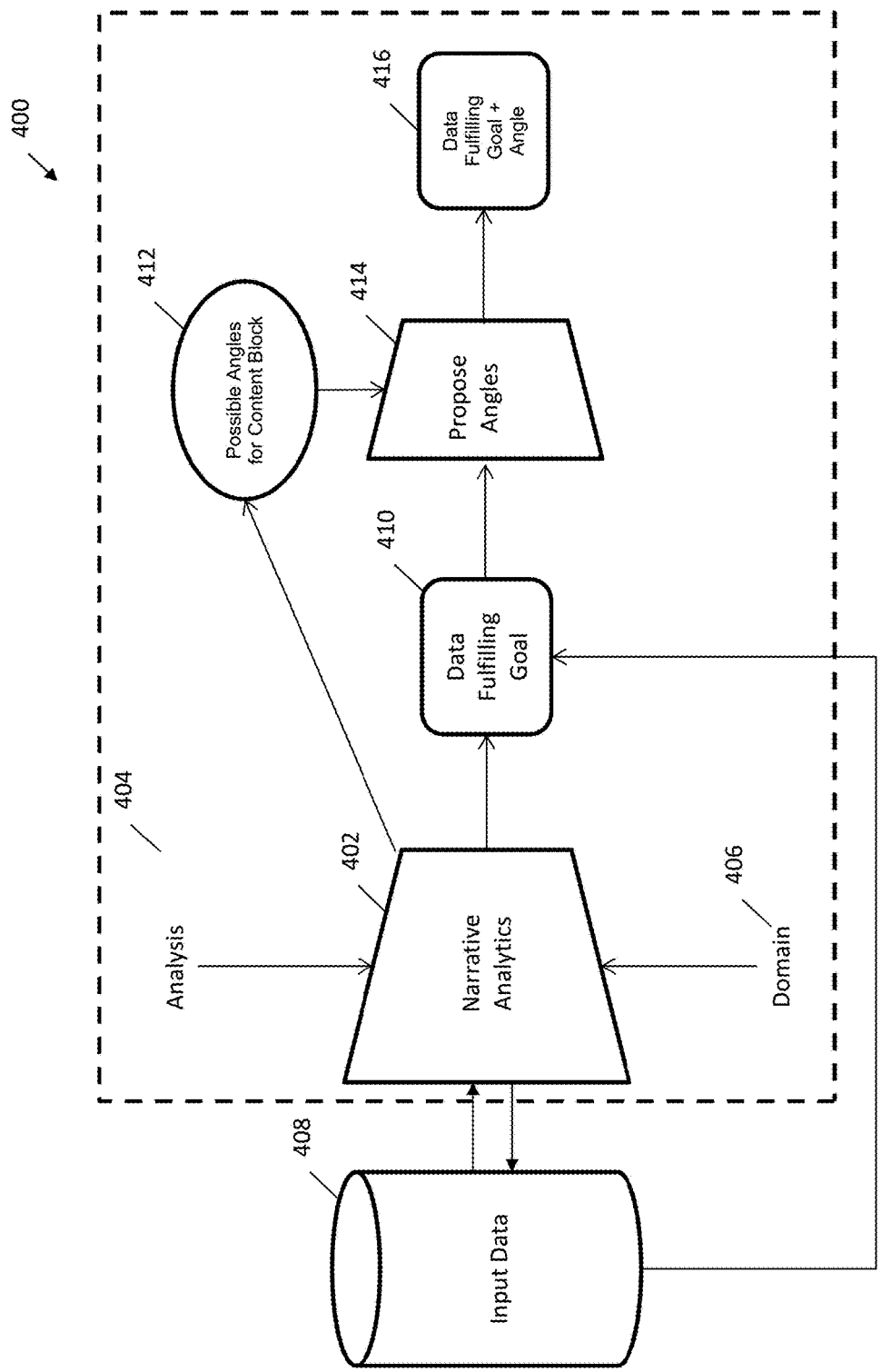
FIGS. 4A-4B illustrate narrative analytic model components used to specify and analyze data used to fulfill a narrative goal represented by the communication goal data structure according to an exemplary embodiment.

FIG. 4A illustrates an example system 400 that shows how explicitly represented communication goals can be used to focus narrative analytic models and constrain the data set that is needed to support automated narrative generation. A narrative analytic model is a generalized and rational collection of appropriate data analytic methods (e.g., derived features) and angles. The narrative analytics component 402 may receive or specify or reference analysis constraints 404 and/or a second parameter 406 related data. The analysis constraints 404 and the second parameter 406 together work to constrain the nature and amount of input data 408 analyzed or processed by the narrative analytics 402. Rather than review all the input data 408, which may be a huge data base (e.g. a Big Data data set), the narrative analytics 402 can be configured to specify only the data necessary to achieve the specified communication goal. In this way, a narrative analytics model 250i provides invaluable guidance regarding what data needs to be collected, and how that data should be modeled and ingested, in order to generate a narrative of a given kind, fulfilling given communication goals about a certain entity or class of entities. The data specified to fulfill the communication goal may be constrained based on the analysis constraints 404 and the second parameter 406. Furthermore, the number of angles 208 to be tested during narrative generation can also be constrained based on the selection and specification of a narrative analytic model 250i. Due to the specified communication goal data structure 200 and the second parameter 406, the nature and number of angles 208 that are appropriate for testing in order to fulfill the communication goal is limited. As a result, the narrative analytics 402 limits the pool 412 of angles 208 for testing based on the analysis constraints 404 and domain constraints 406.

After the narrative analytics 502 gathers the data 410 for analysis to fulfill the communication goal, the system 400 may apply angles from pool 412 against the data 410 to identify which angle or angles are deemed to accurately characterize the data 410. It should be understood that data 410 may include derived features computed from input data based on the constrained narrative analytics 402. An angle whose applicability conditions are met by data 410 can then be proposed (414) for inclusion in a data assembly 416 that includes data from data 410. Applicability conditions are described in greater detail with reference to U.S. Pat. No. 8,374,848. Once the system 400 determines the data assembly 416, it is ready to automatically render the narrative from such a data assembly 416 (e.g., using blueprint sets) to create a narrative expressed in a natural language understood by a human reader. As such, the data assembly 416 can be represented by a content block outline as shown above and discussed in the '844 patent.

Figure 4B:
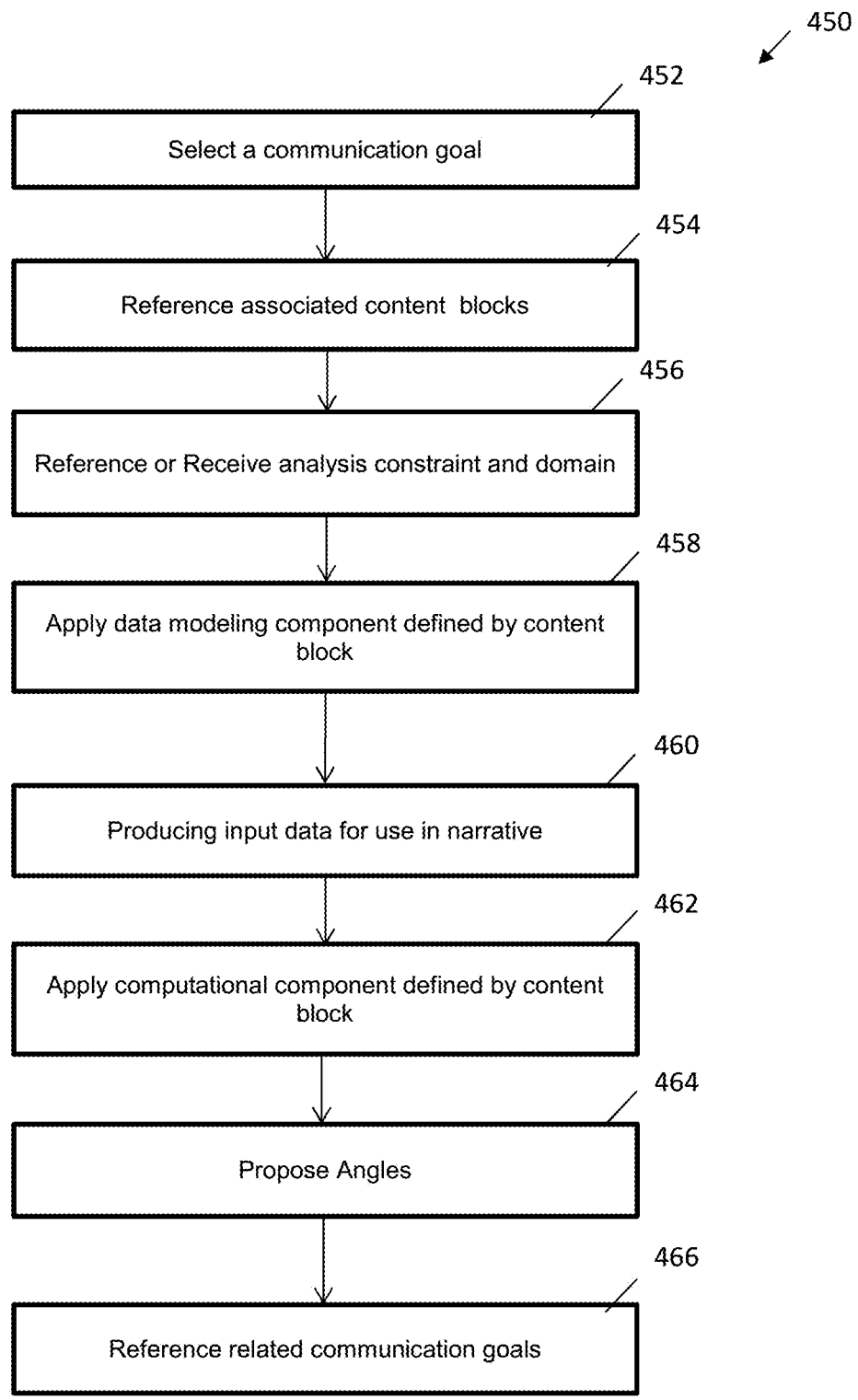

An example process flow 450 for generating a narrative based on constrained narrative analytics is illustrated in FIG. 4B. The process flow 450 includes step 452 and 454 whereby a communication goal data structure is selected and its associated content block data structure is referenced. These steps can operate similarly to steps 300 and 302 from FIG. 3A.

At step 456, the processor 100 may receive or determine the analysis constraints 404 and the domain constraints 406. The processor 100 may receive these constraints as input from the user, or the processor 100 may be able to determine these constraints based on analysis of existing data associated with the subject communication goal. For example, in some embodiments, the selected communication goal data structure 200 may define constraints 404 and/or 406.

At step 458, the processor applies one or more of the data modeling components defined or specified by the content block referenced at step 454. These data modeling components serve to constrain and specify the nature of the data that is to be ingested when generating narratives. At step 460, the processor gathers input data in accordance with these data models. As noted, the gathered input data may only be a small subset of a larger data set.

At step 462, the processor applies one or more of the computational components defined or specified by the content block referenced at step 454. For example, these computational components may specify one or more derived features that need to be computed from the gathered input data. These computational components may also test the gathered input data and any computed derived features against the applicability conditions of any angles that are relevant for the subject narrative analytics.

At step 464, the processor will propose one or more angles that are to be expressed in the resultant narrative. These proposed angles can be combined with the gathered input data and computed derived features to create a content block outline.

Lastly, the processor at step 466 references any related communication goal data structures with respect to the communication goal structure selected at step 452 If there is not a related communication goal data structure, the process 450 ends. If there is a related communication goal data structure, the process 450 can repeat itself using the related communication goal data structure.

Example: Performance Report

Figure 5A:
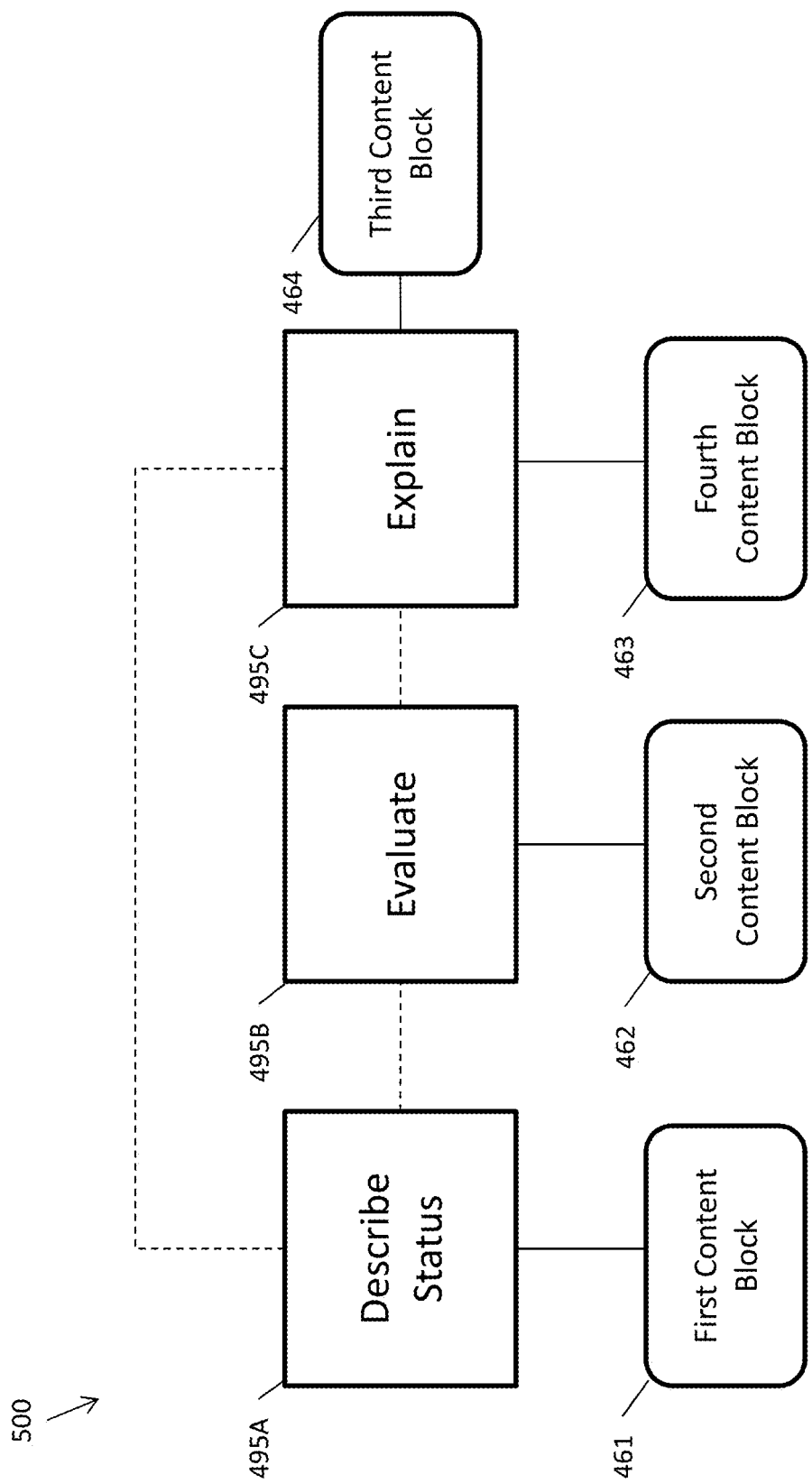

Due to the interrelationships between the communication goal data structures 200, selection of one communication goal 200 may define an entire story specification 202. FIG. 5A illustrates an example of a communication goal interrelationship, where three communication goals are related and are used to instantiate four content blocks when a first communication goal is to describe the status for a subject. For example, the story specification 202 illustrated in FIGS. 5A-5D may be a performance report for an entity.

For example, a first communication goal may be a "describe subject status" communication goal data structure 495A for a subject. The describe subject status communication goal data structure 495A defines a model for describing the subject's overall performance in terms of available data about the subject. As part of that model, the describe subject status communication goal data structure 495A calls a first content block 461. The first content block 461 may specify a model for describing the subject's status in terms of one or more metrics and how those metrics have changed over the recent past, which may involve describing the trajectory of those metrics.

Because a reader naturally expects an explanation and evaluation of the subject's status ("Why?", and "How good or bad is this?"), the describe subject status communication goal data structure 495A may relate to an evaluate subject status communication goal data structure 495B and an explain subject status communication goal 495C. The interrelationships among the communication goals 495A, 495B, and 495C are illustrated by the dashed lines in FIG. 4.

The evaluate subject status communication goal data structure 495B may call, for example, a second content block 462 that specifies a model for informing the reader what the subject's status means—is the subject's current status (the reported values of its metrics and their trajectories) good or bad? Furthermore, the explain subject status communication goal data structure 495C may specify a model for explaining why the subject's status has changed. As an example, the explain subject status communication goal data structure 495C may call a third and fourth content block 463, 464 that are designed to model how the communication goal of explaining the subject's status to the reader can be fulfilled.

Because the communication goal data structure 200 serves as the first data structure accessed by the processor 100 when automatically generating a narrative, the communication goal corresponding to the accessed communication goal data structure drives the generation of the story. As mentioned previously, algorithms, analysis, and data do not drive the story, but are invoked and utilized to create the story after the structure of the story has been specified according to the selected communication goals. Again, this technique stands in contrast to others where a story is generated based solely on the data or based on some ad hoc determination. In an example embodiment described herein, processing is constrained based on the specified communication goal data structure 200. In other words, the data analyzed, and the manner in which the data are analyzed, are constrained based on the communication goal and the requirements of fulfilling the communication goal.

It should be noted that communication goal data structures 200 may be linked into a story specification 202. For example, in the performance report for a subject (e.g. a retail store) described above, the initial communication goal might be "describe the status of the store" or said differently, "how is my store performing?" With this communication goal in mind, a story structure including the describe subject status communication goal data structure 495A, the evaluate subject status communication goal data structure 495B, and the explain subject status communication goal data structure 495C may comprise the entire performance report story specification 202. The performance report narrative may include other communication goals depending on the needs of the reader. For example, the reader may want to know whether he or she can expect his/her store to improve or decline. To fulfill this narrative goal, the processor 100 may include a communication goal data structure 200 that predicts future performance. Another store owner may want help on how to improve his store. To fulfill this narrative goal, the processor 100 may include an advise communication goal data structure 200 configured to offer suggestions on how to promote or maintain improvements or prevent declines in store performance in key metrics.

After determining the communication goal data structures 200, the computer system 104 may access the referenced content blocks 206 specified by the communication goal data structure 200. The content blocks 206 of the exemplary embodiments described herein include specially-configured narrative analytics models that are capable of fulfilling the overarching communication goal of each section of the narrative and the narrative as a whole. In this way, the content blocks 206 themselves specify the data that is necessary in order to fulfill the specific narrative goal represented by the communication goal data structure 200, and the narrative analytics models referenced by the content blocks 206 may specify angles (or angle families) that capture the appropriate characterizations or analyses of data in terms of important patterns that will determine what is to be expressed in the narrative. The content blocks may also specify blueprint sets that are associated with the content blocks and the angles for use when expressing information relevant to an angle within a narrative. An example narrative analytics model for a content block 206 is shown in connection with element 206 of FIG. 3 in the above-referenced and incorporated '844 patent.

Figure 5B:
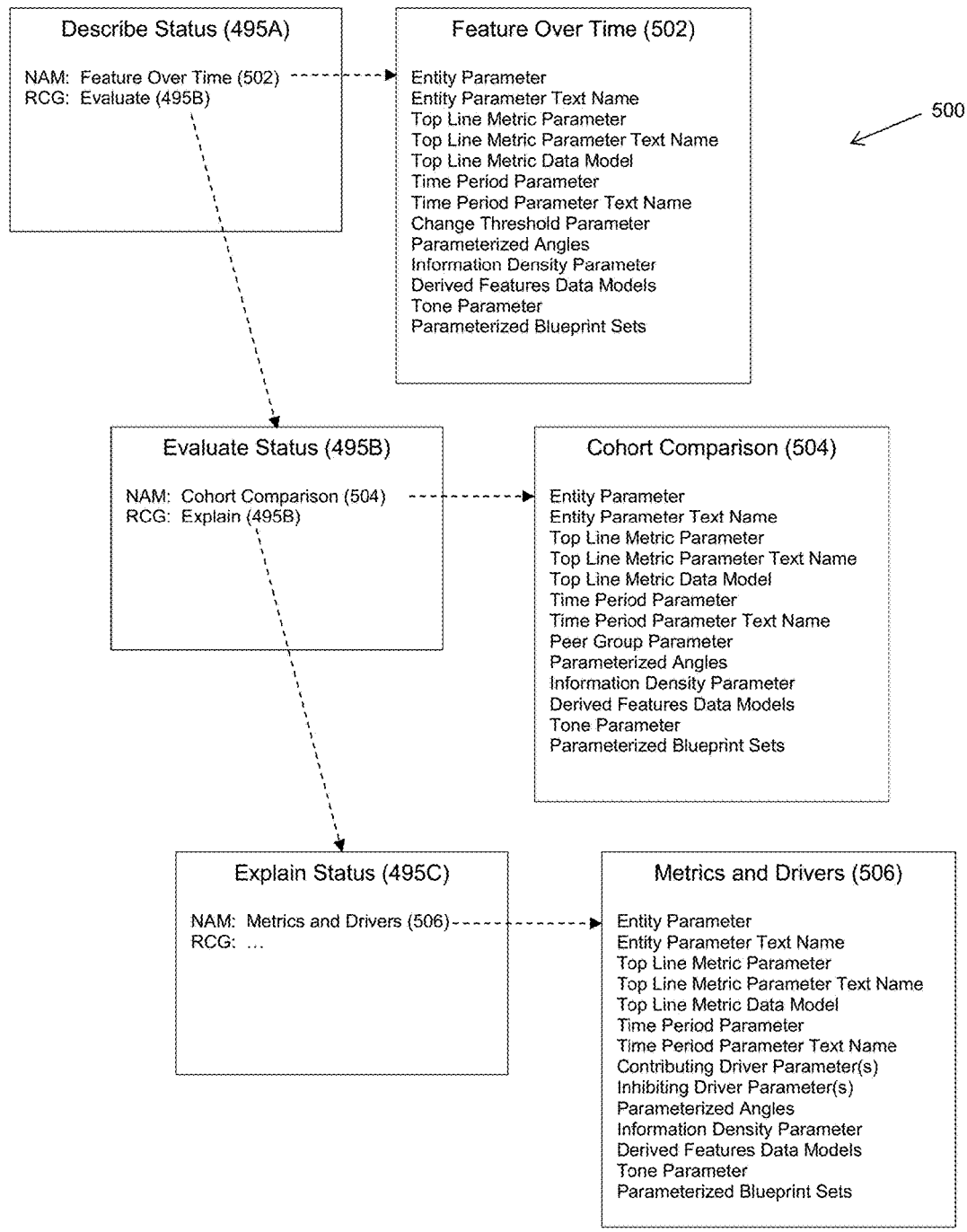
Figure 5C:
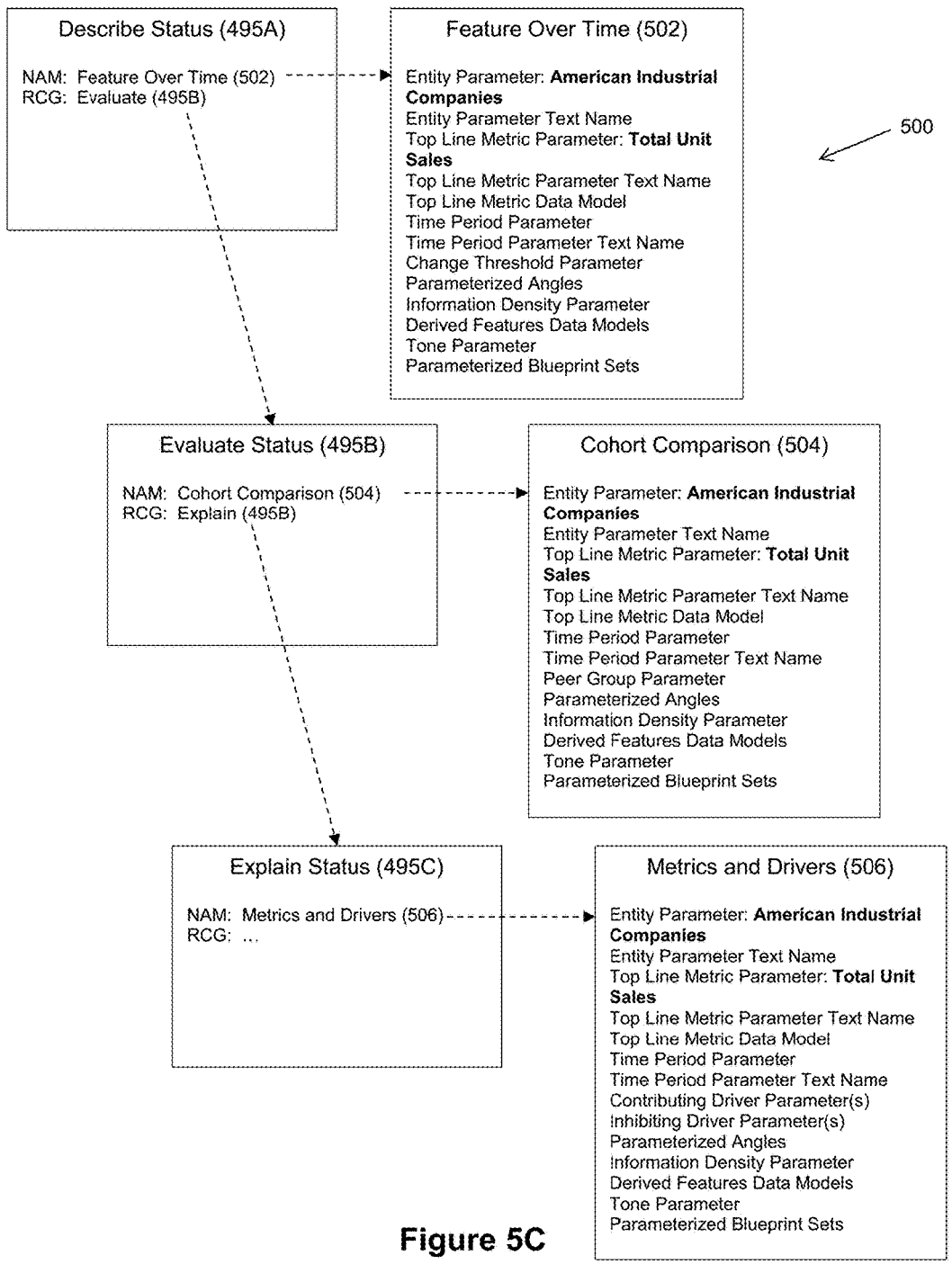

FIGS. 5B, 5C and 5D demonstrate how the computer system 104 generates a performance report story specification 202 using the communication goal data structures 495A-495C illustrated in FIG. 5A. Referring to FIG. 5B, the performance report story specification 500 includes three communication goal data structures: a describe status communication goal data structure 495A, an evaluate status communication goal data structure 495B, and an explain status communication goal data structure 495C. Each communication goal data structure 495A-495C is related to a narrative analytic model. For example, the describe status communication goal data structure may be related to a feature-over-time narrative analytic model 502, the evaluate status communication goal data structure 495B may be related to a cohort comparison narrative analytic model 504, and the explain status communication goal data structure 495C may be related to a metrics and drivers narrative analytic model 506. In addition to relationship with narrative analytics models, some communication goal data structures are related to other communication goal data structures. For example, the describe status communication goal data structure 495A stores as fourth data a relationship to the evaluate status communication goal data structure 495B (as illustrated by the dashed line in FIG. 5B), and the evaluate status communication goal data structure 495B is related to the explain status communication goal data structure 495C. Thus, by accessing the describe status communication goal data structure 495A, an entire performance report story specification 500 is created due to the relationships between communication goal data structures. While three specific narrative analytic models have been described, each communication goal data structure may reference one or more other narrative analytic models. For example, the evaluate communication goal data structure may relate to a historical value narrative analytic model that compares an entity's current performance to historical performance for the same entity.

FIG. 5B illustrates that each narrative analytic model 502-506 defines various parameters, which the computer system 104 gives values so that the computer system 104 is constrained in the data analyzed. For example, each narrative analytic model may include parameters such as an entity parameter, an entity parameter text name, a top-line metric, top-line metric parameter text name, a top-line metric data model, a time period parameter, a time period parameter text name, parameterized angles, an information density parameter, derived feature data models, a tone parameter, an parameterized blue print sets. Together, these parameters comprise the first data and the second data described above. Also, these parameters may represents the analysis constraints 404 and the second parameter 406 described above. Each narrative analytic model 502-506 may have some or all of these parameters, and the values of the parameters may differ from narrative analytic model to narrative analytic model. In the example shown in FIG. 5B, the feature-over-time narrative analytic model 502 includes a change threshold parameter, the cohort comparison narrative analytic model 504 uniquely includes a peer group parameter, and the metrics and drivers narrative analytic model 506 uniquely includes a contributing driver parameter and an inhibiting driver parameter.

In addition to receiving parameters, the narrative analytic models 502-506 define different algorithms to fulfill the communication goal. The algorithms are defined in advance so that the narrative analytic model can present information that fulfills the communication goal.

In the examples shown in FIG. 5B, the Feature-over-time narrative analytic model 502 may define an algorithm that calculates a value for a top-line metric and an algorithm that calculates a trajectory for the top-line metric based on a time period parameter. In the content of the time period, the narrative analytics model 502 is able to specify an angle 208 for describing the entity's performance. For example, if the total units sold for a first week is about the same as a second week, the narrative analytic model 502 may determine that the most appropriate angle 280 to characterize the retail store's performance is a "held steady" angle. Changing any of the parameters illustrated in FIG. 5B may change the angle.

The cohort comparison narrative analytic model 504 may include algorithms that compares the top-line metric and trajectory, which was calculated by the feature-over-time narrative analytic model 502, to peers defined by a peer parameter. In other embodiments, the narrative analytics model 504 referenced by the evaluate communication goal data structure 495B may compare the calculated top-line metric and trajectory to historical values or simply to the number 0 (i.e. whether or not the profit was positive or negative). The cohort comparison narrative analytic model may further receive parameters such as thresholds, benchmarks, expectations, industry sectors, and the like.

Also, as hinted above, the results of the comparison algorithms performed by the narrative analytics 504 specified by the evaluate subject status communication goal data structure 495B determine the angle or angles 208 used to automatically generate the narrative story. If the entity's numbers are lower than its peers, the angle(s) 208 chosen by the narrative analytics model 504 differs from a situation when the retail store's numbers are better than its peers. As part of the angle(s) 208 applicability determination, the narrative analytics model 500 may need to receive a threshold that decides when a feature or change is significant. For example, one retail store may think 10% improvement in revenue is significant, whereas another retail store may think 2% improvement is significant. These thresholds may be set by a user, or by the computer system 104 evaluating historical data about the retail store or data about the retail store's peers, or through some other source of data.

The metrics and drivers narrative analytic model 506 may include algorithms to determine which drivers contributed or inhibited to the calculated top-line metric and trajectory. Such subsidiary metrics, or drivers, depend on the top-line metric calculated by the feature-over-time narrative analytic model 502. For example, drivers for revenue and profit may include statistics such as the number of units sold or a dollar amount per unit sold. These drivers can be either positively or negatively correlated with the higher-level metrics, such as profit or revenue. As another example, if the computer system 104 is reviewing the performance of a running back, the metrics and drivers narrative analytic model 506 may explain an improvement in yards gained by the running back by looking at the number of broken tackles or offensive line statistics.

The most direct type of driver is a component or subcategory of the overall metric. Returning to the retail store example, the overall metric may be total number of units sold, while the component metric may be number of clothing articles sold, total sales in accessories, total sales in cosmetics, etc. Component drivers are measured in the same units as the overall metric to which they contribute, and the sum of their values should be the value of the overall metric. Using component drivers, an explanation why total clothing sales are up could be determined by simply noticing that jean sales are up.

Another kind of driver may be an input to the top-line metric. For example, inputs to a retail store's total sale might be total number of individual customer sales, average dollar amount per customer sale, or net gain less the wholesale cost. Yet another type of driver is an influence on the overall metric. For example, bad weather may be a negative driver for a golf course's sales, but cold weather may be a positive driver for pro shop sales because a number of golfers forgot warm clothing for playing golf through the cold weather. These two drivers are not measured in the same units as the overall metric, but they have a relationship to the overall metric under evaluation. Because these drivers are not measured by the same unit as the overall metric, these drivers may need to be weighted, particularly in relation to other drivers. For example, weather may be weighted higher for a golf course's overall metric of revenue than for a retail store's overall metric of revenue.

Although not shown in FIG. 5B, the computer system 104 may also define a predict communication goal data structure and an advise communication goal data structure. Although similar to the describe subject status, evaluate subject status, and explain subject status communication goal data structures in that parameters are used to specify the configuration that will generate a narrative, the predict and advise communication goal data structures specify different algorithms and reference different angles 208 to produce the narrative portion of the story. For example, the predict communication goal data structure may include a subcomponent that specifies how to describe the status of a projected future. The projected future may be tailored to the specific domain and subject being written about. The narrative analytics model specified by predict may project the future and discuss a level of uncertainty. The predict communication goal data structure may specify various types of projection based on the uncertainty. For example, the predict communication goal data structure may specify a conservative, moderate, and wild prediction, each with a different level of uncertainty. The predict communication goal data structure may also receive a time frame as an input, wherein the further in the future the system is predicting, the higher the level of uncertainty in the prediction The advise communication goal data structure may receive as a domain input parameters of the situation 506 that the reader can control. For example, in the retail store content, the advise communication goal data structure should not specify a configuration that results in saying things like "sell more units." Instead, it may specify evaluating such factors as the success of a marketing program, or whether a coupon campaign resulted in substantially more sales or revenue. Based on these analyses, the resulting narrative may recommend ceasing such marketing campaigns or continuing them. The computer system 104 may also analyze employee performance to recommend promotions or ending employment.

FIG. 5C illustrates how a content block may receive general parameters, e.g., to adapt it to a specific domain or application, before actually receiving specific data parameters that will be used in generating a narrative. As shown in FIG. 5C, the entity parameter receives a generalized parameter of American Industrial Companies, and the top line metric parameter receives a generalized parameter of total unit sales. By supplying these generalized parameters to the content blocks and narrative analytic models, the narrative analytic model constrains the nature and amount of data to analyze and present in the narrative to only those companies fitting the characterization of American Industrial companies.

FIG. 5D illustrates how the instantiated content blocked generated by the combination of the referenced communication goals and the associated narrative analytic models. The example shown in FIG. 5C illustrates that each instantiated content block 512-516 receives values for the parameters. For the first instantiated content block 512 for the describe status communication goal 495A/feature-over-time narrative analytic model 502, the content block 512 receives numerous parameters that constrain the data to be analyzed by the content block 512. For example, the content block 512 receives the parameters "Ford Motor Company", "Ford's Total Unit Sales", the time period of 90 days, and a threshold parameter of 1%, among others. Using these parameters, the content block 512 only analyzes data regarding total sales for the Ford Motor Company. This content block 512 is able to ignore data in a structured data set about other entities, such as General Motors or Apple Computers, and other top-line metrics, such as profit or losses.

The second and third instantiated content blocks 514 and 516 receives some or all of the same parameters as the first content block 512 and additional parameters. For example, the second content block 514 also receives a peer group parameter so that the second content block can compare the performance of the Ford Motor Company to a parameterizable peer group, which in this example is all American automobile manufacturers. Meanwhile, the third content block 516 may receive different parameters than the second content block 514, such as contributing drivers parameters and inhibiting driver parameters. In the example shown in FIG. 5C, the contributing drivers include Ford Mustang sales, Ford Focus sales, and Ford Taurus sales. Meanwhile, inhibiting drivers include recall announcements.

Example Configuration Tool User Interfaces

Figure 6:
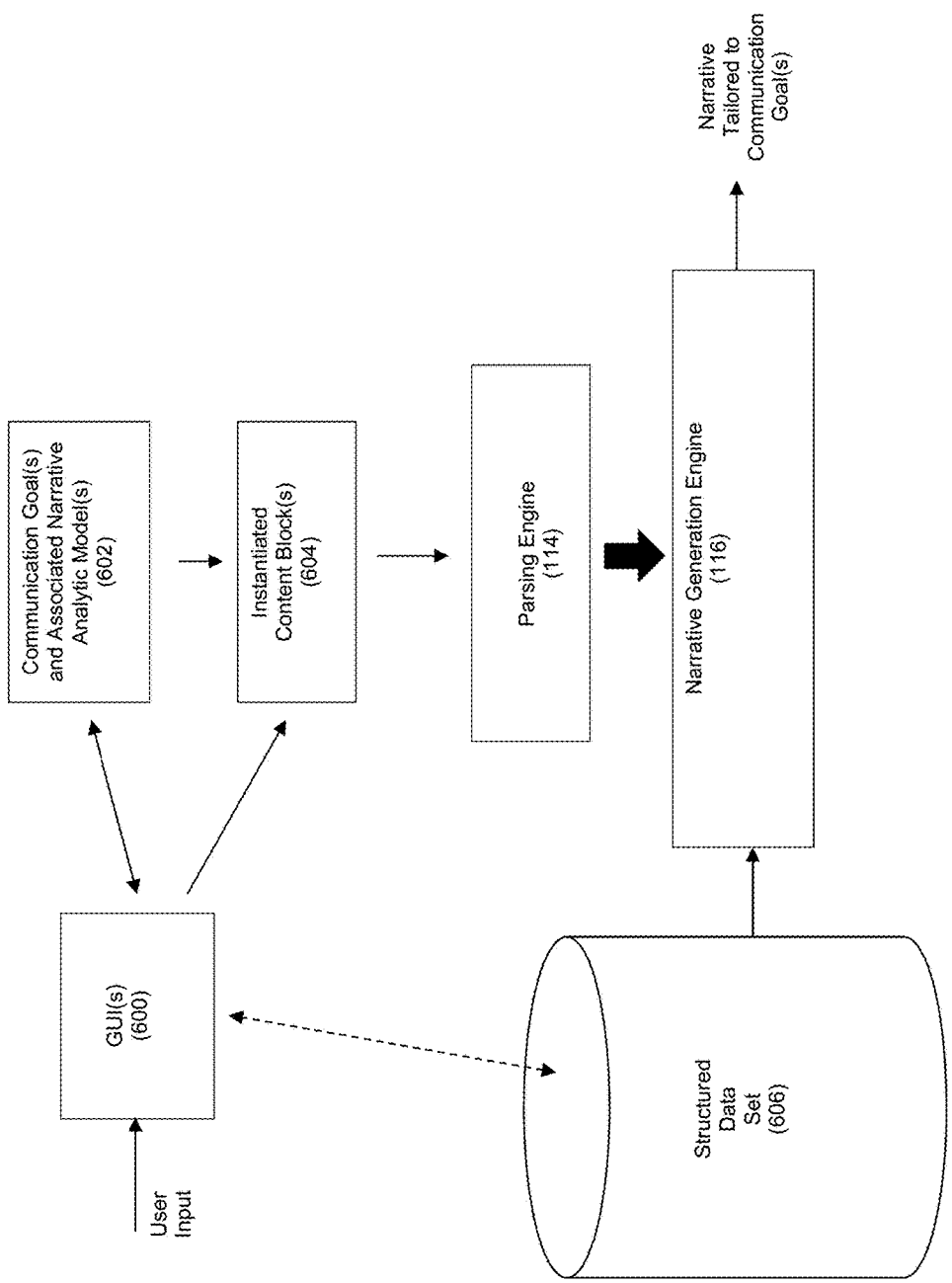
FIG. 6 illustrates an example configuration and process flow for execution by a computer system to automatically generate a narrative tailored to a communication goal according to an exemplary embodiment.

Referring to FIG. 6, the components and configuration to generated narrative stories through user interaction is illustrated. To begin, the computer system 104 includes a graphical user interface (GUI) 600. The GUI 600 provides an interface by which a user can configure communication goal data structures and their associated narrative analytic models 602 to thereby generate a narrative story.

A user provides user input into the GUI 600, and the GUI displays selectable options for parameters defined by the communication goal data structures and the narrative analytic models 602. The user input may include first selecting which communication goal data structures should be accessed by the computer system 104 to generate the narrative story. In this way, the user may specify the story specification 202. The user may also use the GUI to define new communication goal data structures and new narrative analytic models.

The GUI 600 further references a structured data set 604 to determine what parameters to display. For example, the GUI 600 may determine which data is available in the structured data set 606 when rendering the menu options listed by the GUI 600. For example, if the structured data set 606 includes data about the Ford Motor Company and General Motors, the GUI 600 will display in a drop down menu those two companies as entities which the computer system 104 can write about.

Further, after selecting which communication goal data structures comprise the story specification, the user may use the GUI 600 to configure the communication goal data structures and the narrative analytics by providing values or selections for the parameters used by each communication goal data structure and each narrative analytic model. This may include, for example, drop down menus, sliders, and text input boxes, among others. The communication goal data structures may define what menus, slides, and other user-selectable options appear on the GUI 600.

Using the user inputs made through the GUI 600, the communication goal data structures and the narrative analytics models 602 receive the parameters selected through the user input, and using those parameters, the communication goal data structures and the narrative analytic models instantiate content blocks 604.

After instantiating the content blocks 604, a parsing engine 114 parses the story specification to generate the actual programmatic data structures that are directly executable by the processor. These programmatic data structures serve as part of the narrative generation engine 116. The narrative generation engine 116 is configured to process input data about which narrative is to be generated, and, based on this processing, automatically generates a narrative. This process is described in more detail above.

FIGS. 7-21 illustrate an example configuration tool with a graphical user interface (GUI) to construct a story specification 250 using communication goals 295 and the narrative analytic model 500.

FIG. 7, depicts a sample communication goal data structure library, containing three explicit and domain-independent communication goal data structures: "Assess Entity" (representing the describe subject status communication goal data structure 495A), "Contextualize Assessment" (representing the evaluate communication goal data structure 495B), and "Explain Assessment" (representing the explain subject status communication goal data structure 495C). Corresponding to each communication goal data structure is an associated narrative analytics model depicted as "Feature Over Time", "Cohort Comparison", and "Metric & Drivers". These narrative analytics models 500 also specify their data requirements. Using this interface, the user (or "content architect") is able to select and parameterize appropriate communication goals data structures 295 and narrative analytics 502 in order to construct an appropriate story specification 250. The user may search the communication goal library for all defined communication goal data structures. The user may also define new communication goal data structures through this menu.

Figure 8:
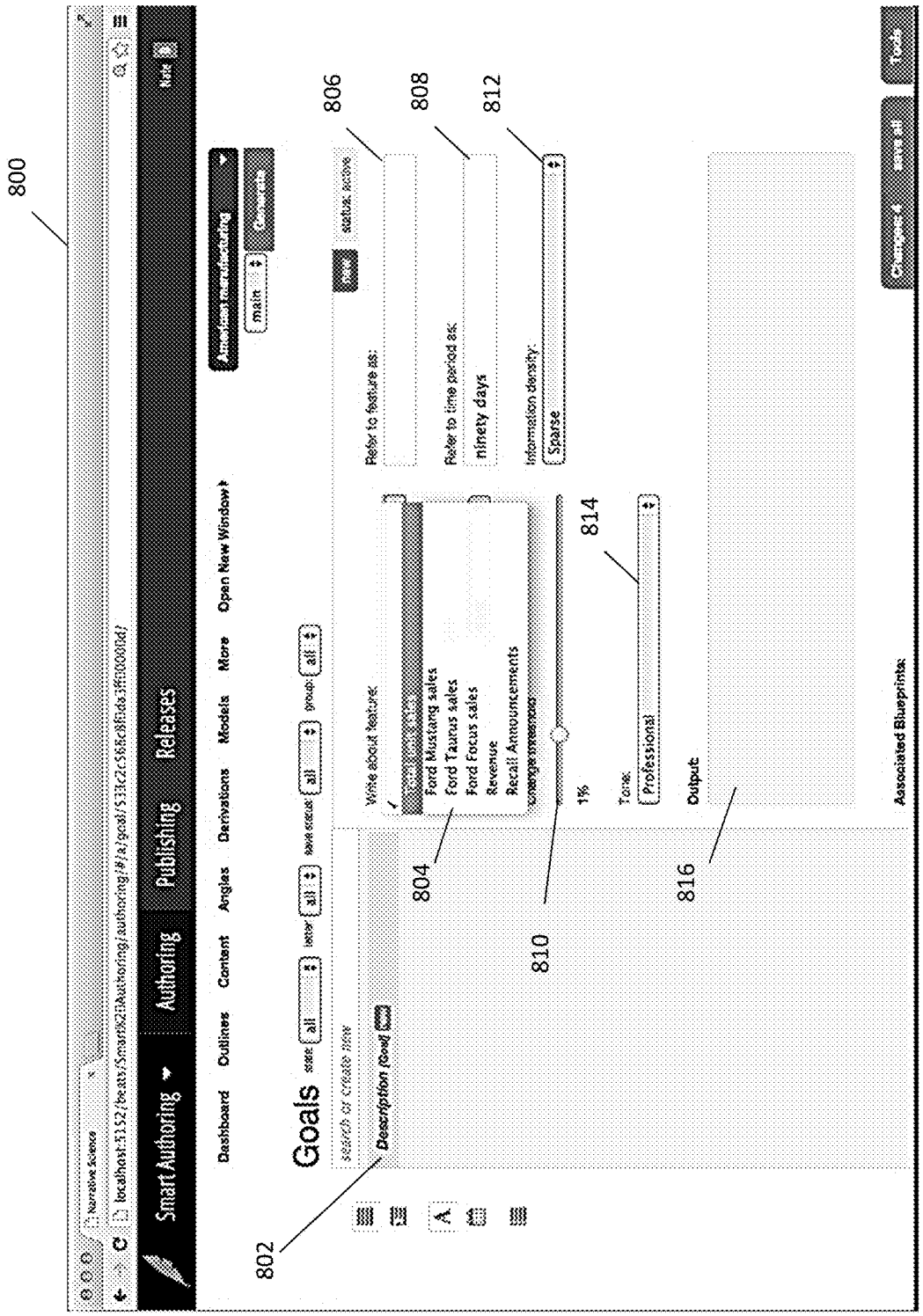

FIG. 8 includes a number of fields that can be manipulated by a user through the graphical user interface (GUI) 800 illustrated in FIG. 8. The GUI 800 may be presented, for example, as a standalone application, or as a GUI accessed through a web browser. The GUI displays fields, drop-down menus, and windows that assist a user in configuring how the processor 100 will automatically generate narrative stories. For example, the GUI 800 includes a communication goal data structure list 802 listing all the communication goal data structures that have been configured by the user and are potentially relevant when generating a narrative story. The GUI 800 further includes a metric drop down menu 804 listing the specific metrics potentially relevant the communication goal data structure. In the GUI 800, the metric drop down menu 804 lists things like total unit sales for the Ford Motor Company, or total Ford Mustang sales, total Ford Taurus sales, total Ford Focus sales, total Revenue, and Recall Announcements. The metric drop down menu 804 may list many more things depending on the data stored in the memory 102. The metric drop down menu 804 may specify the entity parameter (see FIG. 5B). The GUI 800 also allows the user to determine how to refer to the metric in a metric field 806, which defines the Entity Parameter Text Name. The GUI 800 allows the user to express how to refer to the time period parameter in a time period parameter field 808, which defines the Time Period Parameter Text Name. The GUI also includes a threshold slider 810 to specify the meaningful threshold of change in the appropriate metric or metrics, which defines the Change Threshold parameter. The user can also determine the amount of information displayed in a generated narrative using an information density drop-down menu 812, which defines the Information Density parameter. The user can also control the tone of the generated narrative using a tone drop-down menu 814 (defining the Tone parameter), which is a way to control or specify the blueprint sets to be applied by the processor 100. In addition, the GUI 800 includes an output window 816 that displays the narrative generated by the processor 100 applying configuration specified by the communication goal in view of the parameters selected by the user using the GUI 800 and using the available data. The metric drop-down menu 804 depicted is currently blocking the view of a time period field 818 and a time unit drop-down menu 820 (both defining the Time Period parameter), but these two fields are illustrated and referenced in FIG. 9

FIG. 8 depicts the state of the configuration process after the user has chosen an initial communication goal: "Assess Entity". Such a selection results in the creation of a new content block 260, named by the user here "Description". The constraints among communication goal data structures 200, narrative analytics 250, abstract data types, and available data, are made explicit in the GUI 600 in order to guide the user in his or her editorial thinking in developing the configuration of a story type. In FIG. 8, the user is selecting an appropriate top-line metric for the entity in question, "Total unit sales" using the metric drop-down menu 804. The example entity for which data has been supplied below is Ford Motor Company. The metrics, features, and data made available in the GUI are provided by another process through which specific data or data models are mapped to the abstract metrics and features specified by the narrative analytic models, and, ultimately, the communication goal structures. However it is a key advantage of the current approach that the communication goal structures and the narrative analytic models they specify in turn determine the nature of the necessary data and provide a pre-determined, abstract target to which specific data or data models should be mapped, as described further below.

Figure 9:
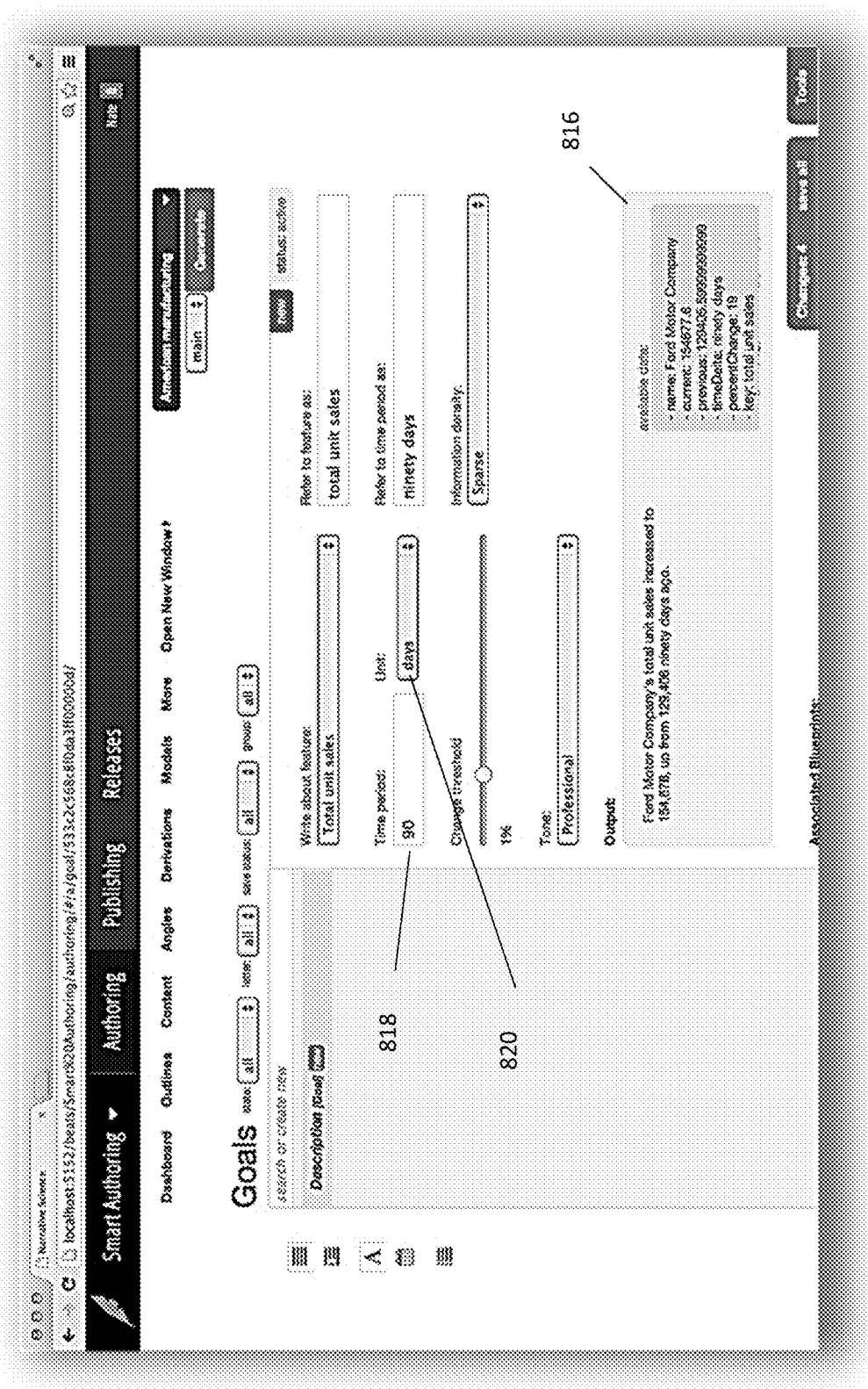

FIG. 9 illustrates the Feature-Over-Time narrative analytics model associated with the describe status communication goal data structure. Feature-over-Time requires as parameters the top-line metric, the time period, and a meaningful threshold for change, the latter two specified here as 90 days and 1%. The default or registration language for this time period in the associated blueprint set is "ninety days". The name to be used in referring to the feature, "total unit sales", is supplied as meta-data associated with the data imported into the computer system 104. Given these defaults and using the methods described above, the specification of the top-line metric immediately results in the production of an accurate and readable sentence based on the sample data as illustrated in the output window 816.

Figure 10:
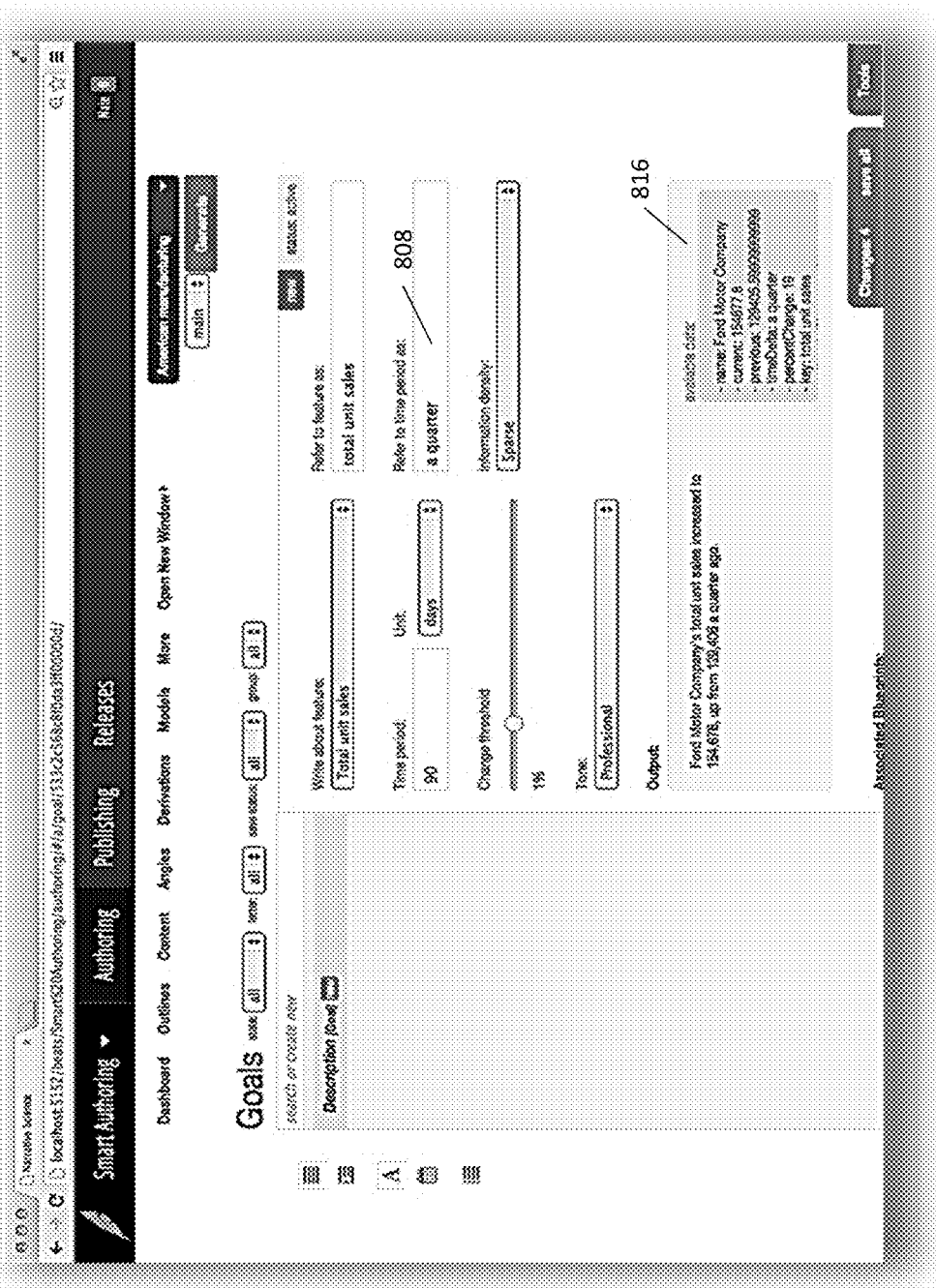

In FIG. 10 the default or registration language associated with the content block 260, "ninety days", is replaced with the more idiomatic "a quarter" by changing the input into the time period parameter field 808. In customizing language in this way, a user is guided by the entire context of the (parameterized) instance of the current narrative goal and its associated default registration language. In other embodiments, the computer system 104 automatically supplies or suggests common substitutions of this sort. The change is reflected in the output window 816.

Figure 11:
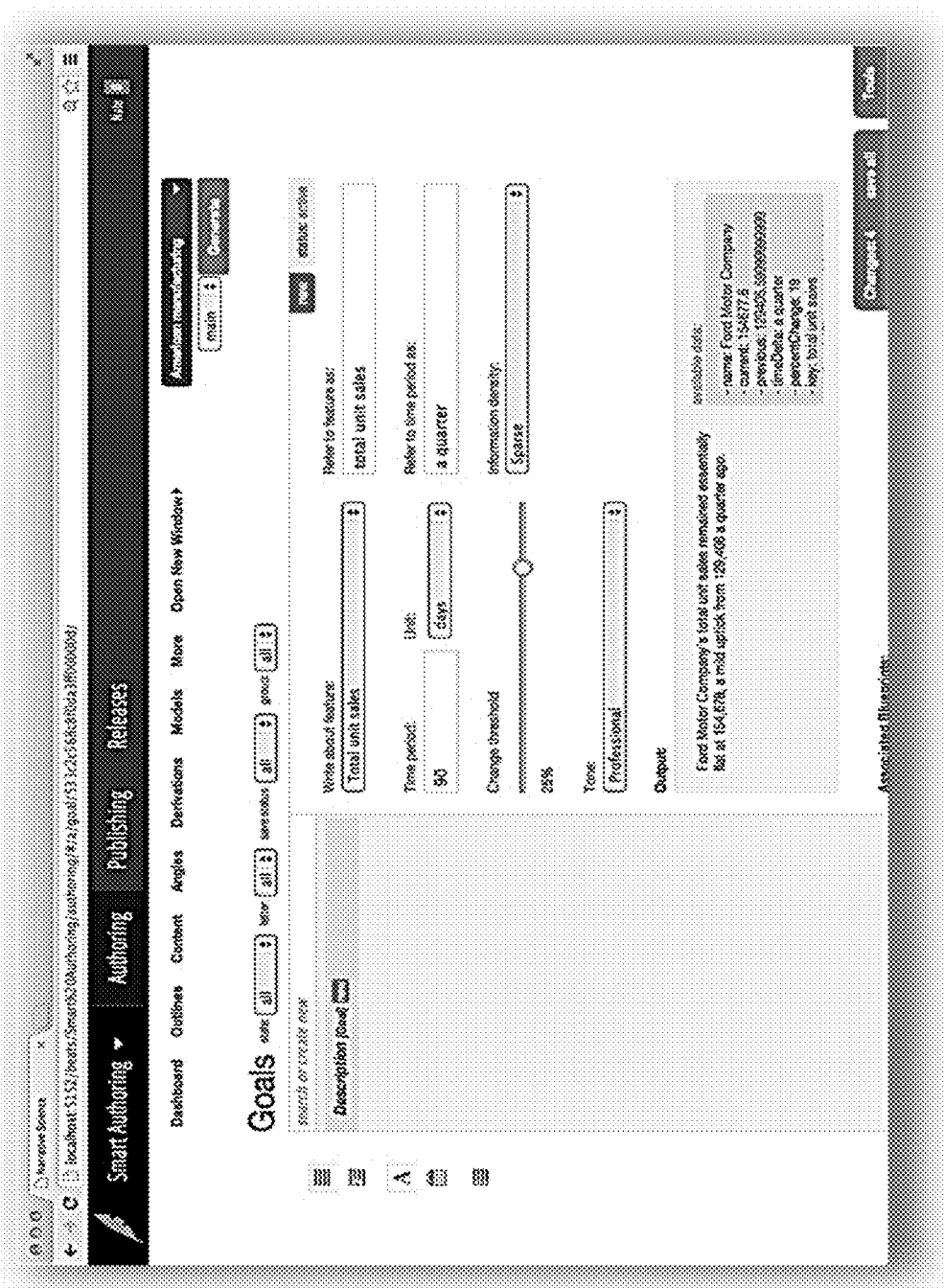

FIG. 11 demonstrates how modifying the parameter for meaningful change by moving the threshold slider 810 affects the results of the narrative analytics model 500. With the change threshold increased to 25%, the characterization of the data changes, resulting in the generation of a different description, since a different angle (with different default registration language) is now selected. Because the angle changed as a result of the change in the change threshold parameter, the data suggests that the total unit sales "remained essentially the same" instead of increasing.

Figure 12:
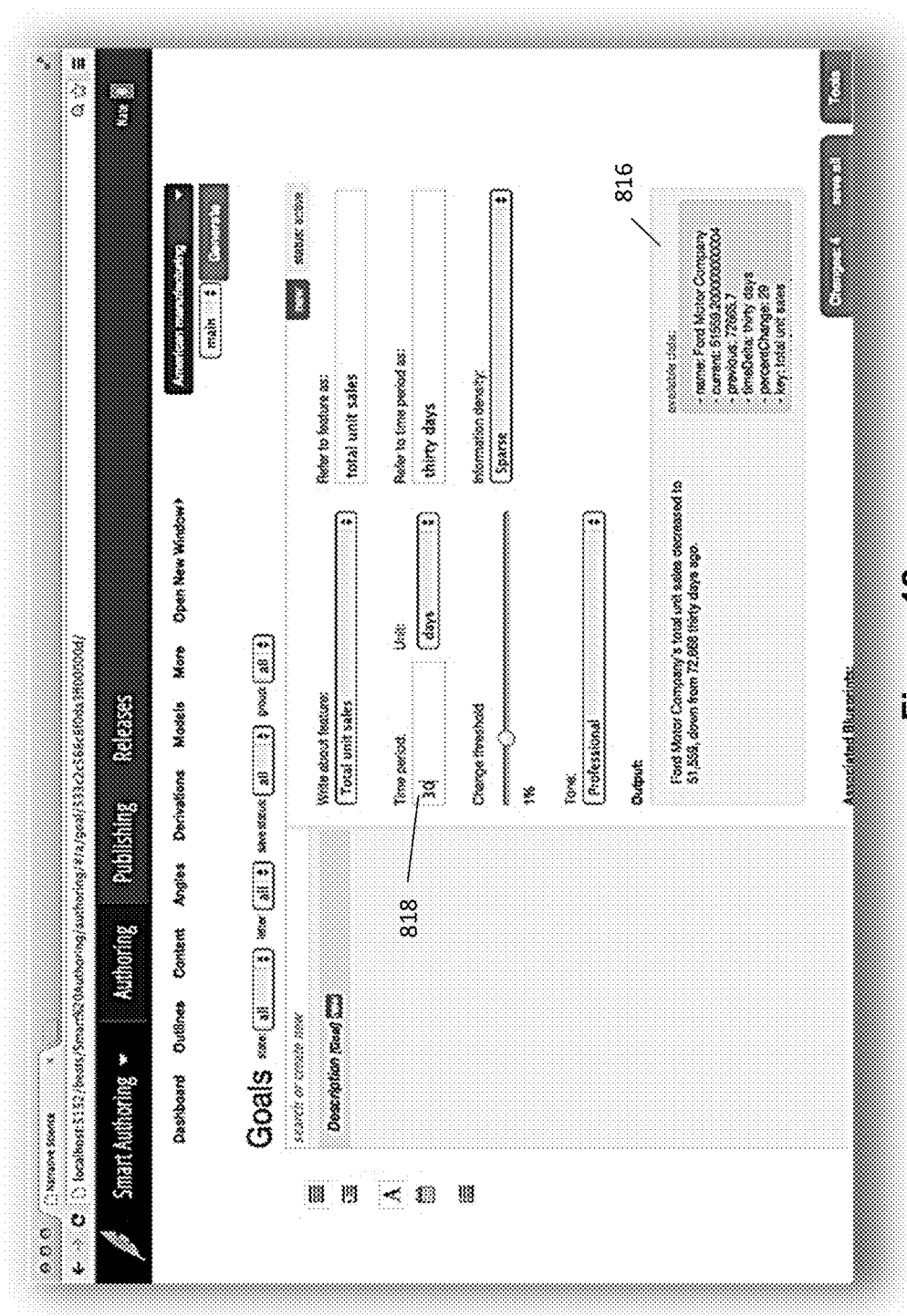

Referring to FIG. 12, the time period over which the metric's behavior should be described as an editorially controllable parameter. In FIG. 12, the user changes the time period from 90 to 30 days by changing the input into the time period field 818. As a result, the computer system 104 using the algorithms supplied by the feature over time narrative analytic model updates the values, reinterprets the data, and rewrites the sentence, using the available sample data (which is displayed in the output window 816). In this case, the narrative changes dramatically, from describing a quarter-over-quarter rise, to describing a month-over-month decline.

Figure 13:
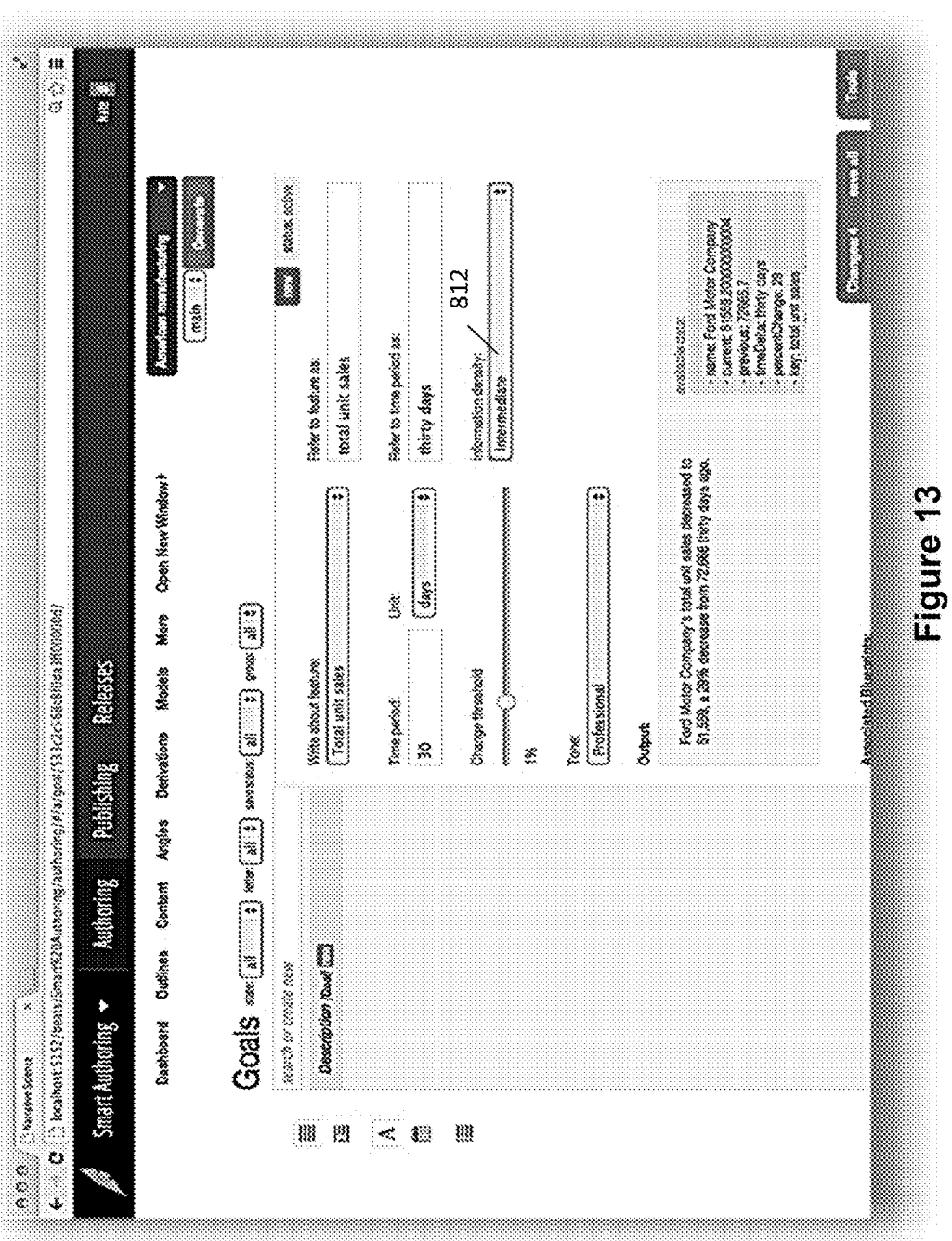

Referring to FIG. 13, the computer system 104 supports a variety of language and communication customizations. For example, in FIG. 13 the user has increased a parameter called "Information density" by changing the information density drop-down menu 812, which controls the level of detail; as a result the output sentence also includes the percentage decrease in addition to the decrease in units sold.

Figure 14:
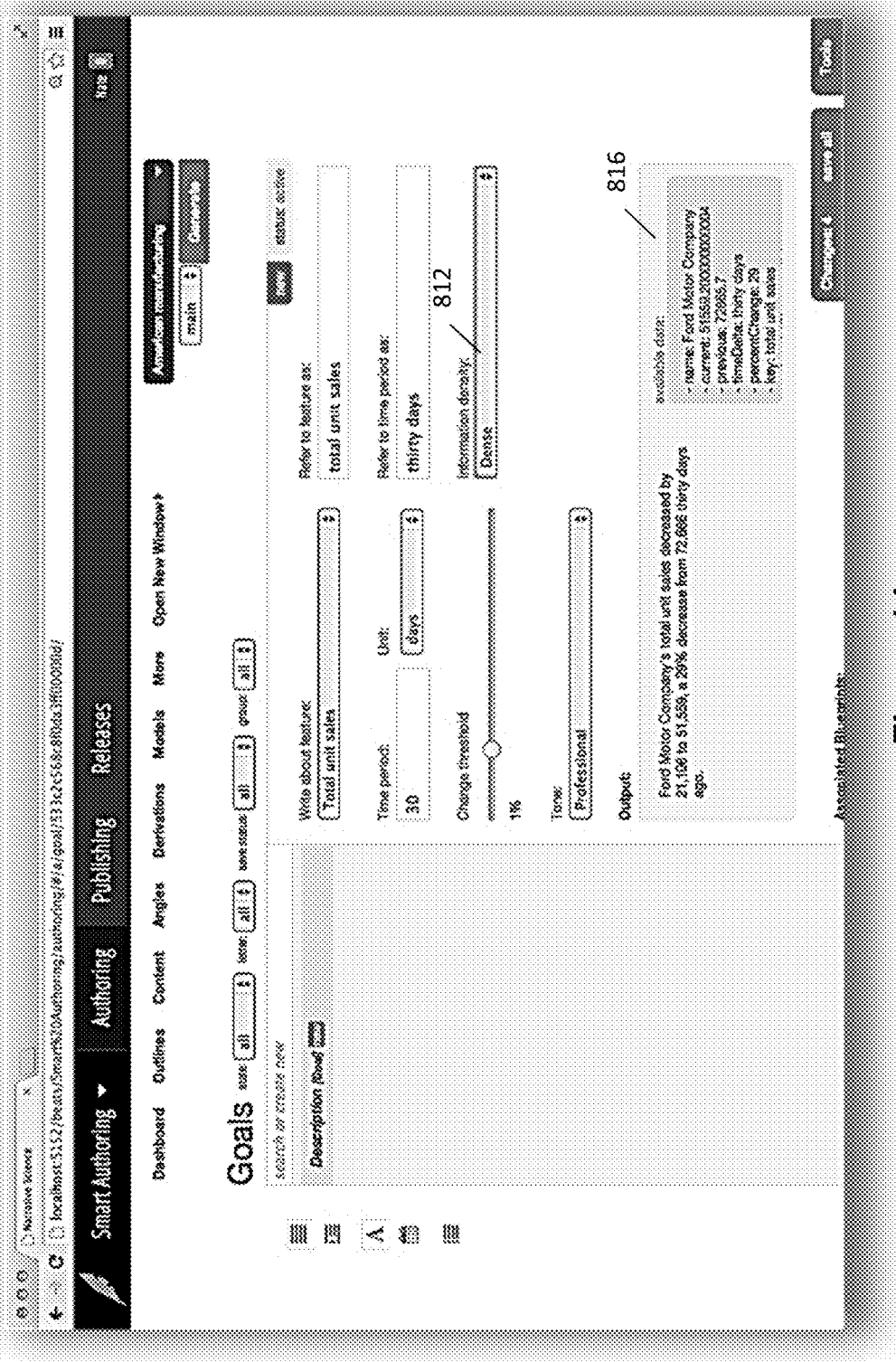

Referring to FIG. 14, similarly, further increasing this parameter in the information density drop-down menu 812 even further causes the computer system 104 to give voice to even more detail (in FIG. 13, the absolute change as well) as shown in the output window 816. Now, the output sentence also provides the total decrease in unit sales.

Figure 15:
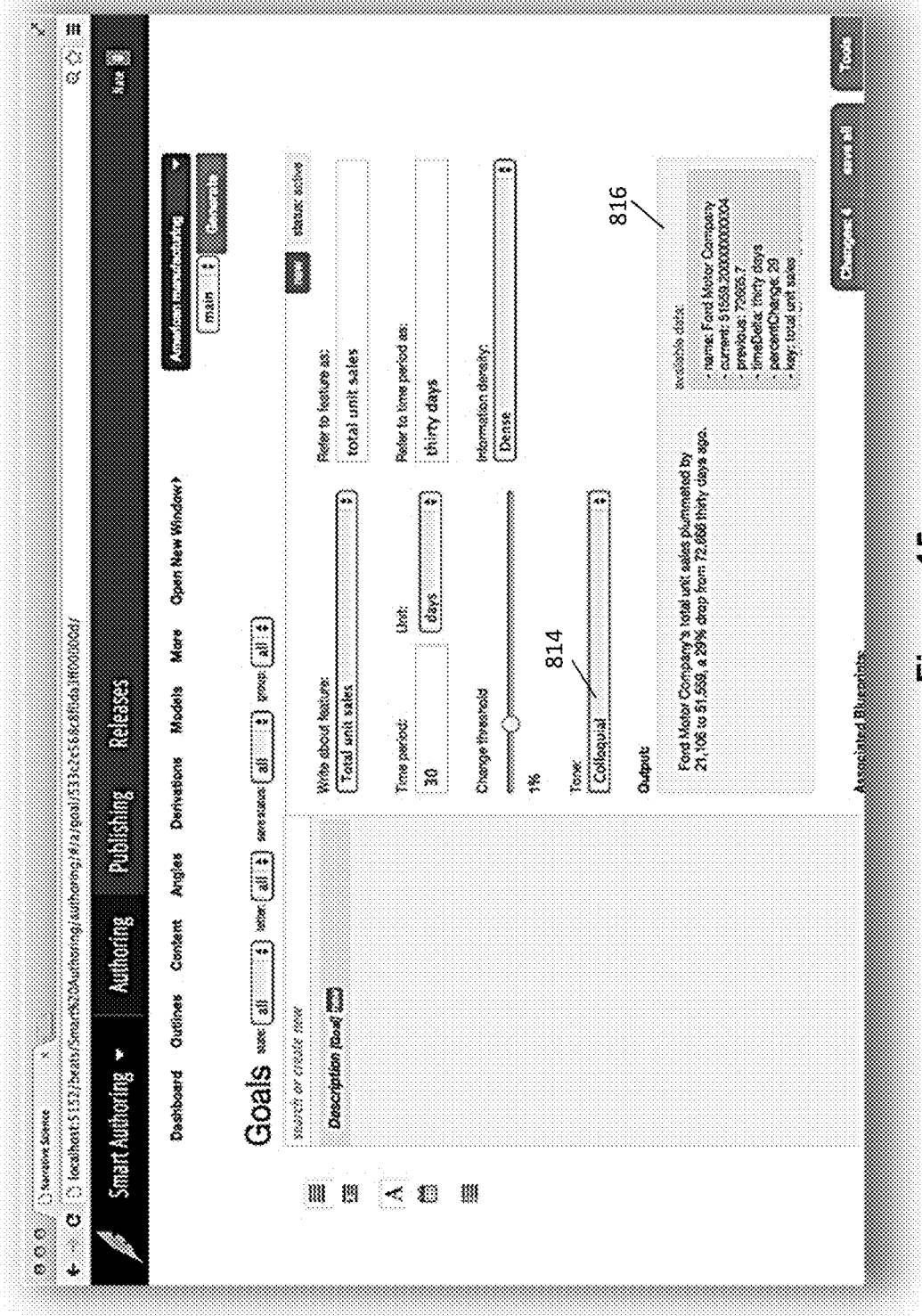

The computer system 104 also supports controlling other aspects of the language, in this case the "Tone" of the generated text by changing the tone drop-down menu 814. In FIG. 15, the user has switched this parameter to "Colloquial" (from "Professional"). This results, for example, in the use of the word "plummeted" rather than "declined" in the output window 816. The computer system 104 may also include domain-specific language packs.

Figure 16:
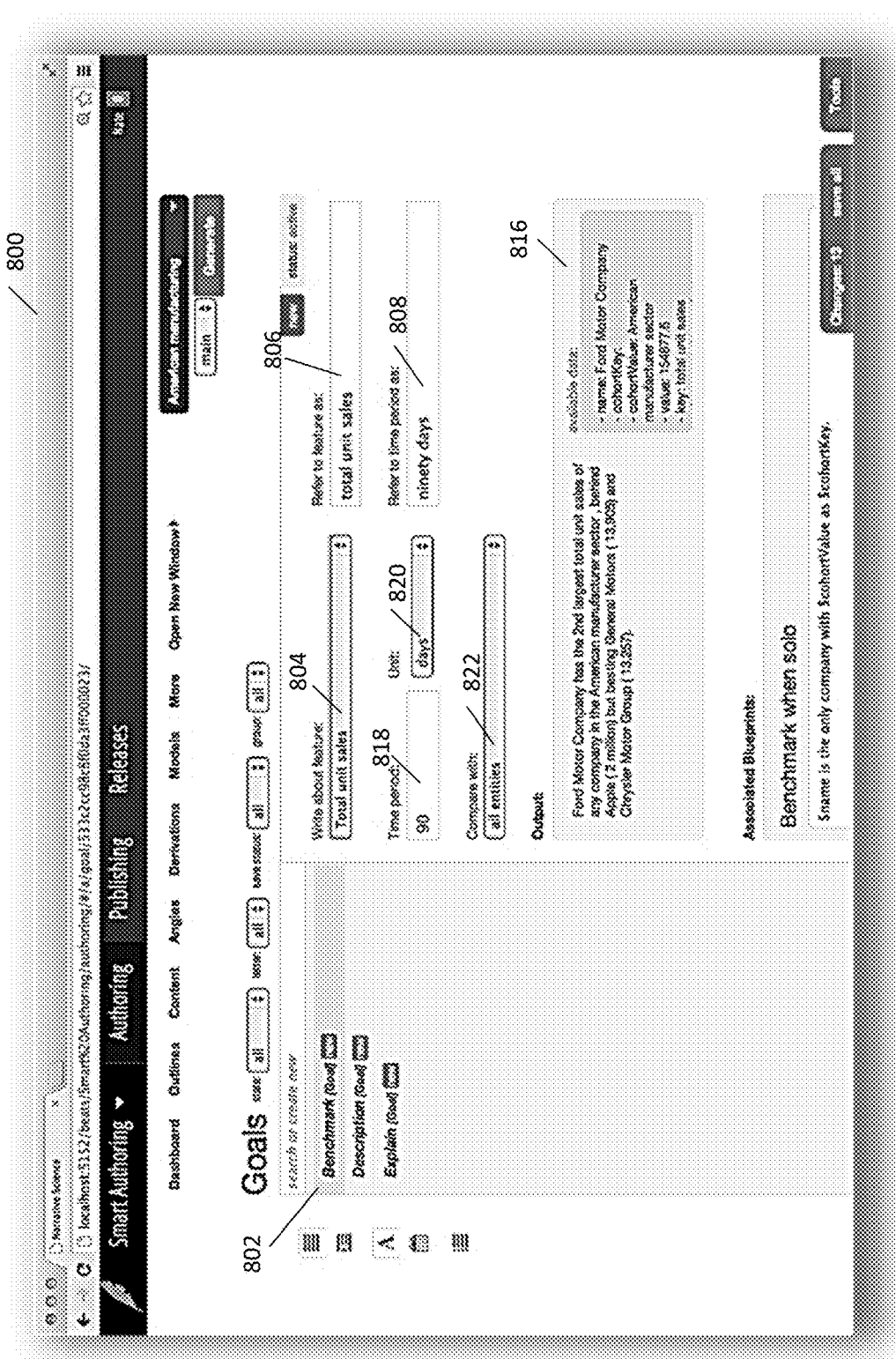

In FIG. 16, the user has added a content block, named Benchmark, which is aimed at fulfilling the narrative goal of evaluating the target entity's performance by comparing that performance with a set of peers. Because the user has selected the benchmark communication goal data structure, the GUI 800 changes slightly. The GUI still includes the communication goal data structure list 802, the metric drop down menu 804, the metric field 806, the output window 816, the time period parameter field 808, the time period field 818, and the time unit drop-down menu 820. However, the GUI 800 further includes a compare metric drop-down menu 822, which allows the user to select which entities to compare with the metric. Such entities may include benchmarks, expectations, or peers. Using the sample data, the computer system 104 generates a sentence that compares Ford's Total Unit Sales against those of its competitors. Because the peer set in this example is very general, the comparison includes Apple Computers, which may not be particularly meaningful for all types of comparison with Ford.

Figure 17:
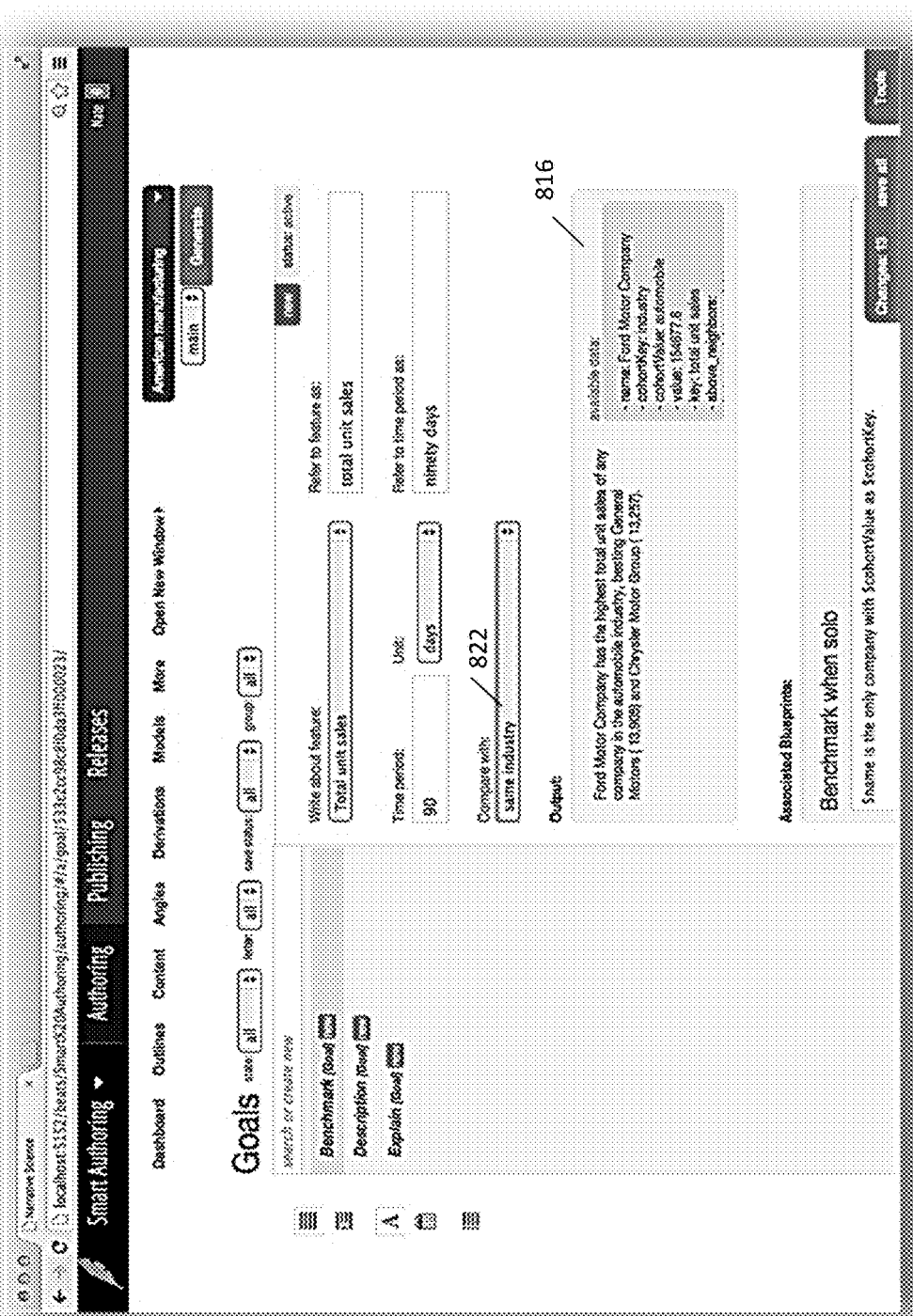

In FIG. 17, the user has specified a filtering parameter of the underlying narrative analytics model using the compare metric drop-down menu 822. Once the peer group has been limited to just those companies in the same industry (as opposed to the initial setting of all companies in the data set), the computer system 104 uses the sample data to generate a much more coherent sentence in the output window 816. Also, the cohort comparison narrative analytic model constrains the amount of data analyzed to just those companies in the same industry as Ford Motor Company. Surfacing these kinds commonly needed modifications, and incrementally making them explicit in the configuration interface, is one of the key benefits of representing communication goals and narrative analytics.

Figure 18:
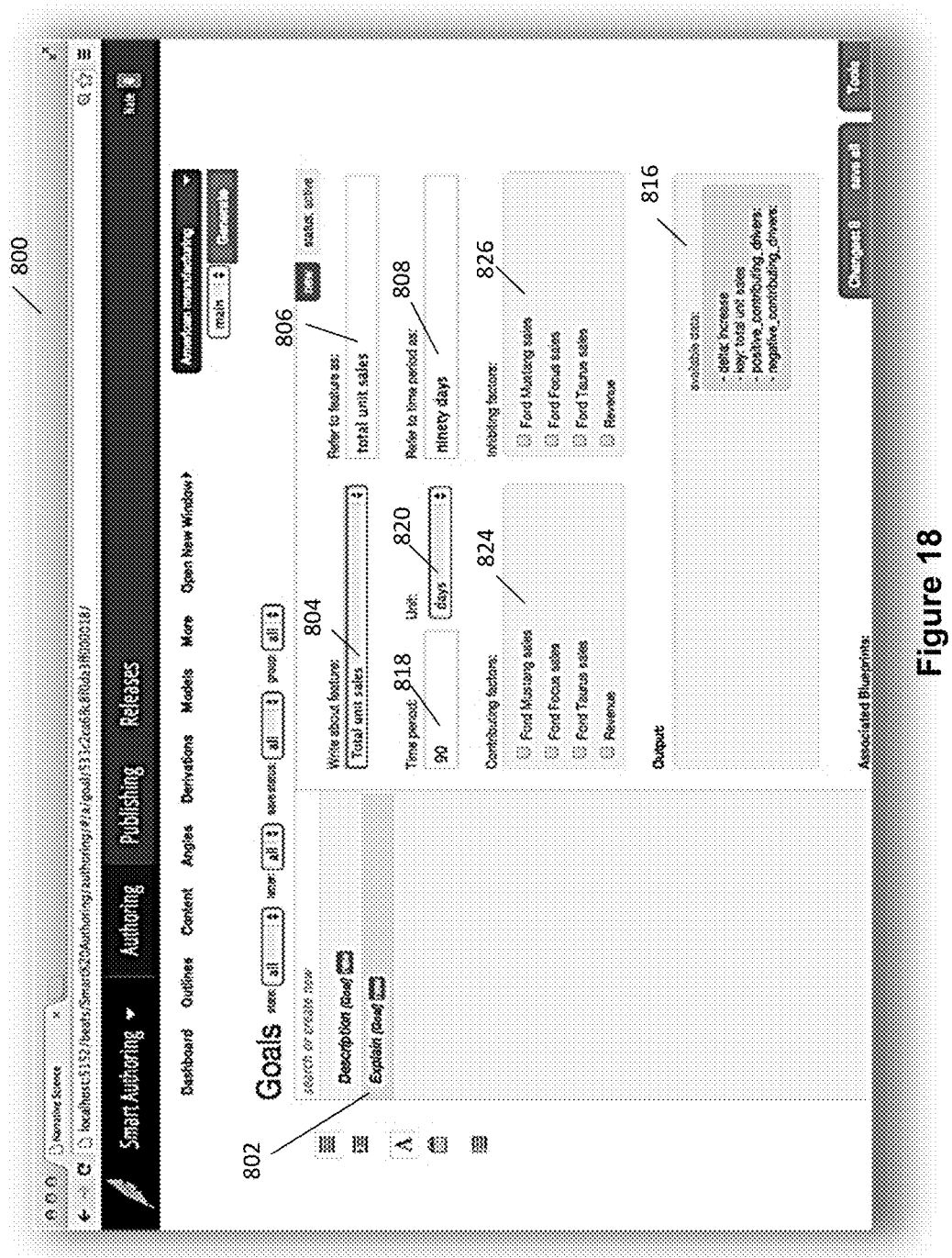

Referring to FIG. 18, because the user has selected the explain communication goal data structure, the GUI 800 changes slightly. The GUI still includes the communication goal data structure list 802, the metric drop-down menu 804, the metric field 806, the time period parameter field 808, the output window 816, the time period field 818, and the time unit drop-down menu 820. However, the GUI 800 further includes contributing factors checkbox window 824 and inhibiting factors checkbox window 826, which allows the user to select which drivers contributed to or inhibited the metric selected using the metric drop-down menu 804. Such drivers may include component drivers, or other drivers that affect the selected metric. In FIG. 18, the user instantiates a new content block, which he or she calls "Explain" that is aimed at fulfilling the "Explain Assessment" (explain) narrative goal, using the "Metric & Drivers" narrative analytics model 506. The content block 200 is aimed at explaining the behavior of the "Total Unit Sales" metric selected using the metric drop-down menu.

Figure 19:
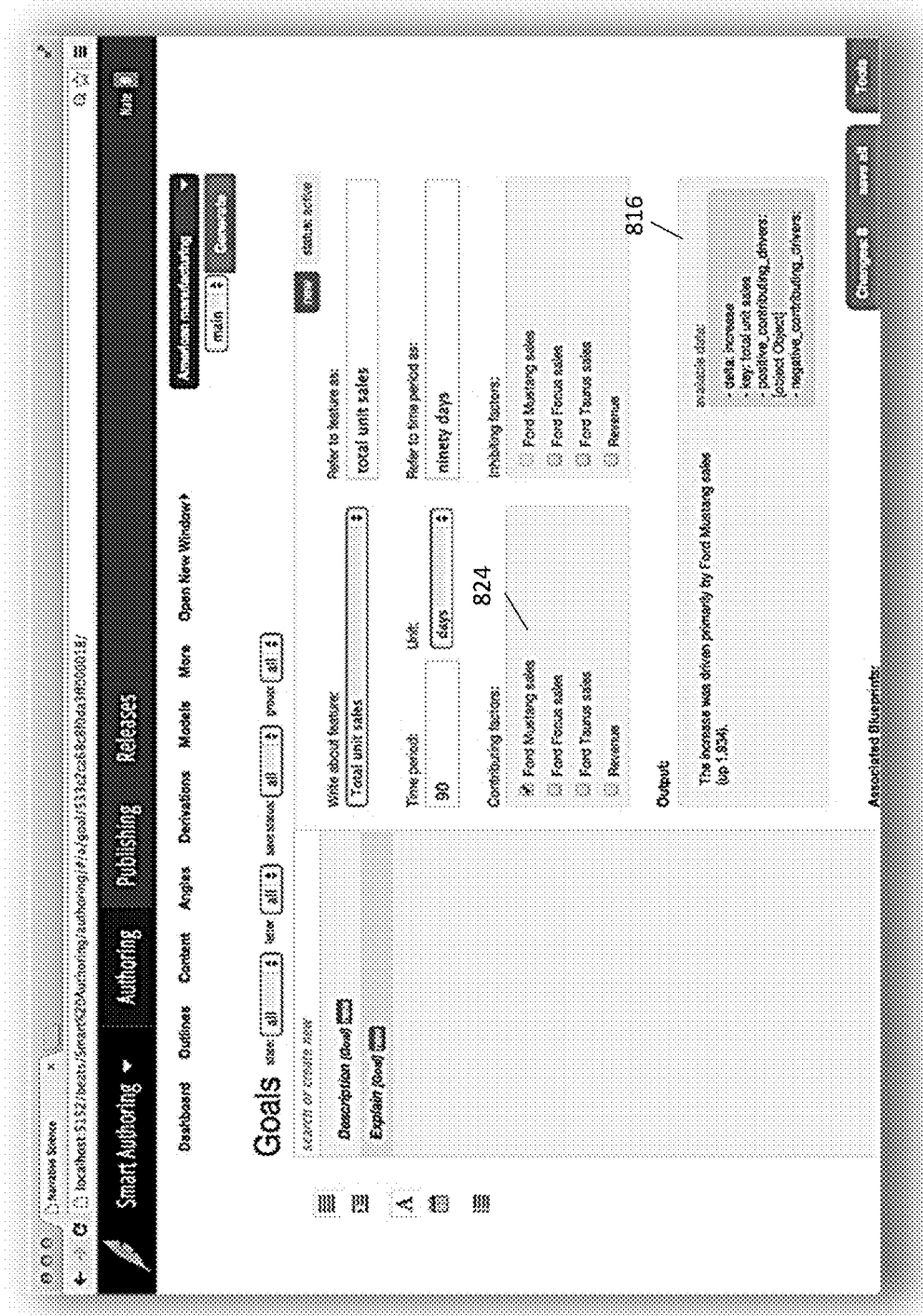

In FIG. 19, the computer system 104 displays a set of possible drivers or contributing factors to the top-line metric in the contributing factors checkbox window 824, pulled automatically from the available data. The user has specified that Ford Mustang sales are a driver of Total Unit sales. (They are, more specifically, a component driver.) The computer system 104 now generates a sentence aimed at fulfilling the narrative goal governing this content block 200 based on the available sample data in the output window 816. Because Ford Mustang sales were the only driver selected, the computer system constrains the number of contributing factors to only Ford Mustang sales. Because this was the only driver analyzed, the computer 104 assumes that this driver was the main reason for the increase in total unit sales.

Figure 20:
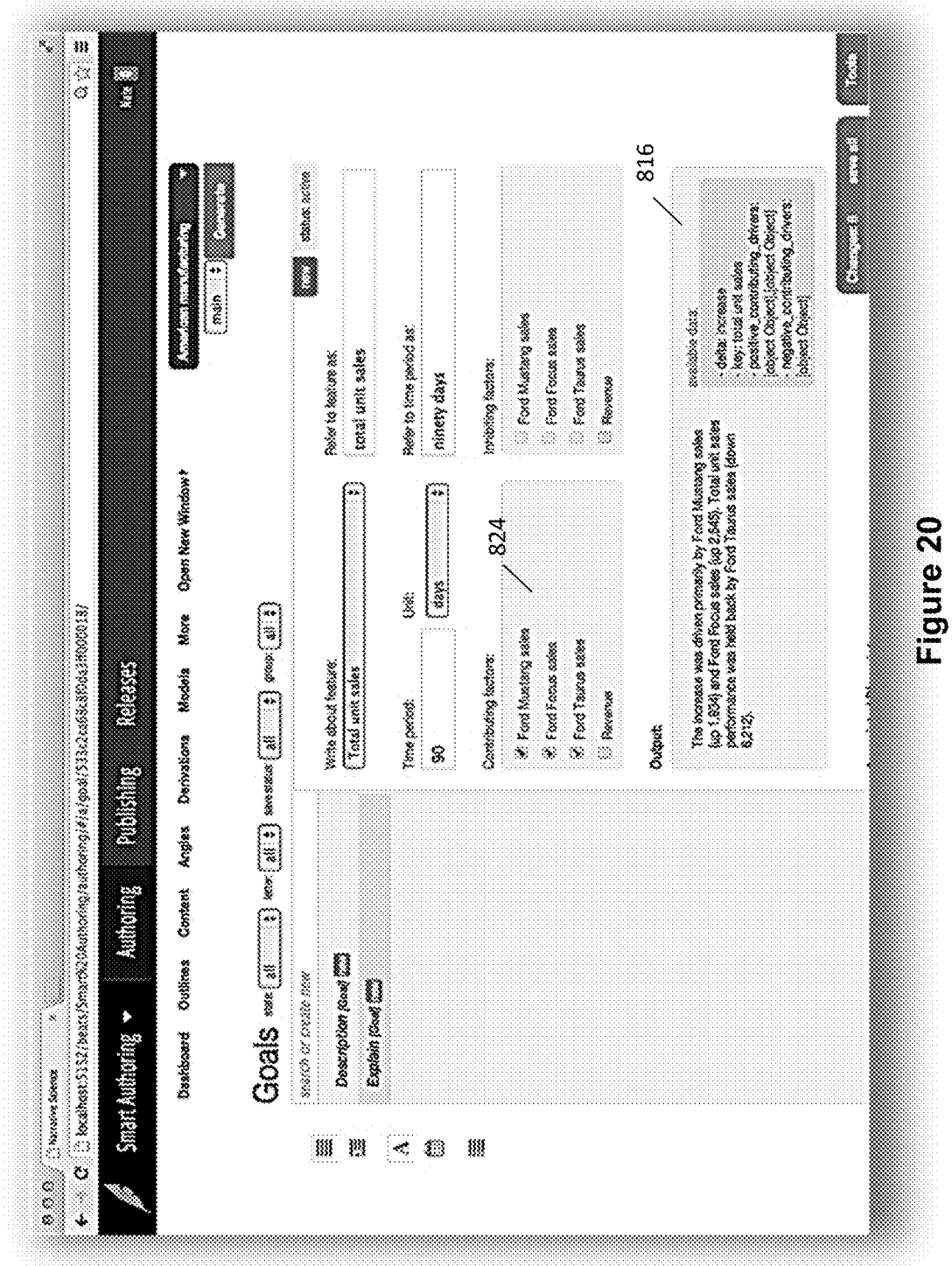

In FIG. 20, the user has indicated to the computer system 104 that sales of all of the specific makes of cars in the data set contribute to the overall "Total Unit Sales" in the contributing factors checkbox window 824. The computer system 104 now describes how Mustang and Focus sales have contributed to the overall top-line increase, while a decline in Ford Taurus sales have held it back over the quarter, based on the sample data (see output window 816). By looking at all the component drivers of total units sold, the computer is able to better convey why sales decreased.

Figure 21:
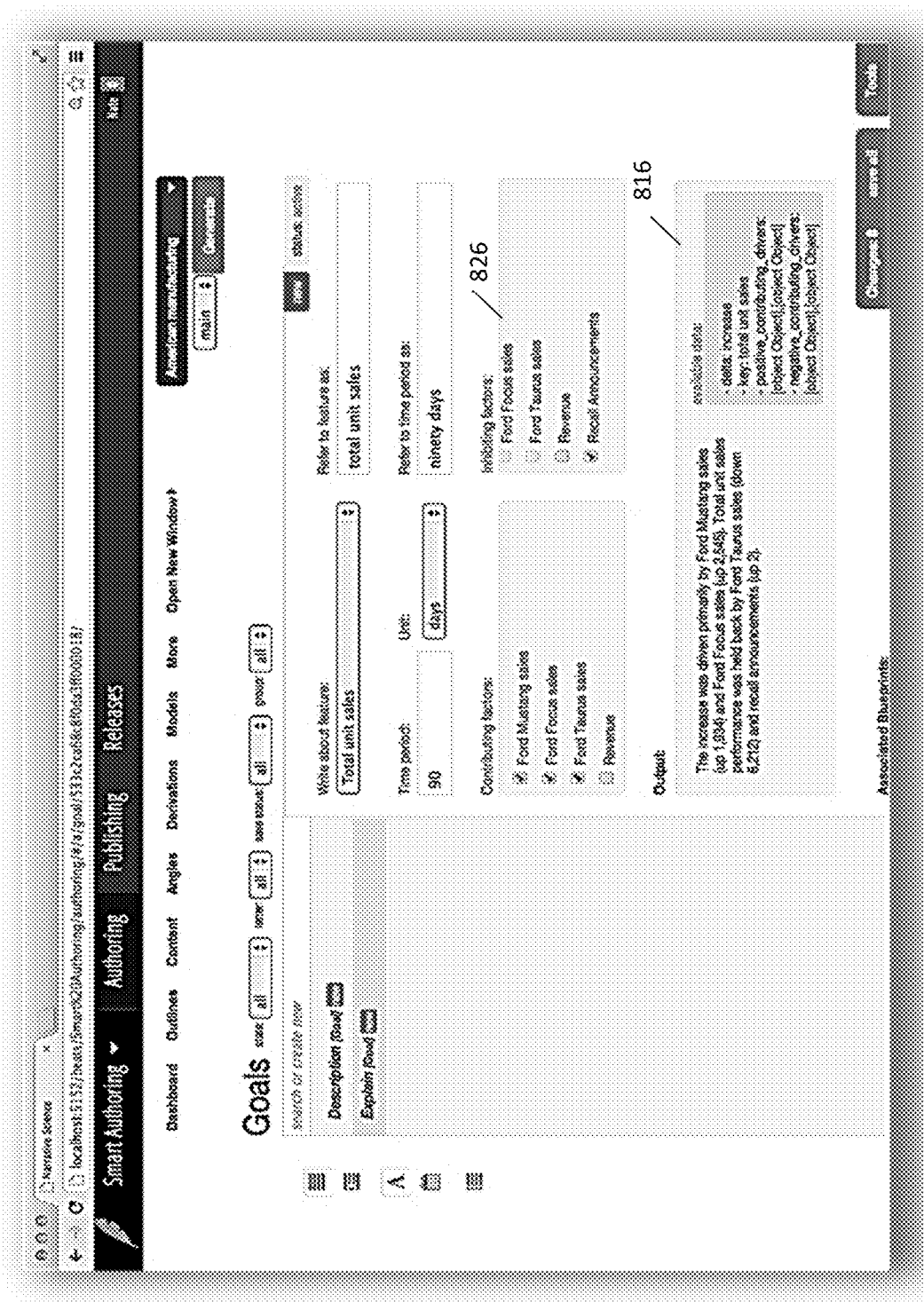

In FIG. 21, the user has asserted that "Recall Announcements" inversely drive "Total Unit Sales" by selecting recall announcements in the inhibiting factors checkbox window 826. The recall announcements parameter now adds to the understanding why total sales performance was held back.

The exemplary GUIs 800 shown in FIGS. 7-21 are designed to permit users who are not programming experts to easily select, adjust and adapt the communication goal data structures, content blocks, narrative analytics models, and other structures, to achieve desired goals. The tools illustrated in the GUIs of FIGS. 7-21 are very user friendly, and the user can instantly see how changing parameters and using different communication goal data structures results in different narrative language generated by the system. Because of the ease with which users can use these tools, configuring the communication goal data structures is a quick and easy way to generate narrative stories. The appropriate or desired configurations of these structures might also be provided as meta-data associated with a given reader, customer, data set, or other external source or agent.

The exemplary embodiments are applicable to a wide range of content verticals, and the specifications delineate the nature of the data that are necessary to parameterize the narrative analytics models 500, and so to drive narrative generation. In other words, the techniques taught by the exemplary embodiments enable the development of broadly applicable narrative products that can easily be applied to new content verticals simply by specifying the appropriate data in a defined data model or format. A performance report for a retail store has frequently been discussed above and FIG. 22 illustrates an exemplary story generated according to the exemplary embodiments. But the techniques taught by the exemplary embodiments may be applied to other story specifications as well. For example, FIGS. 23 and 24 illustrate the exemplary embodiments being applied to two additional story types: a baseball team performance report and a weight loss report.

Figure 22:
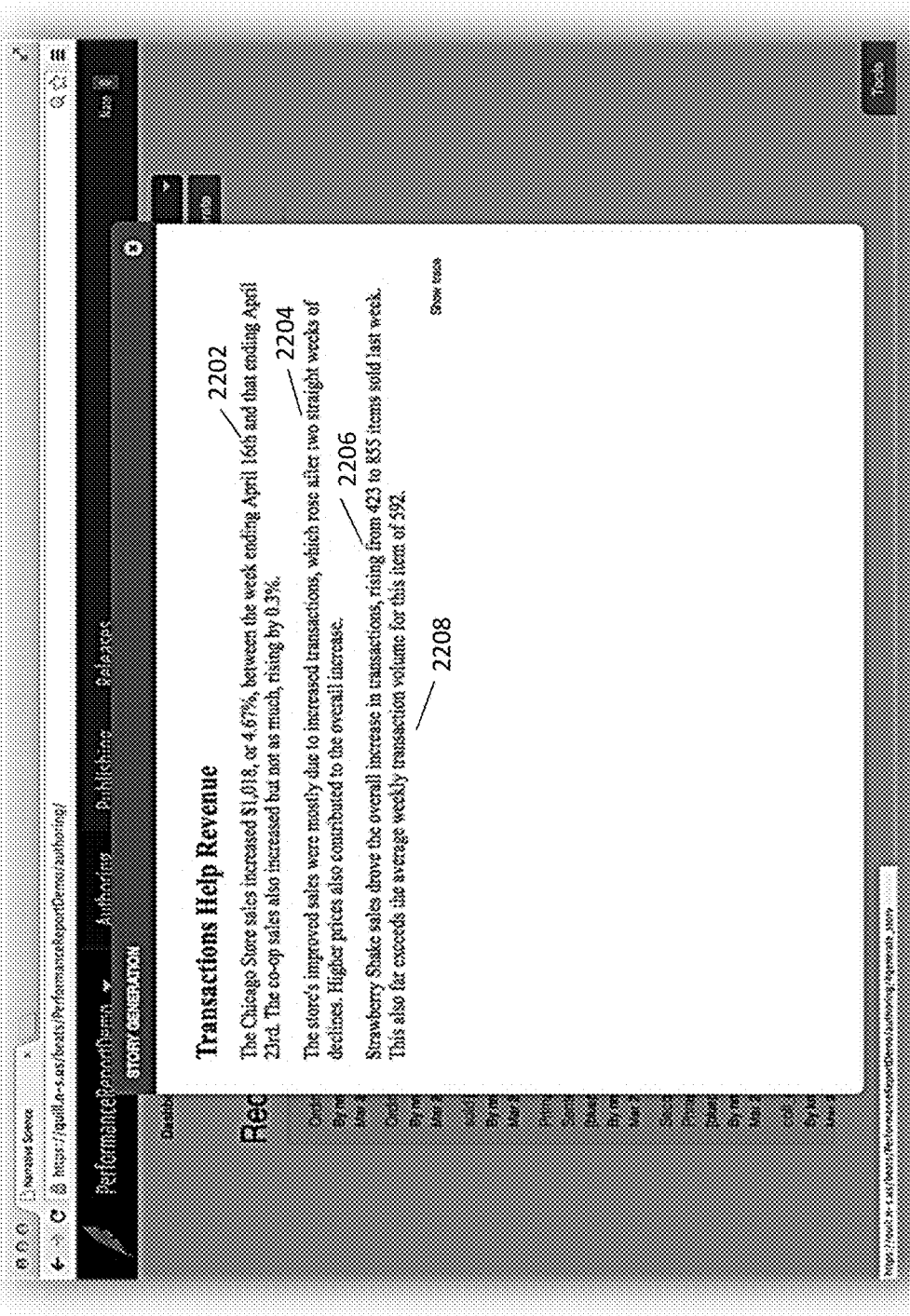
FIG. 22-24 illustrate stories generated according to the techniques and systems described herein in three different domains according to three exemplary embodiments.

Referring to FIG. 22, the results of applying specifications provided by three communication goal data structures are represented by the narrative generated. As indicated by reference numeral 2202, the first paragraph represents the results from the application of the specification provided by the describe subject status communication goal data structure; as indicated by reference numeral 2204, the second paragraph similarly represents the results of the explain subject status communication goal data structure; as indicated by reference numeral 2206, while the first sentence of the third paragraph similarly represents the results of the explain subject status communication goal data structure; and, as indicated by reference numeral 2208, the second sentence of the third paragraph similarly represents the results of the evaluate status communication goal data structure. The last sentence 2208 is an example of how the explain subject status communication goal data structure may specify the evaluate subject status communication goal data structure, resulting in a comparison of the driver to a threshold.

Figure 23:
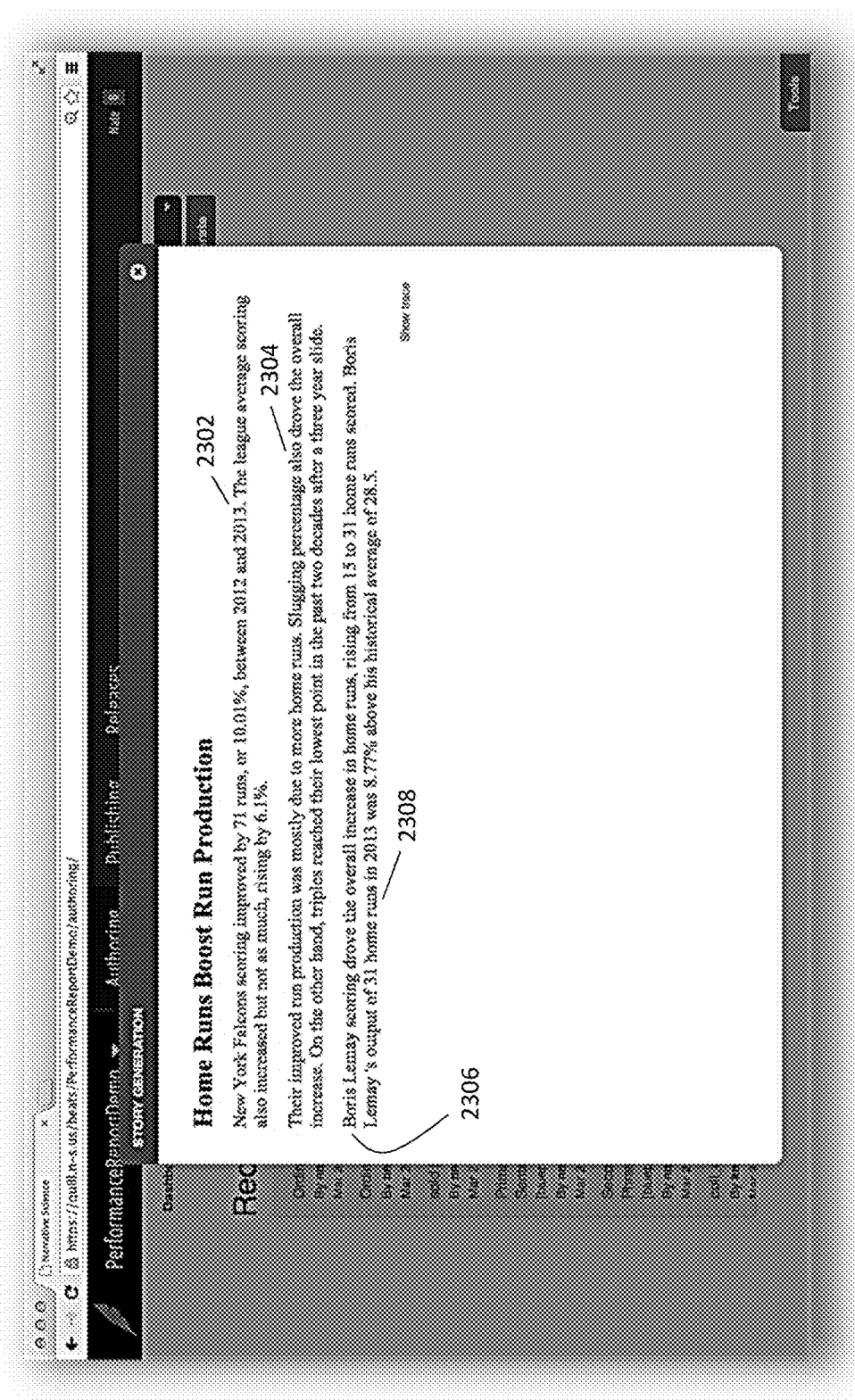
Figure 24:
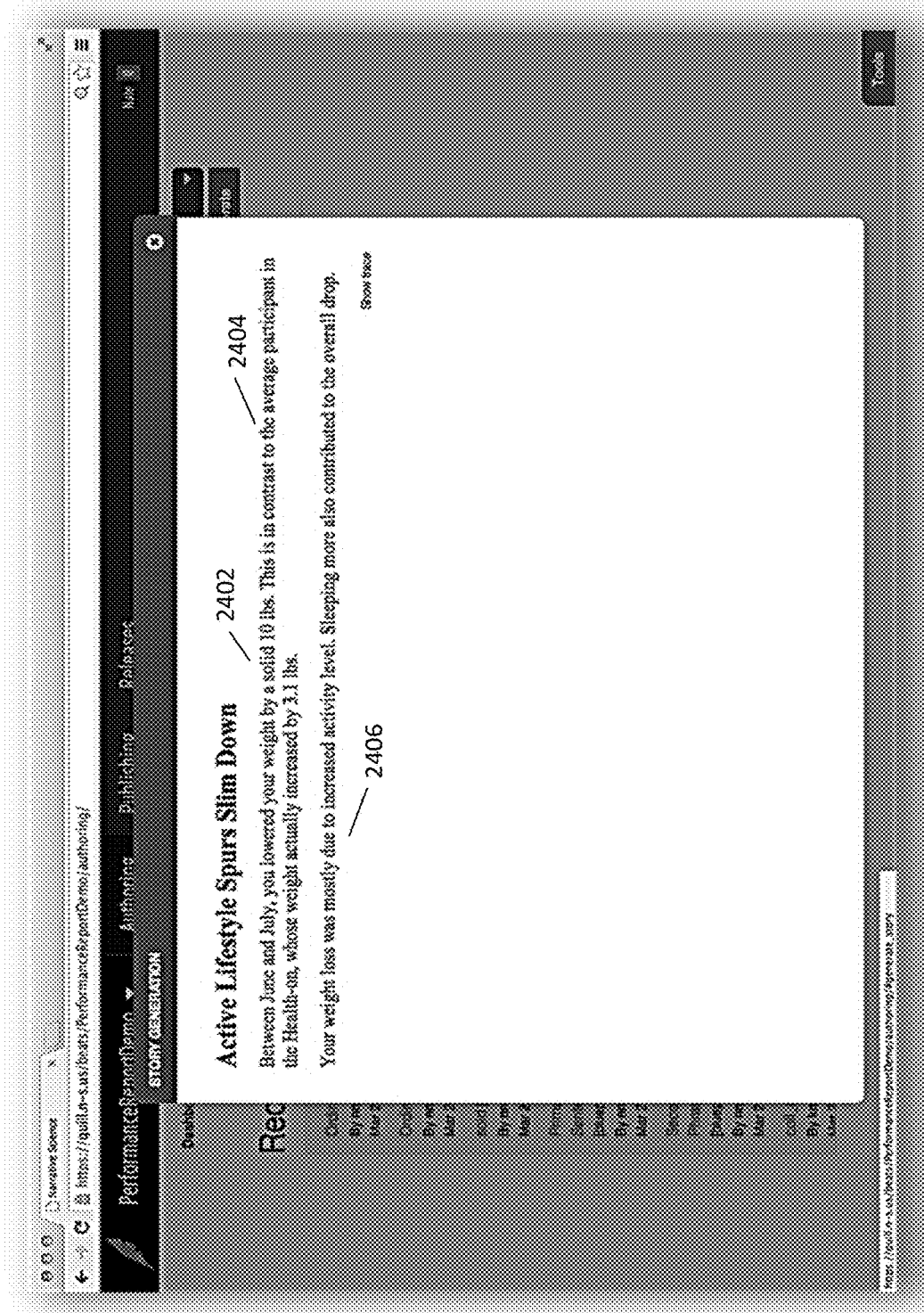

Referring to FIG. 23, the exemplary embodiments may be applied to a baseball team. For example, a user or the processor 100 may specify runs as the metric, home runs as a component driver, and the performance of specific players as a different kind of component driver. The configuration described above immediately yields the story illustrated in FIG. 23 when applied to appropriate sample data.

Referring to FIG. 23, the results of applying the specifications determined by three communication goal data structures are represented by the narrative generated. As indicated by reference numeral 2302, the first paragraph represents the results of (applying the specification determined by) the describe subject status communication goal data structure; as indicated by reference numeral 2304, the second paragraph similarly represents the results of the explain subject status communication goal data structure; as indicated by reference numeral 2306, the first sentence of the third paragraph similarly represents the results of the explain subject status communication goal data structure; and, as indicated by reference numeral 2308, the second sentence of the third paragraph similarly represents the results of evaluate status communication goal data structure. The second paragraph 2304 is an example of how the explain subject status communication goal data structure may specify the use of both contributing and inhibiting drivers to explain the metric.

Referring to FIG. 24, the specification 250 may be applied in the domain of human health. For example, a user or the processor 100 may specify weight as the top-line metric, a set of peers as the appropriate benchmark, and (among other things) sleep as a driver. The configuration described with reference to FIG. 24, which applies this parameterized specification to appropriate sample data, immediately yields the story depicted in FIG. 24.

Referring to FIG. 24, the results of applying the specifications determined by three communication goal data structures are represented by the narrative generated. As indicated by reference numeral 2402, the first sentence represents the results of the describe subject status communication goal data structure; as indicated by reference numeral 2404, the second sentence represents the results of the evaluate subject status communication goal data structure; as indicated by reference numeral 2306, the second paragraph represents the results of the explain subject status communication goal data structure.

In sum, the same story specification, composed of the same communication goals data structures 295 and narrative analytics models 500, appropriately parameterized and supplied with relevant data, can immediately produce useful and comprehensible narratives in radically different domains.

For example, the performance report specification configured in the previous section (and used as an example throughout this discussion) can easily be applied to a new domain simply by specifying the entity whose performance is to be discussed, the top-line metrics that matter, the appropriate benchmarks for assessing these metrics, and the relevant drivers for these metrics.

By virtue of this "top-down" approach to automatically generating narrative stories, whereby narrative goals dictate the data necessary to be communicated and how to communicate the data, the exemplary embodiments support an interactive model for conveying information. In the exemplary embodiments described above, the computer anticipates the questions a reader will want answered, and hopes to answer all those questions by defining communication goal data structures created to fulfill the narrative goals that answer the anticipated reader questions.

Interactive Narrative Generation Based on Communication Goals

As mentioned above, the steps 110 and 112 of FIG. 1B may be performed in a user-interactive mode. In the user-interactive mode, a user provides input relating to a desired communication goal for which the user wants a narrative to be generated. In the user-interactive mode, the system 104 may already include a number of communication goal and content block data structures in memory, and the system aims to leverage the communication goal relating to the user input at step 110 to drive the selection of and instantiation of an appropriate story specification that is tailored to the communication goal corresponding to the user's input. In this model, the system can be queried by the user, and in response to these queries, the system can generate narrative responses as necessary to fulfill the narrative goals raised by those explicit queries.

Although operating in the user-interactive mode, the computer system 104 still operates according to the exemplary configuration and process flow illustrated in FIGS. 1B and 2B, however steps 110 and 112 may operate slightly differently from the authoring mode described above. For example, rather than receiving user input before generating a narrative using the authoring user interfaces illustrated in FIGS. 7-21, the user may provide input according to a much simpler user interface.

Figure 25A:
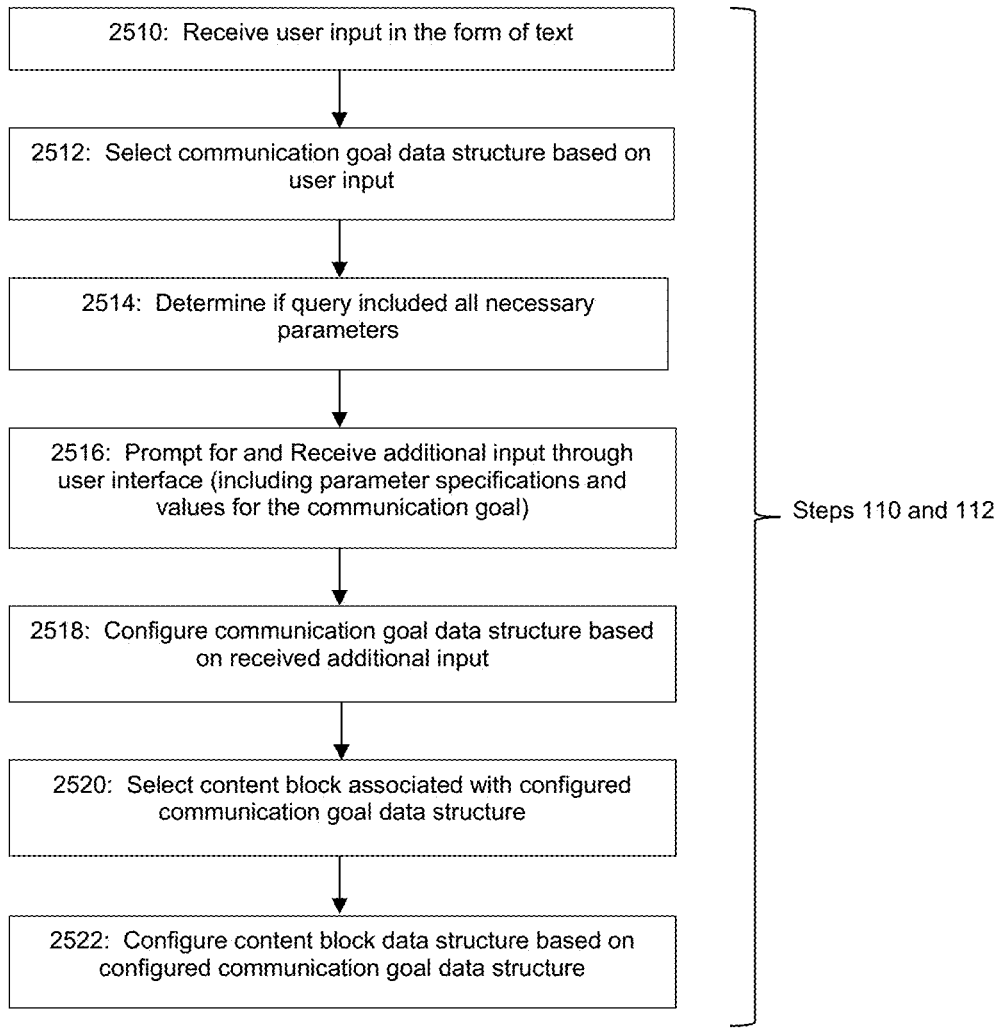
FIGS. 25A-B illustrates a method for interactively generating a narrative story making use of the communication goal data structures according to an exemplary embodiment.

FIG. 25A illustrates an expanded example of process flows 110 and 112 for the user-interactive mode. In this example, at step 2510, the processor receives an input in the form of text. The text received by the processor may be a question asked by a user, such as "How did the store do this week?" or the like. The processor may receive this textual input, for example, through the user interface illustrated in FIG. 26. The user may enter queries into the user-input box 2620, and the computer may respond to the queries in narrative form in the answer dialogue box 2610. Alternatively, in a less dynamic method, the processor may provide user-selectable options which a user may click in a GUI, such as through the user interface shown in FIG. 27. These options may, for example, be presented as links in a web-based application.

At step 2512, the processor determines which communication goal data structure will answer the question posed by the user in step 2512. In the example of "how did the store do this week?", the processor may determine that the describe status communication goal data structure 495A will answer this question. The processor may determine that the question relates to a specific communication goal data structure by searching for key words in the query. If the computer system provides user-selectable options, each user-selectable option may have associated metadata associating the user-selectable option with a specific communication goal data structure. In either mode, the processor determines which communication goal data structure will answer the question selected or entered by the user.

At step 2514, the processor may determine if the query entered by the user includes all the necessary parameters as required by the communication goal data structure and the narrative analytics. For example, if the processor determined in step 2512 that the describe status communication goal data structure will answer the user-entered query, the processor may determine if the query entered or selected by the user included a specified entity, a time period, and a specified top-line metric. If the user entered the query "how is the Ford Motor company doing?", the processor may determine that the user has only entered a parameter for the entity. If the processor determines that one or more parameters are missing, the processor may prompt the user for the missing parameters (step 2516). An example of such a prompt is illustrated in FIG. 28. In FIG. 28, the processor asks the user through an answer dialogue box 2810 in the user interface which top-line metric the processor should use to fulfill the describe status communication goal. This question may include referencing the structured data set 606 to determine which top-line metrics are available to the processor. The processor may include a follow-up question asking for a time period parameter after receiving the top-line metric parameter. The user may provide answers to these prompts through the user-input box 2820.

Referring again to FIG. 25A, the process continues with steps 2518-2522, and these steps may perform the same or similar processes as described above with reference to process steps 318-322 in FIG. 3B.

For example, the computer system 104 may generate a narrative aimed at describing, evaluating, and explaining the performance of a retail store, consider the following plausible, if hypothetical, dialog:

User: How did the store do this week?
System: Sales were up about 7% to $27,385 for the week.
User: How good was that?
System: Pretty good. It was above the average increase for stores in the region, which was about 4.5%, but not as good as the best store, which posted an increase of 8.2%.
User: What was behind the increase?
System: Sales of swimwear were up almost 20%, and sales of shorts were up over 15%. Sales of jeans were down a little, but not enough to hold back total sales.

In the dialog above, all the communication goals and relevant narrative analytics expressed in the example retail store sales narrative are fulfilled—but they are fulfilled at the explicit request of the user, expressed in questions that invoke a relevant narrative goal. In the above dialog the computer system 104 waits for the reader to explicitly express the question before answering it. Below is an interactive dialogue in a different domain: a person's weight. The computer system 104 may be configured to understand that weight as a metric changes over time, and that these changes are impacted by food intake, exercise, and sleep. Food intake in turn is influenced by what a person eats, and how much he or she eats. What a person eats, in turn, is influenced by where he or she eats. Finally, people have targets for their weight. Suppose the computer system 104 reports that a user weighs 190 pounds. Once this has been conveyed, the possible follow-up questions can be anticipated. The user might want to know if this is good in absolute terms, or whether it is going up or down. He or she might want to know if this is good in comparison to his or her goals or to an external benchmark. Or, the user might want to know how he or she is doing against a cohort—for example, other people who are dieting—either in terms of absolutes (the weight itself) or deltas (the direction and amount of change). With access to appropriate data from a variety of online sources, the resulting dialog might look something like this:

User: How's my weight?
System: Good. You're at 190, down a pound over the last two weeks. You're a little short of your goal though.
User: Short?
System: Yes. If you want to be down to 185 by the end of next month, you might have to change a couple of things.
User: What things?
System: Well, FitBit tells me that you may not be sleeping as well, and your level of physical activity for the past week has been lower than you want.
User: How much lower?
System: Not a lot, overall activity has been about 20% less than you want. But there haven't been the peaks that you had in the past. It looks like you haven't been actively working out.
User: Is that it?
System: You also might not be eating as well as you could.
User: How so?
System: I see that you have been ordering out more than you regularly do. You used GrubHub twice this week. Also, you were away from home at dinnertime a lot this week and that might have influenced your eating.
User: Anything I can do?
System: Up your activity next week; and when you eat out, try to order things that are good for you. If you can't make your own dinner, at least avoid all the Mexican food you had this week.
User: Is that all?
System: Get a little more sleep. Being tired impacts your diet.

In a dynamic and interactive dialog, these communication goals are fulfilled incrementally: it is only when the user requests certain information through an explicit question that the relevant narrative analytics to address that question are invoked and the results conveyed. In one embodiment, an interactive dialog, as indicated above, is generated ahead of time in the form of snippets that fulfill all the narrative goals that can be expected given the nature and purpose of the communication. However, rather than putting these all together into a single, structured narrative for presentation to the user, instead they can be held in abeyance until the specific communication goal they fulfill is explicitly indicated by a user's question.

In another embodiment, the computer system 104 does not consider communication goal data structures 295 until the user indicates that he or she wishes to have a question answered through the communication goal data structures 295. The user's expressions of interest are compared with the set of expected goals, as described earlier, and the appropriate goal is selected. The set of potentially relevant and expected communication goals is then updated based on the goal that has been fulfilled. The power of such a dynamic and recursive model is that the total set of questions of interest to the user, and corresponding communication goals, narrative analytics, and relevant data, need not be fixed in advance, but may grow in response to the user's interests as they arise and are conveyed interactively. In such an approach, once a communication goal has been fulfilled, the related communication goals, and the narrative analytics models they entail, are made available for possible invocation.

Figure 25B:
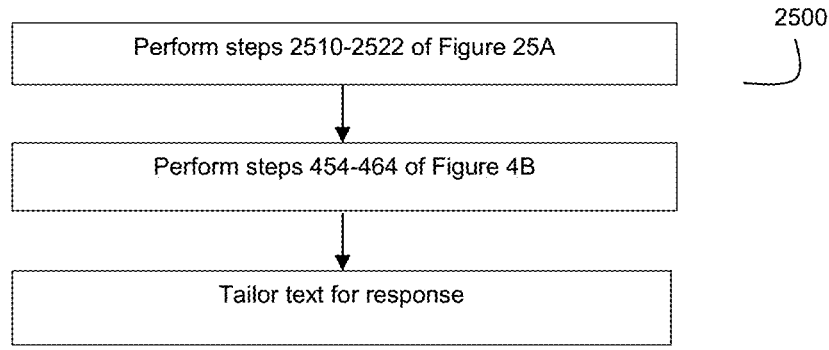

FIG. 25B illustrates the method performed by the computer system 104 to generate an interactive dialog that answers questions and responds to inputs from a user. To begin, the system receives an input from the user (step 2510). Receiving an input may either be via pre-generated selectable options (e.g., presented via a GUI) or by allowing the user to type in or speak their inputs in natural language.

Subsequently, the computer system interprets the input to decide which communication goal data structure answers the user's question or addresses the user's input (step 2512). That is, the computer system 104 selects which communication goal data structure 295 fulfills the narrative goal expressed by the user.

Step 2504 may be accomplished in different ways depending on how the input was received. For example, if the interactive interface has a finite number of pre-selectable options available, such options may be mapped to a specific communication goal data structure. For example, a first screen may illustrate the describe, evaluate, and explain subject status communication goal data structures, but they may be represented in natural language. For example, the GUI on a first screen may show: Button 1: Do you want to know about the store's status? Button 2: do you want to know why the store is doing so well/poorly? Button 3: do you want to know how the store compares? Selection of one button may generate a submenu where new options are available. For example, if the user clicked Button one that will tell the user how the store is doing, the submenu may allow the user to select various top-line metrics or various time frames.

Alternatively, the computer system 104 may receive natural language inputs from the user, as in the interactive examples shown above. In order to understand and interpret the words input by the user, the computer system 104 may look for keywords that correspond to the communication goal data structures. For example, if the user writes or speaks "What were the profits for this week?," the computer system 104 may recognize the word profit as a known top-line metric and the word week as a known time frame. Finding these two inputs, the computer system 104 may determine that the user is interested in the describe subject status communication goal data structure 495A. As another example, if the user enters the word "why" the computer may realize it needs to explain something, wherein the something depends on a domain recognized by the computer. These inputs may be context sensitive. For example, after providing a narrative fulfilling the narrative goal of describing the store's status, if the user simply enters the word "why," the computer system 104 may assume this question is in the same domain as the information it just presented. Thus, the computer system 104 may explain why the status is as such.

After the computer system 104 determines the correct communication goal, the computer system performs steps 2514-2522 described above with reference to FIG. 25A. Subsequently, the computer system performs steps 454-464 described above with reference to FIG. 4B.

Optionally, the computer system 104 may tailor the text presented to the user based on the input. For example, if the user asked a yes or no question, the computer system 104 may first add the word "yes" or "no" before presenting the text generated by the narrative analytics model 500.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method comprising:
   a processor selecting a communication goal data structure, the selected communication goal data structure comprising (1) first data that is indicative of a content block data structure associated with the selected communication goal data structure, and (2) second data that is indicative of a plurality of communication goal parameters whose values are variable, the associated content block data structure comprising a parameterized narrative analytics model, the parameterized narrative analytics model configured to specify how a data set is to be analyzed in order that a narrative be automatically generated based upon the data set, and wherein the parameterized narrative analytics model includes a plurality of angles for testing against the data set to identify an angle that is deemed to accurately characterize the data set, the angles having a plurality of applicability conditions, wherein the selected communication goal data structure comprises a data structure configured to specify how a status for a subject is to be explained, the communication goal parameters that are associated with the explain subject status communication goal data structure comprising:
   a subject metric parameter;
   a time frame parameter; and
   a driver parameter for the subject metric parameter;
   the processor configuring the content block data structure associated with the selected communication goal data structure based on the communication goal parameters associated with the selected communication goal data structure, wherein the configuring step comprises:
   the processor receiving input;
   the processor defining a plurality of values for the communication goal parameters based on the received input; and
   the processor defining the content block data structure associated with the selected communication goal data structure as a function of the defined values for the communication goal parameters;
   the processor storing the configured content block data structure in memory to thereby enable an automated generation of the narrative based on the configured content block data structure as applied to the data set;
   the processor receiving the data set;
   the processor processing the received data set based on the configured content block data structure; and
   the processor automatically generating a narrative about the data set based on the processing, wherein the generated narrative is tailored to the explain subject status communication goal.

2. The method of claim 1 wherein the driver parameter comprises a plurality of the driver parameters.

3. The method of claim 2 wherein the plurality of driver parameters comprises a contributing driver and an inhibiting driver.

4. The method of claim 1 wherein the input receiving step comprises the processor receiving the input from a user through a user interface, the user interface comprising a plurality of fields for user input of values for the communication goal parameters associated with the selected communication goal data structure.

5. The method of claim 4 further comprising:
the user interface providing the user of a preview of an output narrative from the data set based on the defined communication goal parameter values.

6. The method of claim 1 wherein the communication goal parameters that are associated with the selected communication goal data structure further comprise:
an information density parameter.

7. The method of claim 1 wherein the communication goal parameters that are associated with the selected communication goal data structure further comprise:
a tone parameter.

8. The method of claim 1 wherein the selected communication goal data structure further comprises third data that is indicative of another communication goal data structure that is associated with the selected communication goal data structure.

9. The method of claim 1 wherein the parameterized narrative analytics model further specifies a plurality of blueprint sets associated with the content block data structure and the angles.

10. A method comprising:
a processor selecting a communication goal data structure, the selected communication goal data structure comprising (1) first data that is indicative of a content block data structure associated with the selected communication goal data structure, (2) second data that is indicative of a plurality of communication goal parameters whose values are variable, and (3) third data that is indicative of another communication goal data structure that is associated with the selected communication goal data structure, the associated content block data structure comprising a parameterized narrative analytics model, the parameterized narrative analytics model configured to specify how a data set is to be analyzed in order that a narrative be automatically generated based upon the data set, wherein the parameterized narrative analytics model includes a plurality of angles for testing against the data set to identify an angle that is deemed to accurately characterize the data set, the angles having a plurality of applicability conditions, and the processor configuring the content block data structure associated with the selected communication goal data structure based on the communication goal parameters associated with the selected communication goal data structure;

the processor storing the configured content block data structure in memory to thereby enable an automated generation of the narrative based on the configured content block data structure as applied to the data set;

the processor receiving the data set;

the processor processing the received data set based on the configured content block data structure; and the processor automatically generating a narrative about the data set based on the processing, wherein the generated narrative is tailored to a communication goal associated with the selected communication goal data structure;

wherein the another communication goal data structure comprises (1) first data that is indicative of another content block data structure that is associated with the another communication goal data structure, and (2) second data that is indicative of another plurality of communication goal parameters whose values are variable, the associated another content block data structure comprising another parameterized narrative analytics model, the another parameterized narrative analytics model configured to specify how another narrative is to be automatically generated from a data set about which the another narrative is to be automatically generated, the another narrative analytics model including a plurality of angles for testing against the data set for the another parameterized narrative analytics model to identify an angle that is deemed to accurately characterize the data set for the another parameterized narrative analytics model, the angles having a plurality of applicability conditions, the method further comprising:

the processor identifying the another communication goal data structure that is associated with the selected communication goal data structure;

the processor configuring the another content block data structure associated with the identified another communication goal data structure based on the another communication goal parameters associated with the identified another communication goal data structure; and the processor storing the configured another content block data structure in memory to thereby enable an automated generation of the another narrative based on the configured another content block data structure as applied to the data set for the another parameterized narrative analytics model.

11. The method of claim 10 wherein the configuring step comprises:
the processor receiving input;
the processor defining a plurality of values for the communication goal parameters based on the received input;
the processor defining the content block data structure associated with the selected communication goal data structure as a function of the defined values for the communication goal parameters.

12. The method of claim 11 wherein the configuring step further comprises:
the processor defining the data set as a function of the defined values for the communication goal parameters.

13. An apparatus comprising:
a processor; and
a memory;
the memory configured to store a plurality of communication goal data structures and a plurality of content block data structures;
wherein the processor is configured to:
select a communication goal data structure in the memory, the selected communication goal data structure comprising (1) first data that is indicative of a content block data structure in the memory associated with the selected communication goal data structure, and (2) second data that is indicative of a plurality of communication goal parameters whose values are variable, the associated content block data structure comprising a parameterized narrative analytics model, the parameterized narrative analytics model configured to specify how a data set is to be analyzed in order that a narrative be automatically generated based upon the data set, wherein the parameterized narrative analytics model includes a plurality of angles for testing against the data set to identify an angle that is deemed to accurately characterize the data set, the angles having a plurality of applicability conditions, wherein the selected communication goal data structure comprises a data structure configured to specify how a status for a subject is to be explained, the communication goal parameters that are associated with the explain subject status communication goal data structure comprising:
  a subject metric parameter;
  a time frame parameter; and
  a driver parameter for the subject metric parameter;
configure the content block data structure associated with the selected communication goal data structure based on the communication goal parameters associated with the selected communication goal data structure, wherein as part of this configuration, the processor is further configured to (1) receive input, (2) define a plurality of values for the communication goal parameters based on the received input, and (3) define the content block data structure associated with the selected communication goal data structure as a function of the defined values for the communication goal parameters;
store the configured content block data structure in the memory to thereby enable an automated generation of the narrative based on the configured content block data structure as applied to the data set;
receive the data set;
process the received data set based on the configured content block data structure; and
automatically generate a narrative about the data set based on the processing, wherein the generated narrative is tailored to the explain subject status communication goal.

14. A computer program product comprising:
a plurality of processor-executable instructions that are resident on a non-transitory computer-readable storage medium, wherein the instructions are configured for execution by the processor to cause a computer to:
  select a communication goal data structure in the memory, the selected communication goal data structure comprising (1) first data that is indicative of a content block data structure in the memory associated with the selected communication goal data structure, and (2) second data that is indicative of a plurality of communication goal parameters whose values are variable, the associated content block data structure comprising a parameterized narrative analytics model, the parameterized narrative analytics model configured to specify how a data set is to be analyzed in order that a narrative be automatically generated based upon the data set, wherein the parameterized narrative analytics model includes a plurality of angles for testing against the data set to identify an angle that is deemed to accurately characterize the data set, the angles having a plurality of applicability conditions, wherein the selected communication goal data structure comprises a data structure configured to specify how a status for a subject is to be explained, the communication goal parameters that are associated with the explain subject status communication goal data structure comprising:
    a subject metric parameter;
    a time frame parameter; and
    a driver parameter for the subject metric parameter;
  configure the content block data structure associated with the selected communication goal data structure based on the communication goal parameters associated with the selected communication goal data structure, wherein as part of this configuration, the instructions are further configured for execution by the processor to cause the computer to (1) receive input, (2) define a plurality of values for the communication goal parameters based on the received input, and (3) define the content block data structure associated with the selected communication goal data structure as a function of the defined values for the communication goal parameters;
  store the configured content block data structure in the memory to thereby enable an automated generation of the narrative based on the configured content block data structure as applied to the data set;
  receive the data set;
  process the received data set based on the configured content block data structure; and
  automatically generate a narrative about the data set based on the processing, wherein the generated narrative is tailored to the explain subject status communication goal.

15. A method for automatically generating a performance report narrative story for a subject comprising:
  defining a communication goal data structure in a memory, wherein the communication goal data structure is a member of the group consisting of a describe subject status communication goal data structure, an evaluate subject status communication goal data structure, and an explain subject status communication goal data structure, wherein the describe subject status communication goal data structure is associated with a content block data structure that specifies how to describe a performance of a metric for a subject over a time frame, wherein the evaluate subject status communication goal data structure is associated with a content block data structure that specifies how to compare the subject metric determined by the describe subject status communication goal data structure against a reference, and wherein the explain subject status communication goal data structure is associated with (i) a content block data structure that specifies how to describe performance of a driver of the subject metric and (ii) a content block data structure that specifies how to explain how the driver affected the subject metric, and each content block data structure configured to specify how a plurality of portions of a narrative story are to be automatically generated;
  a processor selecting a defined communication goal data structure in the memory;
  the processor accessing a content block data structure associated with the selected communication goal data structure; and
  generating a narrative based on a data set utilizing a narrative analytics model defined by the accessed content block data structure.

16. The method of claim 15 wherein the selecting step comprises the processor selecting the defined communication goal data structure in response to input from a user.

17. The method of claim 16 wherein the selecting step further comprises:
  the processor receiving input from a user that corresponds to a selection of a defined communication goal data structure from among a library of defined communication goal data structures;

the processor selecting the defined communication goal data structure from the library in accordance with the received user input.

18. The method of claim 15 wherein the generating step comprises:
the processor instantiating a narrative generation engine based on the accessed content block data structure including the narrative analytics model defined by the accessed content block data structure; and
the processor automatically generating the narrative based on the data set by processing the data set using the instantiated narrative generation engine.

19. The method of claim 18 wherein the content block data structure and the communication goal data structure are not expressed in a programming language or in code directly executable by the processor; and
wherein the instantiating step comprises the processor parsing and transforming the accessed content block data structure into a narrative generation engine that comprises code directly executable by the processor.

20. The method of claim 15 wherein the generating step comprises:
the processor automatically generating a narrative about a performance of a retail store utilizing the narrative analytics model defined by the accessed content block data structure.

21. The method of claim 15 wherein the generating step comprises:
the processor automatically generating a narrative about a performance of a company utilizing the narrative analytics model defined by the accessed content block data structure.

22. The method of claim 15 wherein the generating step comprises:
the processor automatically generating a narrative about a sports game utilizing the narrative analytics model defined by the accessed content block data structure.

23. The method of claim 15 wherein the generating step comprises:
the processor automatically generating a narrative about health-related data by a person utilizing the narrative analytics model defined by the accessed content block data structure.

24. The method of claim 15, wherein the defined and selected communication goal data structure is the describe status communication goal data structure, and wherein the narrative analytics model for the content block data structure associated therewith specifies data and algorithms for calculating a value and trajectory for the subject metric.

25. The method of claim 24 wherein the describe subject status communication goal data structure comprises:
a subject metric parameter; and
a second parameter.

26. The method of claim 25 wherein the communication goal parameters that are associated with the describe subject status communication goal data structure further comprise:
a change threshold parameter.

27. The method of claim 15, wherein the defined and selected communication goal data structure is the evaluate status communication goal data structure, and wherein the narrative analytics model for the content block data structure associated therewith specifies data and algorithms for comparing the value for the subject metric against the reference.

28. The method of claim 27 wherein the evaluate subject status communication goal data structure comprises:
a subject metric parameter;
a time frame parameter; and
a reference comparison parameter.

29. The method of claim 27 wherein the reference is a threshold or the subject metric of a peer.

30. The method of claim 15, wherein the defined and selected communication goal data structure is the explain status communication goal data structure, and wherein the narrative analytics models for the content block data structures associated therewith specify data and algorithms for describing a value for the driver over the time frame and for explaining how the driver affected the subject metric over the time frame.

31. The method of claim 30 wherein the driver is a component driver.

32. The method of claim 30 wherein the explain subject status communication goal data structure comprises:
a subject metric parameter;
a time frame parameter; and
a driver parameter for the subject metric parameter.

* * * * *